US009103671B1

(12) United States Patent
Breed et al.

(10) Patent No.: US 9,103,671 B1
(45) Date of Patent: Aug. 11, 2015

(54) MAPPING TECHNIQUES USING PROBE VEHICLES

(71) Applicant: AMERICAN VEHICULAR SCIENCES LLC, Frisco, TX (US)

(72) Inventors: David S. Breed, Miami Beach, FL (US); Ryan H Breed, Laguna Niguel, CA (US)

(73) Assignee: American Vehicular Sciences, LLC, Plano, TX (US)

( * ) Notice: Subject to any disclaimer, the term of this patent is extended or adjusted under 35 U.S.C. 154(b) by 220 days.

(21) Appl. No.: 13/686,862

(22) Filed: Nov. 27, 2012

Related U.S. Application Data

(63) Continuation-in-part of application No. 12/325,719, filed on Dec. 1, 2008, now abandoned.

(60) Provisional application No. 60/990,976, filed on Nov. 29, 2007.

(51) Int. Cl.
G01C 11/00 (2006.01)
G01C 11/02 (2006.01)

(52) U.S. Cl.
CPC .................... G01C 11/025 (2013.01)

(58) Field of Classification Search
CPC .... B60R 1/00; B60R 2300/105; B60R 11/04; B60R 2300/802; H04N 7/181
USPC ........................................................ 348/148
See application file for complete search history.

(56) References Cited

U.S. PATENT DOCUMENTS

| 5,111,400 | A | 5/1992 | Yoder |
| 5,381,338 | A | 1/1995 | Wysocki et al. |
| 5,548,515 | A | 8/1996 | Pilley et al. |
| 6,047,234 | A | 4/2000 | Cherveny et al. |
| 6,405,132 | B1 | 6/2002 | Breed et al. |
| 6,526,352 | B1 | 2/2003 | Breed et al. |
| 6,720,920 | B2 | 4/2004 | Breed et al. |
| 6,768,944 | B2 | 7/2004 | Breed et al. |
| 6,862,500 | B2 | 3/2005 | Tzamaloukas |
| 7,085,637 | B2 | 8/2006 | Breed et al. |
| 7,202,776 | B2 * | 4/2007 | Breed ........................... 340/435 |

(Continued)

OTHER PUBLICATIONS

Gajdamowicz et al. Mapping and 3D Modelling of Urban Environment Based on Lidar, GPS/imu and Image Data; The 5th International Symposium on Mobile Mapping Technology MMT '07; May 29-31, 2007.*

(Continued)

Primary Examiner — Jay Patel
Assistant Examiner — Frank Huang
(74) Attorney, Agent, or Firm — Brian Roffe

(57) ABSTRACT

Method and system for mapping terrain including one or more roads includes a vehicle equipped with at least one camera, a position determining system that determines its position and an inertial measurement unit (IMU) that provides at least one inertial property of the vehicle, all of which are in a set configuration relative to one another. A processor at a remote location apart from the vehicle converts images from the camera(s) to a map including objects from the images by identifying common objects in multiple images and using the position information and the inertial measurement information from when the multiple images were obtained and knowledge of the set configuration of the camera(s), the position determining system and the IMU. The images, position information and inertial measurement information are transmitted to the processor by a communications unit on the vehicle.

31 Claims, 16 Drawing Sheets

(56) References Cited

U.S. PATENT DOCUMENTS

| | | |
|---|---|---|
| 7,295,925 B2 | 11/2007 | Breed et al. |
| 7,983,802 B2 | 7/2011 | Breed |
| 8,417,451 B2 | 4/2013 | Hersey et al. |
| 8,497,798 B2 | 7/2013 | Schloetzer |
| 8,520,933 B2 | 8/2013 | Wang et al. |
| 8,531,318 B2 | 9/2013 | Denaro |
| 8,589,075 B1 | 11/2013 | Jones |
| 8,688,369 B2 | 4/2014 | Denaro |
| 8,738,284 B1 | 5/2014 | Jones |
| 2005/0057745 A1 | 3/2005 | Bontje |
| 2009/0140887 A1 | 6/2009 | Breed et al. |
| 2013/0325325 A1 | 12/2013 | Djugash et al. |
| 2014/0005859 A1 | 1/2014 | Baskin et al. |
| 2014/0129128 A1 | 5/2014 | Haran |

OTHER PUBLICATIONS

Panagiotopoulou "Eye in the Sky" project—intelligent transport infrastructure for traffic monitoring and mobility information, Vehicular Technology Conference, 2004. VTC 2004-Spring. 2004 IEEE 59th, vol. 5, no., pp. 2926,2930 vol. 5, May 2004.*

McKeown, Jr., David M., "Cooperative Methods for Road Tracking in Aerial Imagery", The Computer Society Conference of Computer Vision and Pattern Recognition, Jun. 5-9, 1988, pp. 662-672.

Williams, Adam, "Fingernail-sized radar chip could be used in future smartphones", Nov. 25, 2012.

Cotton, William B., "Expert Report on the Invalidity of U.S. Patent Nos. 5,392,052; 5,351,194; 6,314,366; 6,405,132; and 7,295,925", Exhibit G, May 28, 2009.

Cotton, William B., "Expert Report on the Invalidity of U.S. Patent Nos. 5,392,052; 5,351,194; 6,314,366; 6,405,132; and 7,295,925", Exhibit F, May 28, 2009.

* cited by examiner

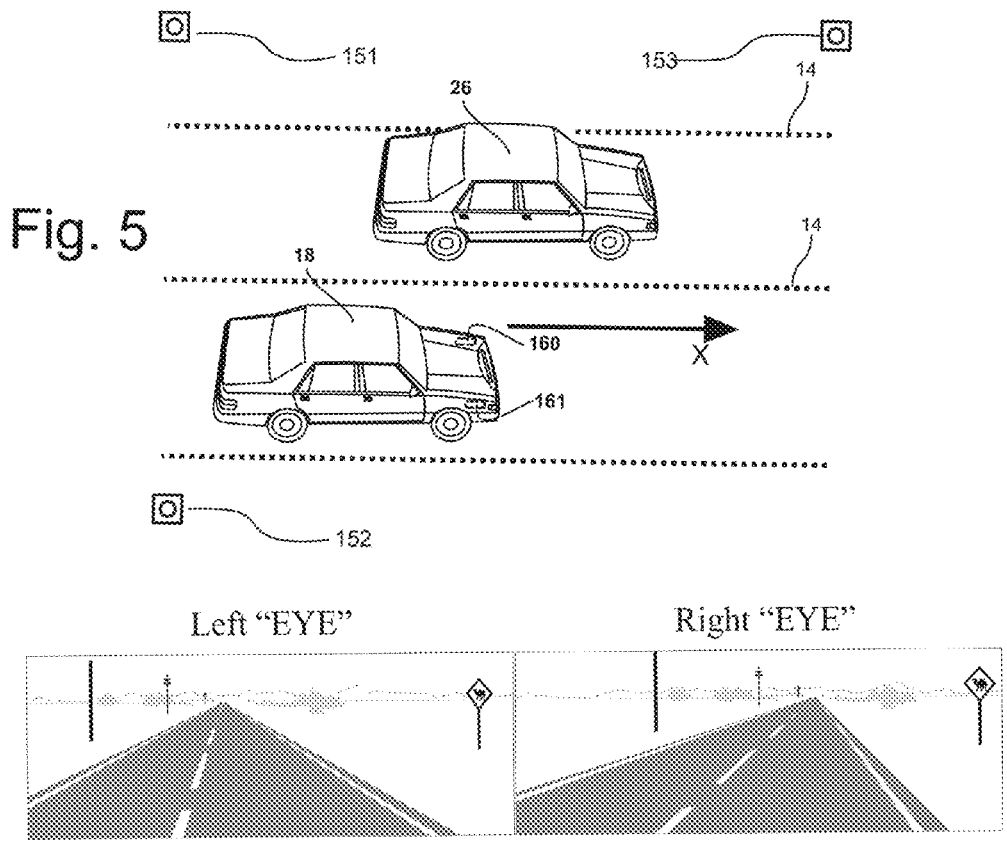
Fig. 5
Fig. 8
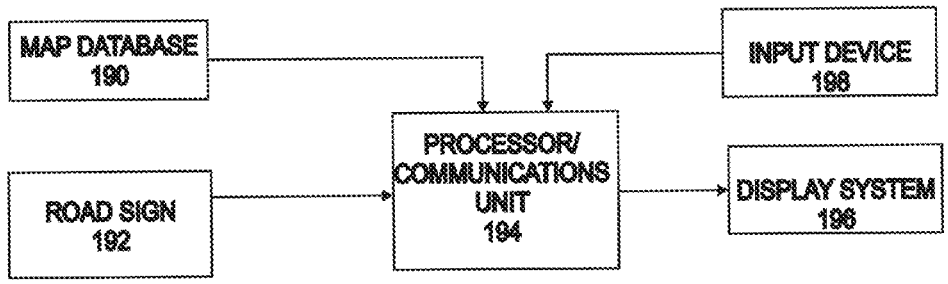
Fig. 17

Data acquisition module

MAPPING TECHNIQUES USING PROBE VEHICLES

CROSS REFERENCE TO RELATED APPLICATIONS

This application is a continuation-in-part of U.S. patent application Ser. No. 12/325,719, filed Dec. 1, 2008, which claims priority under 35 U.S.C. §119(e) of U.S. provisional patent application Ser. No. 60/990,976 filed Nov. 29, 2007, the entire disclosures of which are incorporated by reference herein.

FIELD OF THE INVENTION

The present invention relates generally to arrangements and methods for mapping terrain including roads using probe vehicles traveling on the roads.

BACKGROUND OF THE INVENTION

A detailed discussion of background information is set forth in related applications, for example, U.S. patent application Ser. Nos. 09/679,317, 10/822,445, 11/028,386 and 11/034,325, all of which are incorporated by reference herein.

All of the patents, patent applications, technical papers and other references mentioned herein and in the related applications are incorporated by reference herein in their entirety. No admission is made that any or all of these references are prior art and indeed, it is contemplated that they may not be available as prior art when interpreting 35 U.S.C. §102 in consideration of the claims of the present application.

Definitions of terms used in the specification and claims are also found in the related applications.

OBJECTS AND SUMMARY OF THE INVENTION

It is an object of the present invention to provide new and improved methods and arrangements for creating maps including roads.

In order to achieve this object and others, a method and system for mapping terrain including one or more roads includes a vehicle equipped with at least one camera, a position determining system that determines its position and an inertial measurement unit (IMU) that provides at least one inertial property of the vehicle, all of which are in a set configuration relative to one another. A processor at a remote location apart from the vehicle converts images from the camera(s) to a map including objects from the images by identifying common objects in multiple images and using the position information and the inertial measurement information from when the multiple images were obtained and knowledge of the set configuration of the camera(s), the position determining system and the IMU. The images, position information and inertial measurement information are transmitted to the processor by a communications unit on the vehicle.

Other improvements will now be obvious to those skilled in the art. The above features are meant to be illustrative and not definitive.

Preferred embodiments of the inventions are shown in the drawings and described in the detailed description below. Unless specifically noted, it is applicants' intention that the words and phrases in the specification and claims be given the ordinary and accustomed meaning to those of ordinary skill in the applicable art(s). If applicants intend any other meaning, they will specifically state they are applying a special meaning to a word or phrase. In this regard, the words velocity and acceleration will be taken to be vectors unless stated otherwise. Speed, on the other hand, will be treated as a scalar. Thus, velocity will imply both speed and direction.

Likewise, applicants' use of the word "function" in the detailed description is not intended to indicate that they seek to invoke the special provisions of 35 U.S.C. §112, ¶6 to define their inventions. To the contrary, if applicants wish to invoke the provision of 35 U.S.C. §112, ¶6, to define their inventions, they will specifically set forth in the claims the phrases "means for" or "step for" and a function, without also reciting in that phrase any structure, material or act in support of the function. Moreover, even if applicants invoke the provisions of 35 U.S.C. §112, ¶6, to define their inventions it is applicants' intention that their inventions not be limited to the specific structure, material or acts that are described in preferred embodiments. Rather, if applicants claim their inventions by specifically invoking the provisions of 35 U.S.C. §112, ¶6, it is nonetheless their intention to cover and include any and all structures, materials or acts that perform the claimed function, along with any and all known or later developed equivalent structures, materials or acts for performing the claimed function.

For example, the present inventions make use of GPS satellite location technology, including the use of MIR or RFID triads or radar and reflectors, to derive kinematic vehicle location and motion trajectory parameters for use in a vehicle collision avoidance system and method. The inventions described herein are not to be limited to the specific GPS devices or PPS devices disclosed in preferred embodiments, but rather, are intended to be used with any and all such applicable satellite and infrastructure location devices, systems and methods, as long as such devices, systems and methods generate input signals that can be analyzed by a computer to accurately quantify vehicle location and kinematic motion parameters in real time. Thus, the GPS and PPS devices and methods shown and referenced generally throughout this disclosure, unless specifically noted, are intended to represent any and all devices appropriate to determine such location and kinematic motion parameters.

Further, there are disclosed several processors or controllers, that perform various control operations. The specific form of processor is not important to the invention. In its preferred form, the computing and analysis operations are divided into several cooperating computers or microprocessors. However, with appropriate programming well known to those of ordinary skill in the art, the inventions can be implemented using a single, high power computer. Thus, it is not applicants' intention to limit their invention to any particular form or location of processor or computer. For example, it is contemplated that in some cases, the processor may reside on a network connected to the vehicle such as one connected to the Internet.

Further examples exist throughout the disclosure, and it is not applicants' intention to exclude from the scope of their inventions the use of structures, materials, or acts that are not expressly identified in the specification, but nonetheless are capable of performing a claimed function.

The above and other objects and advantages of the present invention are achieved by preferred embodiments that are summarized and described below.

BRIEF DESCRIPTION OF THE DRAWINGS

The various hardware and software elements used to carry out the invention described herein are illustrated in the form of system diagrams, block diagrams, flow charts, and depictions of neural network algorithms and structures. Preferred embodiments are illustrated in the following figures:

FIG. 5 illustrates the use of a Precise Positioning System employing three micropower impulse radar transmitters, two or three radar reflectors or three RFID tags in a configuration to allow a vehicle to accurately determine its position.

FIG. 8 shows the view of a road or other travel lane from the video cameras in both of the data acquisition modules.

FIG. 17 is a schematic of an in-vehicle signage system in accordance with the invention.

DETAILED DISCUSSION OF PREFERRED EMBODIMENTS

1. Vehicle Collision Warning and Control

Figure 1:
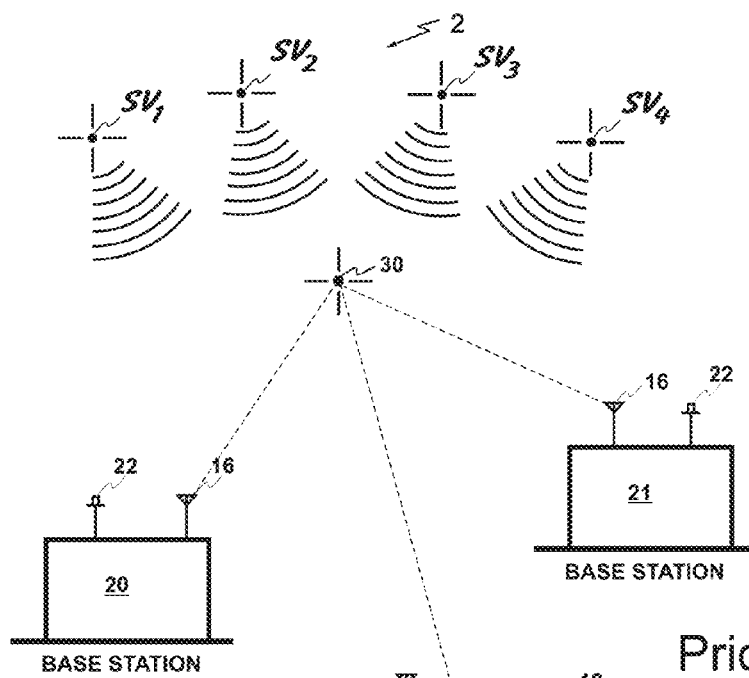
FIG. 1 illustrates a WADGPS system with four GPS satellites transmitting position information to a vehicle and to a base station which in turn transmits the differential correction signal to the vehicle.

According to U.S. Pat. No. 5,506,584, the stated goals of the US DOT IVHS system are:
improving the safety of surface transportation
increasing the capacity and operational efficiency of the surface transportation system
enhancing personal mobility and the convenience and comfort of the surface transportation system
reducing the environmental and energy impacts of the surface transportation system The RtZF® system in accordance with the present invention satisfies all of these goals at a small fraction of the cost of prior art systems. The safety benefits are discussed in above-referenced patents. The capacity increase can be achieved by confining vehicles to corridors where they are permitted to travel at higher speeds. This can be achieved immediately where carrier phase DGPS or wide area DGPS is available or with the implementation of the highway-located precise location systems as shown in FIG. 11. An improvement is to add the capability for the speed of the vehicles to be set by the highway or highway control system. This is a simple additional few bytes of information that can be transmitted along with the road edge location map, thus, at very little initial cost. To account for the tolerances in vehicle speed control systems, the scanning laser radar, or other technology system, which monitors for the presence of vehicles without RtZF® is also usable as an adaptive cruise control system. Thus, if a faster moving vehicle approaches a slower moving vehicle, it will automatically slow down to keep a safe separation distance from the leading, slower moving vehicle. Although the system is not planned for platooning, that will be the automatic result in some cases. The maximum packing of vehicles is automatically obtained and thus the maximum vehicle flow rate is also achieved with a very simple system.

For the Intelligent Highway System (ITS) application, some provision is required to prevent unequipped vehicles from entering the restricted lanes. In most cases, a barrier will be required since if an errant vehicle did enter the controlled lane, a serious accident could result. Vehicles would be checked while traveling down the road or at a tollbooth, or similar station, that the RtZF® system was in operation without faults and with the latest updated map for the region. Only those vehicles with the RtZF® system in good working order would be permitted to enter. The speed on the restricted lanes would be set according to the weather conditions and fed to the vehicle information system automatically, as discussed above. Automatic tolling based on the time of day or percentage of highway lane capacity in use can also be easily implemented.

For ITS use, there needs to be a provision whereby a driver can signal an emergency, for example, by putting on the hazard lights. This would permit the vehicle to leave the roadway and enter the shoulder when the vehicle speed is below a certain level. Once the driver provides such a signal, the roadway information system, or the network of vehicle-based control systems, would then reduce the speed of all vehicles in the vicinity until the emergency has passed. This roadway information system need not be actually associated with the particular roadway and also need not require any roadway infrastructure. It is a term used here to represent the collective system as operated by the network of nearby vehicles and the inter-vehicle communication system which can be direct vehicle-to-vehicle communication or communication through the Internet. Eventually, the occurrence of such emergency situations will be eliminated by vehicle-based failure prediction systems such as described in U.S. Pat. No. 5,809,437.

Emergency situations will develop on intelligent highways. It is difficult to access the frequency or the results of such emergencies. The industry has learned from airbags that if a system is developed which saves many lives but causes a few deaths, the deaths will not be tolerated. The ITS system, therefore, must operate with a very high reliability, that is approaching "zero fatalities"™. Since the brains of the system will reside in each vehicle, which is under the control of individual owners, there will be malfunctions and the system must be able to adapt without causing accidents. An alternative is for the brains to reside on a network, such as the Internet, providing that the network connection is reliable.

Spacing of the vehicles is the first line of defense. Secondly, each vehicle with a RtZF® system has the ability to automatically communicate to all adjacent vehicles and thus immediately issue a warning when an emergency event is occurring. Finally, with the addition of a total vehicle diagnostic system, such as disclosed in U.S. Pat. No. 5,809,437, potential emergencies can be anticipated and thus eliminated with high reliability.

Although the application for ITS envisions a special highway lane and high speed travel, the potential exists in the invention to provide a lower measure of automatic guidance where the operator can turn control of the vehicle over to the RtZF® system for as long as the infrastructure is available. In this case, the vehicle would operate in normal lanes but would retain its position in the lane and avoid collisions until a decision requiring operator assistance is required. At that time, the operator would be notified and if he or she did not assume control of the vehicle, an orderly stopping of the vehicle, e.g., on the side of the road, would occur.

For all cases where vehicle steering control is assumed by the RtZF® system, an algorithm for controlling the steering should be developed using neural networks or neural fuzzy systems. This is especially true for the emergency cases discussed herein where it is well known that operators frequently take the wrong actions and at the least, they are slow to react. Algorithms developed by other non-pattern recognition techniques do not, in general, have the requisite generality or complexity and are also likely to make the wrong decisions (although the use of such systems is not precluded in the invention). When the throttle and breaking functions are also handled by the system, an algorithm based on neural networks or neural fuzzy systems is even more important.

For the ITS, the driver will enter his or her destination so that the vehicle knows ahead of time where to exit. Alternately, if the driver wishes to exit, he merely turns on his turn signal, which tells the system and other vehicles that he or she is about to exit the controlled lane. Alternately, under an automatic route guidance system, guiding of the vehicle and control of other vehicles in the system can be coordinated by a service which can reside on the Internet, provided ubiquitous Internet is available.

Consider, for example, a dynamic route guidance system. In this case, the vehicle can have an identification number, which can be random for privacy, or IP address associated with it which is broadcast or communicated to the Internet route guidance service from time to time and gets a response from the system indicating what is the best path to go to its destination. The driver can overcome this; however, the system can be considered like a packet system switching system, only the packets are vehicles, such as automobiles or trucks. The driver can choose, for example, the least congested way, the fastest way, the most scenic way, the least expensive way and the service can dynamically adjust the route to accommodate the driver's wishes. In a sense, each vehicle is transmitting its intended destination and the system can take account of potential congestion that it can forecast, since it will know the location of all equipped vehicles in the vicinity, with the proper trained pattern recognition system as well as actual congestion. Thus, the Internet-based service can track the vehicle and congestion and re-route the vehicle dynamically like a communications packet based on location, destination, congestion and other driver preferences.

In the above example, the image was first subjected to a feature extraction process and the feature data was input to the neural network. In other cases, especially as processing power continues to advance, the entire image is input to the neural network for processing. This generally requires a larger neural network. Alternate approaches use data representing the difference between two frames and the input data to the neural network. This is especially useful when a moving object of interest is in an image containing stationary scenery that is of no interest. This technique can be used even when everything is moving by using the relative speed as a filter to remove unwanted pixel data. Any variations are possible and will now be obvious to those skilled in the art. Alternately, this image can be filtered based on range, which will also significantly reduce the number of pixels to be analyzed.

In another implementation, the scenes are differenced based on illumination. If infrared illumination is used, for example, the illumination can be turned on and off and images taken and then differenced. If the illumination is known only to illuminate an object of interest then such an object can be extracted from the background by this technique. A particularly useful method is to turn the illumination on and off for alternate scan lines in the image. Adjacent scan lines can then be differenced and the resulting image sent to the neural network system for identification.

The neural network can be implemented as an algorithm on a general-purpose microprocessor or on a dedicated parallel processing DSP, neural network ASIC or other dedicated parallel or serial processor. The processing speed is generally considerably faster when parallel processors are used and this can also permit the input of the entire image for analysis rather than using feature data. A combination of feature and pixel data can also be used.

Neural networks have certain known potential problem areas that various researchers have attempted to eliminate. For example, if data representing an object that is totally different from those objects present in the training data is input to the neural network, an unexpected result can occur which, in some cases, can cause a system failure. To solve this and other neural network problems, researchers have resorted to adding in some other computational intelligence principles such as fuzzy logic resulting in a neural-fuzzy system, for example. As the RtZF® system evolves, such refinements will be implemented to improve the accuracy of the system. Thus, although pure neural networks are currently being applied to the problem, hybrid neural networks such as modular, combination, ensemble and fuzzy neural networks will undoubtedly evolve.

Neural networks used in the accident avoidance system of this invention are trained to recognize roadway hazards including automobiles, trucks, animals and pedestrians. Training involves providing known inputs to the network resulting in desired output responses. The weights are automatically adjusted based on error signal measurements until the desired outputs are generated. Various learning algorithms may be applied with the back propagation algorithm with the Delta Bar rule as a particularly successful method.

Pattern recognition systems such as neural networks or combination neural networks can also be used for traffic and weather analysis and forecasting and for recognizing features on images for mapping. For congestion prediction, for example, the network can be trained on past traffic patterns and the resulting congestion that followed.

2. Accurate Navigation

FIG. 1 shows an arrangement of four satellites 2 designated $SV_1$, $SV_2$, $SV_3$ and $SV_4$ of a GPS satellite system transmitting position information to receivers of base stations 20 and 21, such as an antenna 22, which in turn transmit a differential correction signal via transmitters associated with that base stations, such as a second antenna 16, to a geocentric or low earth orbiting (LEO) satellite 30 which in turn transmits the differential correction signals to vehicle 18. In this case, one or more of the base stations 20,21 receives and performs a mathematical analysis on all of the signals received from a number of base stations that cover the area under consideration and forms a mathematical model of the errors in the GPS signals over the entire area. For the CONUS, for example, a group of 13 base stations are operated by OmniStar that are distributed around the country. By considering data from the entire group of such stations, the errors in the GPS signals for the entire area can be estimated resulting in a one sigma position accuracy of about 6-10 cm over the entire area. The corrections can then be uploaded to the geocentric or low earth orbiting satellite 30 for retransmission to vehicles on the roadways. Alternately, the corrections can be made available to the vehicle via the Internet or other appropriate communication system. In this way, such vehicles are able to determine their absolute position to within about 6-10 centimeters. This is known as Wide Area Deferential GPS or WADGPS. The wide area corrections can be further corrected when there are additional local stations that are not part of the WADGPS system.

It is important to note that future GPS and Galileo satellite systems plan for the transmission of multiple frequencies for civilian use. Like a lens, the ionosphere diffracts different frequencies by different amounts and thus the time of arrival of a particular frequency will depend on the value of that frequency. This fact can be used to determine the amount that each frequency is diffracted and thus the delay or error introduced by the ionosphere. Thus with more than one frequency being emitted by a particular satellite, the approximate equivalent of the DGPS corrections can be determined be each receiver and there is no longer a need for DGPS, WADGPS, WAAS, LAAS and similar systems.

The WAAS system is another example of WADGPS for use with airplanes. The U.S. Government estimates that the accuracy of the WAAS system is about 1 meter in three dimensions. Since the largest error is in the vertical direction, the horizontal error is much less and can be better estimated if the vertical error is accurately known, as would be the case with accurate maps.

3. Maps and Mapping 3.1 Maps

All information regarding the road, both temporary and permanent, should be part of the map database, including speed limits, presence of guard rails, width of each lane, width of the highway, width of the shoulder, character of the land beyond the roadway, existence of poles or trees and other roadside objects, exactly where the precise position location apparatus is located, the location and content of traffic control signs, the location of variable traffic control devices, etc. The speed limit associated with particular locations on the maps should be coded in such a way that the speed limit can depend upon the time of day and/or the weather conditions. In other words, the speed limit is a variable that will change from time to time depending on conditions. It is contemplated that there will be a display for various map information which will always be in view for the passenger and for the driver at least when the vehicle is operating under automatic control. Additional user information can thus also be displayed such as traffic conditions, weather conditions, advertisements, locations of restaurants and gas stations, etc.

A map showing the location of road and lane boundaries can be easily generated using a specially equipped survey vehicle that has the most accurate position measurement system available. In some cases, it might be necessary to set up one or more temporary local DGPS base stations in order to permit the survey vehicle to know its position within a few centimeters. The vehicle can drive down the roadway while operators, using specially designed equipment, sight the road edges and lanes. This would probably best be done with laser pointers and cameras. Transducers associated with the pointing apparatus record the angle of the apparatus and then by triangulation determine the distance of the road edge or lane marking from the survey vehicle. Since the vehicle's position would be accurately known, the boundaries and lane markings can be accurately determined. It is anticipated that the mapping activity would take place continuously such that all roads in a particular state would be periodically remapped in order to record any changes which were missed by other monitoring systems and to improve the reliability of the maps by minimizing the chance for human error. Any roadway changes that were discovered would trigger an investigation as to why they were not recorded earlier thus adding feedback to the mapping part of the process.

The above-described method depends on human skill and attention and thus is likely to result in many errors. A preferred approach is to carefully photograph the edge of the road and use the laser pointers to determine the location of the road lines relative to the pointers and to determine the slope of the roadway through triangulation. In this case, several laser pointers would be used emanating from above, below and/or to the sides of the camera. The reduction of the data is then done later using equipment that can automatically pick out the lane markings and the reflected spots from the laser pointers. One aid to the mapping process is to place chemicals in the line paint that could be identified by the computer software when the camera output is digitized. This may require the illumination of the area being photographed by an infrared or ultraviolet light, for example.

In some cases where the roadway is straight, the survey vehicle could travel at moderate speed while obtaining the boundary and lane location information. In other cases, where the road in turning rapidly, more readings would be required per mile and the survey vehicle would need to travel more slowly. In any case, the required road information can be acquired semi-automatically with the survey vehicle traveling at a moderate speed. Thus, the mapping of a particular road would not require significant time or resources. It is contemplated that a few such survey vehicles could map all of the interstate highways in the U.S. in less than one year. Eventually, it is contemplated that between 50 and 100 such vehicles using photogramity techniques would continuously record images permitting the continuous mapping and remapping of most if not all public roads in the Unites States.

The mapping effort could be supplemented and cross-checked though the use of accurate detailed digital photogrammetic systems which, for example, can determine the road altitude with an accuracy to <50 cm. Efforts are underway to map the earth with 1-meter accuracy. The generated maps could be used to check the accuracy and for missing infrastructure or other roadside installations of the road-determined maps.

A preferred approach is to accomplish the majority of the mapping function utilizing a vehicle equipped with a selection of several cameras, accurate RTK DGPS and appropriate illumination including one or more eyesafe IR flood lights and/or one or more laser pointers or equivalent. The resulting pictures would initially be converted to maps manually but eventually most of the process could be automated. Such map creation can be economically accomplished by the Karpensky Institute in Kyiv, Ukraine. This institute in combination with the inventors herein have further designed a vehicle capable of collecting the required photographic data.

An alternate method of obtaining accurate maps is to use probe vehicles. In this case, one or more cameras, usually two or more, and a GPS receiver are mounted on each such vehicle. A receiver for obtaining WADGPS corrections is also preferably available on the vehicle although this is not essential for the mapping method discussed here. In one implementation the WADGPS corrections can be obtained from an Internet connection which can be a WiMAX connection, for example, or equivalent. Each camera can also have one or more associated laser pointers, or equivalent, that preferably operates in the near IR portion of the electromagnetic spectrum and in the eyesafe portion of the IR spectrum if the cameras used are sensitive to this wavelength.

The laser pointers can also be modulated in such a manner to permit the distance to the reflective point to be determined. As discussed elsewhere this can be accomplished with pulse modulation, frequency modulation with one or more frequencies, noise or pseudo noise modulation or any other modulation which permits the distance to the point of reflection to be determined. Alternately a distance can be determined without modulation provided the pointer is not co-located with the imager. In this case, the position on the image of the laser reflection permits the distance to the reflection point to be calculated by triangulation. By using two or more such laser pointers, the angle of a surface can also be estimated.

As the probe vehicle traverses a roadway it obtains images of the space around the vehicle and transmits these images or information derived therefrom to a remote station off of the vehicle, using a transmitter as described below, which may be part of a vehicle-mounted communication unit. This communication can occur in any of a variety of ways including cellphone, Internet using broadband such as WiMAX, LEO or GEO satellites or other telematics communication. The information can also be stored in memory on the vehicle for transmission at a later time.

In one implementation, the vehicle periodically transmits only the distance measured by the laser pointers, or other measurement system, over time and the location of the vehicle or camera as determined by the GPS or WADGPS system. Images for some time period can also be stored in memory. These distances can be calculated from images using triangulation or a modulated laser beam can be used to determine distances by time of flight or phase comparisons between the transmitted and received signals. If the remote station determines that images would be useful, for example if it indicates a change or error in the map, it can send a command to the probe vehicle to also upload one or more images. In this manner, the roads can be continuously monitored for changes and the maps kept continuously accurate. Such probe equipment can be reserved for government-owned vehicles or for those that are permitted access to restricted lanes or a special toll discount can be given as an incentive to those vehicle owners that have their vehicles so equipped.

The remote station can create and maintain a map database from the information transmitted by the probe vehicles. When a section of roadway was first traversed by such a probe vehicle, the remote station can request that a full set of images be sent from the probe vehicle depending on the available bandwidth. Additional images can be requested from other probe vehicles until the remote station determines that a sufficient set has been obtained. Thereafter only distance measurements could be requested until sufficient data has been obtained to permit the remote station to accurately determine the location of the roadway and then thereafter only if an anomaly is detected. Alternately, the probe vehicles can be used as an update mechanism for a map database that was created using special mapping vehicles. If the image data obtained by the probe vehicles is of an amount that would exceed transmission capacity, the images can be uploaded through a Wi-Fi connection when the vehicle is in a hot spot such as one set up for this purpose where the vehicle is parked at night, for example. In extreme cases, the image data can be transferred to a DVD and mailed to the service center. Each of these image transfer methods can also be used by a dedicated mapping vehicle with the DVD method being preferable since the image data could exceed many gigabytes from a day's data collection effort.

It is known that if a GPS receiver, let's call it receiver F, is placed at a fixed location that, with appropriate software, it can eventually accurately determine its location without the need for a survey. It accomplishes this by taking a multitude of GPS data as the GPS satellites move across the sky and applying appropriate algorithms that are known in the art. Here this concept is extended to where the GPS readings are acquired by multiple probe vehicles at various times of the day and under varying atmospheric (ionospheric) conditions. These vehicles also can record locations of objects in the infrastructure surrounding each vehicle, increasing the completeness and detail of the map database and recording changes in the presence and positions of such objects. For example, as a probe vehicle traverses a roadway it can measure its distance from a lamp pole, for example, on the left side of the vehicle and perhaps another fixed object on the right side of the vehicle, although this is not necessary. It also records the GPS readings taken just before the measurements to the light pole were taken. The probe vehicle can transmit these readings as well as the elapsed time and/or vector distance traveled since the GPS readings were acquired. Thus, the vehicle has information as to its absolute displacement since acquiring the GPS data and the distance to the lamp post relative to the probe vehicle. It can also calculate its best guess as to its location using the WADGPS correction data if available. Thus, the remote station can obtain an estimate of the location of the lamp post and, as with the receiver F, that will improve over time as more and more such data is received from more and more probe vehicles using data taken at different times and with different GPS, Galileo and/or Glonass satellites at different locations in the sky and under different ionospheric conditions. Distances to objects need not be actually measured since as the vehicle moves and its displacement between images and orientation at each image is known, the distances to various objects in the images can be calculated using trigonometry in a manner similar to distances determined from stereo photography. Some of these distance calculations can be made on the probe vehicle to permit anomaly and map error detection locally, whereas detailed calculations are better made (additionally or alternatively) at the remote station which would have greater processing power. Particular objects in an image can be considered as fiducial points and geo-tagged in the map database to aid the probe vehicles in determining their location and to determine changes or errors in the map database. Thus, the location of many items fixed in the infrastructure can be determined and their location accuracy continuously improved as more and more probe data is accumulated.

Technicians and/or computer programs at the remote station or elsewhere can then begin to construct an accurate map of the entire roadway by determining the location of the road edges and other features and objects that were not actually measured by estimating such coordinates from the images sent by the probe vehicles. The probe vehicles can compare their ongoing measurements with the current map database, using the geo-tagged fiducial points for example, and when an anomaly is discovered the remote station can be informed and new images and/or measurements can be uploaded to the remote station. Other map features that can be desirable in such a map database such as the character of the shoulder and the ground beyond the shoulder, the existence of drop-offs or cliffs, traffic signs including their text and traffic control devices, etc. can also be manually or automatically added to the database as needed to complete the effort.

By this method, an accurate map database can be created and continuously verified through the use of probe vehicles and a remote station that creates and updates the map database.

Although several approaches have been discussed above this invention is not limited thereby and other methods will now be apparent to those skilled in the art. These include the use of a structured light pattern projected onto the infrastructure, usually from a position displaced from the imager position, in addition to or in place of the laser pointers, among others. If the size and/or position in the image of a reflected pattern varies with distance, then this can provide a method of determining the distance from the probe vehicle to one or more objects or surfaces in the infrastructure through stereographic techniques from multiple images and knowledge of the vehicle's displacements between images and orientation at each image. This is especially useful if the location of the illumination light source is displaced axially, laterally or vertically from the imager. One particularly useful method is to project the structured image so that it has a focal point in front of the imager and thus the image reflected from the infrastructure will have a size on the image that will vary based on distance from the imager.

When processing multiple images at the remote station, using for example stereographic techniques, images or data derived from the images is converted to a map including objects from the images by identifying common objects in the images and using the position information from when the images were obtained to place the objects in the map. The images may be obtained from the same probe vehicle, taken at different times and including the same, common object, or from two or more probe vehicles and again, including the same, common object. Assuming the images used are taken from different locations, otherwise, it is possible to obtain the third dimension as in enhanced stereo, enhanced since the pictures are taken further apart than can be done with a stereo camera and thus the third dimension is more accurate. Stereo pictures are taken at the same time. By using more than two pictures, higher accuracy for the map is obtained.

By using a processor at the remote station that is off of the probe vehicles, yet in communication with all of the probe vehicles, images from multiple vehicles or the same vehicle taken at different times may be used to form the map. In addition, by putting the processor off of the probe vehicles, it is possible to make DGPS corrections without having equipment to enable such corrections on the probe vehicles.

By using the method above, an accurate map database can automatically be constructed and continuously verified without the need for special mapping vehicles or to supplement and improve the maps created from special mapping vehicle data. Other map information can now be incorporated in the map database at the remote station such as the locations, names and descriptions of natural and man made structures, landmarks, points of interest, commercial enterprises (e.g. gas stations, libraries, restaurants, etc.) along the roadway since their locations can have been recorded by the probe vehicles. Once a map database has been constructed using more limited data from a mapping vehicle, for example, additional data can be added using data from probe vehicles that have been designed to obtain different data than the mapping vehicle or the initial probe vehicles have obtained thereby providing a continuous enrichment and improvement of the map database. Additionally, the names of streets or roadways, towns, counties, or any other such location based names and other information can be made part of the map. Changes in the roadway location due to construction, land slides, accidents etc. can now be automatically determined by the probe vehicles. These changes can be rapidly incorporated into the map database and transmitted to vehicles on the roadway as map updates. These updates can be transmitted preferably by means of a ubiquitous Internet such as WiMAX, or equivalent, or any other appropriate telematics method.

A variation of this invention is to develop accurate maps from a plurality of probe vehicles at a remote station separate and apart from all of the probe vehicles without the need for the making of measurements using lasers or other such devices as discussed above. In this implementation, the probe vehicles would transmit pictures or images, or data derived therefrom, from vehicle-mounted cameras along with its GPS coordinates. In fact, the calculation of such coordinates could also be done by a remote station and the probe vehicle would only need to send a minimum of information which, with the added information available at the remote station, would accurately determine the vehicle's location. Differential corrections, for example, can be used at the remote station and need not be considered in the probe vehicles thus removing the calculation and telematics load from the probe vehicle. See, for example, U.S. Pat. No. 6,243,648 and similar techniques described in the patents assigned to the current assignee as referenced above. The remote station, for example, could know the DGPS corrections for the approximate location of the vehicle at the time that the images or GPS readings were acquired. Over time the remote station would know the exact locations of infrastructure resident features such as the lamppost discussed above in a manner similar to receiver F discussed above.

In this implementation, the remote station would know the mounting locations of the vehicle-mounted cameras, the GPS receivers and IMU on the vehicle and relative to one another and view angles of the vehicle-mounted cameras and its DGPS corrected position which should be accurate within 10 cm or less, one sigma. By monitoring the movement of the vehicle and the relative positions of objects in successive pictures from a given probe vehicle and from different probe vehicles, an accurate three dimensional representation of the scene can be developed over time even without actual distance measurements. Of course, to the extent that other information can be made available the map can be more rapidly improved. Such information can come from other sensors such as laser radar, range gating, radar or other ranging or distance measurement devices or systems. Images from one or more probe vehicles can be combined using appropriate software to help create the three dimensional representation of the scene in much the same way that multiple views are similarly combined as illustrated at labs.live.com/photosynth/welcome_frame.htm, a Microsoft developed system.

Another aspect of this technique is based on the fact that much in the infrastructure is invariant and thus once it is accurately mapped, a vehicle with one or more mounted cameras and/or range determining devices (range meters) can accurately determine its position without the aid of DGPS. This is a form of the precise positioning system discussed elsewhere herein. In the camera case, the vehicle can contain software that can align a recently acquired image with one from the map database and from the alignment process accurately determine its location.

Another improvement that can be added to the system based on the maps is to use a heads-up display for in-vehicle signage. As the vehicle travels down the road, the contents of roadside signs can be displayed on a heads up display, providing such a display is available in the vehicle, or on a specially installed LCD display. This is based on the inclusion in the map database of the contents of all highway signs. A further improvement can be to include signs having varying messages which would require that the message be transmitted by the sign to the vehicle and received and processed for in-vehicle display. This could be done either directly, by satellite, the Internet, cell phone etc.

Map improvements can include the presence and locations of points of interest and commercial establishments providing location-based services. Such commercial locations can pay to have an enhanced representation of their presence along with advertisements and additional information which may be of interest to a driver. This additional information could include the hours of operation, gas price, special promotions etc. Again, the location of the commercial establishment can be obtained from special mapping vehicles or probe vehicles and the commercial establishment can pay to add additional information to the database.

As the roadway is being mapped, the availability of GPS satellite view and the presence of multipath reflections from fixed structures can also be determined. This information can then be used to determine the advisability of locating a local precise location system (PPS), geo-tagged fiducial point or other infrastructure, at a particular spot on the roadway. Cars can also be used as probes for this process and for continuous improvement to check the validity of the maps and report any errors or additions to the infrastructure.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

3.2 Mapping

An important part of some embodiments of the invention is the digital map that contains relevant information relating to the road on which the vehicle is traveling. The digital map usually includes the location of the edge of the road, the edge of the shoulder, the elevation and surface shape of the road, the character of the land beyond the road, trees, poles, guard rails, signs, lane markers, speed limits, etc. as discussed in more detail elsewhere herein. Additionally, it can contain the signature as discussed above. This data or information is acquired in a unique manner for use in the invention and the method for acquiring the information either by special or probe vehicles and its conversion to a map database that can be accessed by the vehicle system is part of this invention. One method for the acquisition of the data for the maps using special mapping vehicles will now be discussed. It must be appreciated though that the method for acquiring the data and forming the digital map can also be used in other inventions.

Local area differential GPS can be utilized to obtain maps with an accuracy of about 2.0 cm (one sigma). Temporary local differential stations are available from such companies as Trimble Navigation. These local differential GPS stations can be placed at an appropriate spacing for the road to be mapped, typically every 30 kilometers. Once a local differential GPS station is placed, it requires some time period such as an hour or more for the station to determine its precise location. Therefore, sufficient stations are required to cover the area that is to be mapped within, for example, four hours. This may require as many as 10 or more such differential stations for efficient mapping. Naturally, these local differential stations can become permanent installations if the vehicle location accuracy desired is greater than that achievable from wide area DGPS.

Figure 7:
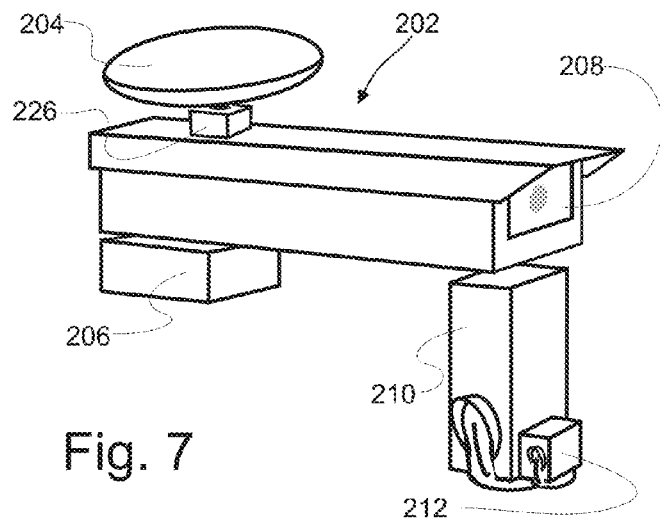
FIG. 7 is a schematic perspective view of a data acquisition module in accordance with the invention.
Figure 7A:
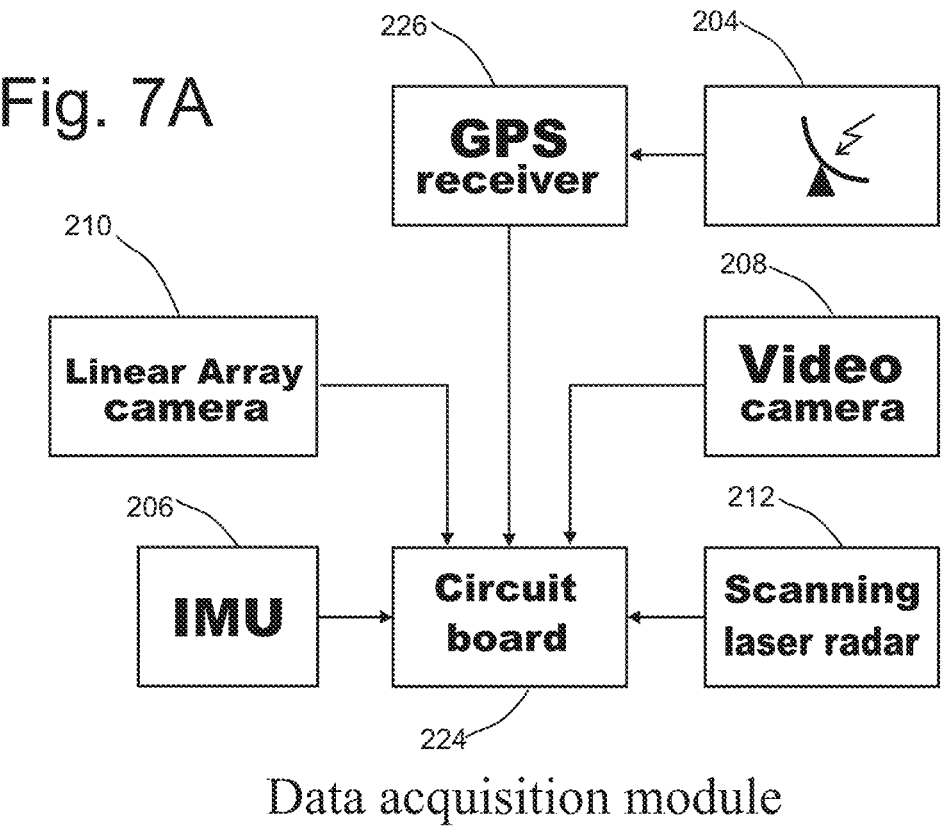
FIG. 7A is a schematic view of the data acquisition module in accordance with the invention.

With reference to FIGS. 16A, 16B, 17 and 17A, a probe or mapping vehicle 200 can be used and obtains its location from GPS satellites and its corrections from the local differential stations using, for example, RTK DGPS. Such a system is capable of providing the 2 cm accuracy desired for the map database. Typically, at least two GPS receivers 226 are mounted on the mapping vehicle 200. Each GPS receiver 226 is contained within or arranged in connection with a respective data acquisition module 202, which data acquisition modules 202 also can contain a GPS antenna 204, an accurate inertial measurement unit (IMU) 206, a forward-looking video camera 208, a downward and outward looking linear array camera 210 and a scanning laser radar 212. The relative position of these components in FIG. 7 is not intended to limit the invention and they may or may not be grouped within one or more housings.

The inertial measurement unit 206 may have any form known to those skilled in the art, provided it is designed to output at least one inertial characteristic of the vehicle, e.g., acceleration or angular motion. For example, it may have the same construction as the inertial reference unit, inertial navigation system or IMU 44 described above.

A processor including a printed circuit board 224 is coupled to the GPS receivers 226, the IMUs 206, the video cameras 208, the linear cameras 210 and the scanning laser radars 212 (see FIG. 17A). Of course, all of these devices may not be used in a particular implementation. One particularly successful design comprises GPS and DGPS receivers, 2

IMUs, 2 to 4 cameras and 2 to 8 laser pointers which are mounted displaced from the cameras. The processor 224 receives information regarding the position of the vehicle from the GPS receivers 226, and optionally the IMUs 206, and the information about the road from both linear cameras 210, if present, or from both laser radars 212, or from all of the linear cameras 210 and laser radars 212, and records the data for later processing, e.g., at a remote station, to form the road map database. Other information about the character of the road can also come from one or both of the video cameras 208 and be incorporated into the recorded data for later processing.

An alternate preferred approach uses a series of 4-6 cameras looking forward, backward, and one, two or more on each side. In this configuration the linear cameras and scanning laser radars can be omitted and all relevant information would come from the IMU and GPS with differential corrections. The scene may be illuminated with general illumination which can be in the IR part of the spectrum and in particular in the eyesafe portion of the spectrum (wave lengths greater than 1.4 microns) permitting greater illumination intensities to be used. In some cases laser pointers or another form of structured light can also be used primarily to permit later analysis of various elevation changes especially at the side of the roadway. The resulting data is analyzed using photogramity techniques to obtain a fully digital map, and specifically a three-dimensional digital map.

In the data acquisition module 202 on the probe vehicle 200, one of the cameras, 208, 210, one or more of the GPS receivers 226, the IMU 206 are accurately positioned relative to each other and thus the mounting of the data acquisition unit 202 on the vehicle 200 does not need to be accurate. This accurate positioning is known to the processor at the remote station that is converting the image data into a map, and used by the processor when creating the map. Use of an IMU in the data acquisition module 202 is advantageous because GPS typically only provides an update every 1 second or so and a vehicle can move 88 feet in that time at about 60 mph. The IMU 206 is therefore extremely desirable when the vehicle is moving to accurately locate the vehicle's linear and angular positions.

The set configuration of the cameras 208, 210, GPS receivers 226 or other position determining system and IMU 206 or other inertial measuring system, which is used by the processor when creating the map, enables the position of each camera 208, 210, or a camera package including one or more of the cameras 208, 210, to be determined in several different ways. In one way, the position of the camera package is determined by a processor in the camera package from data from the GPS receivers 226 and the IMU 206 on the vehicle and that position information is sent to the remote location where corrections may be made based on the known errors in the GPS due to ionosphere distortions. Thus, there is an additional processor in this embodiment on the vehicle, i.e., a vehicle-resident processor, that determines the position of the cameras 208, 210 providing images and this camera position is transmitted via the communications unit to the off-vehicle processor at the remote location. In another embodiment, the data from the GPS receivers 226 and the data from the IMU 206 is sent to the remote location where the GPS data is corrected first by the known ionosphere distortions and then by the IMU data.

The GPS accuracy that can be determined at the camera package, in the first embodiment, is improving as more frequencies are made available and even now a remote site can easily send the GPS corrections to the camera package since they change slowly. The remote site that sends these corrections may not need to be the same site that receives the camera transmissions.

Accordingly, in one embodiment, the communications unit receives GPS corrections from a remote location and determines its accurate position from the data provided by the on-board GPS receivers 226 and data from the IMU 206. Preferably, the position of the cameras 208, 210 relative to the GPS receivers 226 and IMU 206 is known to enable optimum correction of the position information derivable from the GPS data and IMU data. In this case, the on-board processor would factor in the positioning relationship between the cameras 208, 210, GPS receivers 226 and IMU 206 to determine position of objects in images that are converted to the map by the off-vehicle processor.

The map database can be of any desired structure or architecture. Preferred examples of the database structure are of the type discussed in U.S. Pat. No. 6,144,338 (Davies) and U.S. Pat. No. 6,247,019 (Davies).

When mapping an area using the foregoing mapping arrangements, or others disclosed herein, the mapping vehicle 200 can also record fixed or invariant information from the transmissions of any fixed radio frequency transmitters such as cell phone towers, TV antennas, radio antennas etc., and since there will be invariant patterns from these or a combination of these transmitters that would be unique to each location on the earth, this fact can be used to subsequently determine where a person or vehicle is. Since the patterns may be complicated involving multipath signals, for example, it is envisioned that an artificial neural network (ANN) system or an AAS system would be useful to sort the situation out.

The data acquisition modules 202 are essentially identical and each can mount to the vehicle roof on an extension assembly 214 which extends forward of the front bumper. Extension assembly 214 can include a mounting bracket 216 from the roof of the vehicle 200 forward to each data acquisition module 210, a mounting bracket 218 extending from the front bumper upward to each data acquisition module 202 and a cross mounting bracket 220 extending between the data acquisition modules 202 for support. Since all of the data acquisition equipment is co-located in this implementation, its precise location is accurately determined by the IMU, the mounting location on the vehicle and the differential GPS system.

The forward-looking video cameras 208 can provide views of the road as shown in FIG. 8. These cameras 208 permit the database team to observe the general environment of the road and to highlight any anomalies. They also permit the reading of traffic signs and other informational displays all of which can be incorporated into the database. This sign information can also be displayed within the vehicle, for vehicles having an onboard camera, and the display can persist after the sign can no longer be observed or read. The cameras 208 can be ordinary color video cameras, high-speed video cameras, wide angle or telescopic cameras, black and white video cameras, infrared cameras, etc. or combinations thereof. In some cases, special filters are used to accentuate certain features. For example, it has been found that lane markers frequently are more readily observable at particular frequencies, such as infrared. In such cases, filters can be used in front of the camera lens or elsewhere in the optical path to block unwanted frequencies and pass desirable frequencies. Using a camera that has been constructed to be sensitive to infrared in conjunction with general IR illumination can, by itself, improve lane absorbability either with or without special filters. Polarizing lenses have also been found to be useful in many cases. Natural illumination can be used in the mapping process, but for some particular cases, particularly in tunnels, artificial illumination can also be used in the form of a floodlight or spotlight that can be at any appropriate frequency of the ultraviolet, visual and infrared portions of the electromagnetic spectrum or across many frequencies with IR being the preferred illumination, when illumination is desired, especially when the mapping vehicle is operating while the road is in use by others. Laser scanners can also be used for some particular cases when it is desirable to illuminate some part of the scene with a bright spot. In some cases, a scanning laser rangemeter can be used in conjunction with the forward-looking cameras 204 to determine the distance to particular objects in the camera view. The scanning laser rangemeter determines distance to a reflection point by time of flight or phase comparisons of a modulated beam between the transmitted and received signals. Other geometries of the mapping vehicle are not excluded from this general description of one simplified arrangement.

The video camera system can be used by itself with appropriate software as is currently being done by Lamda Tech International Inc. of Waukesha, Wis., to obtain the location of salient features of a road. However, such a method to obtain accurate maps is highly labor intensive and therefore expensive. The cameras and associated equipment in the present invention are therefore primarily used to supplement the linear camera and laser radar data acquisition systems to be described now. This however is one approach with preferred alternate approaches using a dedicated mapping vehicle with four, five, six or more cameras or the probe vehicles or a combination thereof as described above.

In this approach, the mapping vehicle data acquisition modules will typically contain both a linear camera and a scanning laser radar, however, for some applications one or the other may be omitted.

The linear camera 210 is a device that typically contains a linear CCD, CMOS or other light sensitive array of, for example, four thousand pixels. An appropriate lens provides a field of view to this camera that typically extends from approximately the center of the vehicle out to the horizon. This camera records a one-dimensional picture covering the entire road starting with approximately the center of the lane and extending out to the horizon. This linear array camera 210 therefore covers slightly more than 90 degrees. Typically, this camera operates using natural illumination and produces effectively a continuous picture of the road since it obtains a linear picture, or column of pixels, for typically every one-inch to a few inches of motion of the vehicle depending on the resolution desired. This resolution can depend on whether a sign, tree or pole location is to be obtained and thus can be a variable controlled in part by the forward looking cameras. Thus, a complete two-dimensional panoramic view of the road traveled by the mapping vehicle is obtained. Since there are two such linear camera units, a 180 degree view is obtained. This camera will typically record in full color thus permitting the map database team to have a complete view of the road looking perpendicular from the vehicle. The view is recorded in a substantially vertical plane. This camera will not be able to read text on traffic signs, thus the need for the forward-looking cameras 208. Automated software can be used with the images obtained from these cameras 208, 210 to locate the edge of the road, lane markers, the character of land around and including the road and all areas that an errant vehicle may encounter. The full color view allows the characterization of the land to be accomplished automatically with minimal human involvement.

The scanning laser radar 212 is typically designed to cover a 90 degree or less scan thus permitting a rotating mirror to acquire at least four such scans per revolution. The scanning laser radar 212 can be coordinated or synchronized with the linear camera 210 so that each covers the same field of view with the exception that the camera 210 typically will cover more than 90 degrees. Scanning laser radar 212 can be designed to cover more or less than 90 degrees as desired for a particular installation. The scanning laser radar 212 can operate in any appropriate frequency from above ultraviolet to the terahertz. Typically, it will operate in the eye-safe portion of the infrared spectrum for safety reasons, that is, at wavelengths above 1.4 microns. The scanning laser radar 212 can operate either as a pulse-modulated or a tone-modulated laser as is known in the art. If operating in the tone-modulated regime, the laser light will be typically modulated with three or more frequencies in order to eliminate distance ambiguities. Noise or code modulated radar can also be used.

For each scan, the laser radar 212 provides the distance from the scanner to the ground for up to several thousand points in a vertical plane extending from approximately the center of the lane out to near the horizon. This device therefore provides precise distances and elevations to all parts of the road and its environment. The precise location of signs that were observed with the forward-looking cameras 204, for example, can now be easily and automatically retrieved. The scanning laser radar therefore provides the highest level of mapping automation.

Scanning laser radars have been used extensively for mapping purposes from airplanes and in particular from helicopters where they have been used to map portions of railway lines in the US. Use of the scanning laser radar system for mapping roadways where the radar is mounted onto a vehicle that is driving the road is believed to be novel to the current assignee.

An alternate simpler and lower cost approach is to project structured light onto the field of view of the linear camera from a location vertically displaced from the linear camera. Such a pattern can consist of a series of dots which through triangulation can be used to get the distance to the reflection points based on the location of the dots in the image.

Ideally, a combination of the above-described systems are present on the mapping vehicle. Although there is considerable redundancy between the linear camera and the scanning laser radar, the laser radar typically operates at one optical frequency and therefore does not permit the automatic characterization of the roadway and its environment. The linear camera in contrast can be a color camera.

As with the forward-looking cameras, it is frequently desirable to use filters and polarizing lenses for both the scanning laser radar and the linear camera. In particular, reflections from the sun can degrade the laser radar system unless appropriate filters are used to block all frequencies except frequency chosen for the laser radar which can be in a chosen portion of the IR spectrum where there is a minimum of solar radiation.

Laser radars are frequently also referred to as ladars and lidars. All such devices that permit ranging to be accomplished from a scanning system, including radar, are considered equivalent for the purposes of this invention.

3.3 Map Enhancements

Once the road edge and lane locations, and other roadway information, are transmitted to the operator of the vehicle, or otherwise included in the database (for example upon initial installation of the system into a vehicle), it requires very little additional bandwidth to include other information such as the location of all businesses that a traveler would be interested in such as gas stations, restaurants etc. which could be done on a subscription basis or based on advertising as described above.

Communication of information to the operator could be done either visually or orally as described in U.S. Pat. No. 5,177,685 or 7,126,583. Finally, the addition of a route guidance system as described in other patents becomes even more feasible since the exact location of a destination can be determined. The system, schematically represented by FIG. 3 described in detail below, can be configured so that a vehicle operator could enter a phone number, for example, or an address or other location unique information and the vehicle, if desired, could be automatically and safely driven to that location. Since the system knows the location of the edge of every roadway and is coupled to servo on the vehicle which control the movement of the vehicle, very little, if any, operator intervention would be required. Even a cell phone number can be used if the cell phone has the SnapTrack or other GPS location system as provided by Qualcomm and others.

In such an embodiment, the processor 100 would be coupled to the operator controls 98, or another form of a user interface, to enable the driver or other occupant of the vehicle to enter a phone number to be analyzed by processor 100. The vehicle occupant can therefore enter a destination phone number into the processor 100, or a navigation and route guidance system portion thereof, in a similar manner as it is now possible to enter a destination address into a navigation or route guidance system which would navigate the driver to the destination by providing oral directions and/or visual directions on a display 82. However, in the invention, the processor 100 would convert the phone number to the desired physical location, or otherwise determine the physical location associated with the entered phone number, and automatically control the vehicular systems, e.g., the brake servo 70, the steering servo 72, and the throttle servo 74, to cause the vehicle to travel to the desired location.

The foregoing will only work when the entered phone number corresponds to the physical address or location the driver or other vehicle occupant wants to arrive at. If the phone number does not correspond to the physical address, its entry into the processor 100 will cause the vehicle to travel to a non-desired location. Thus, the phone number should be a land line or another form of a fixed phone number which does not change its location, and which can be correlated to a physical location. This may be possible using look up tables stored in a database in the same unit as processor 100, or using reverse phone directories on the Internet, for example, which are accessed via a communications unit coupled to the processor 100. Such reverse directories that allow the processor to find the address assigned to a phone number. It would also be possible to verify that the entered phone number corresponds to a fixed physical location before proceeding to guide the vehicle to the physical location. Otherwise, if the location were variable, the vehicle might be directed to an "old" location at which the phone was location but is not currently situated at.

It is envisioned that the same technique could be used for cell phones or other mobile terminals since cell phones now often have GPS capabilities and thus, entering a cell phone number into the system would cause the vehicle to be directed to the location of the cell phone, assuming that is the desired location. In one embodiment, the navigation and route guidance system portion of the processor 100 may be arranged to contact the user of the cell phone (via an incoming call or instant message), and if permission is given by the cell phone user, the cell phone could send its location to the navigation and route guidance system of processor 100 which would then guide the vehicle to the vicinity of the cell phone. Guiding the vehicle may be achieved using the guide systems described above, i.e., the steering, throttle and brake servos 70, 72, 74, or other suitable automatic vehicular route guidance systems.

The foregoing system, which enables an occupant of a vehicle to enter a phone number and have the vehicle be provided with commands for its vehicular systems to cause the vehicle to travel to the location associated with the phone number, can also be applied to a hand-held system. In this case, a person has a computer with a processor, similar to processor 100 but without the vehicular functions, which can be held in their hands and enters a phone number via operator controls, e.g., a keyboard. The processor 100 determines the physical location associated with the entered phone number, e.g., using a look-up table in a database or accessing a reverse directory on the Internet or other communications network, and then provides instructions for the person to be guided to the location of the phone number. The instructions can be provided orally and/or visually on a display of the hand-held unit. This arrangement would be very useful for two or more people trying to locate each other in a city, for example.

Very large map databases can now reside on a vehicle as the price of memory continues to drop. Soon it may be possible to store the map database of an entire country on the vehicle and to update it as changes are made. The area that is within, for example, 1000 miles from the vehicle can certainly be stored and as the vehicle travels from place to place the remainder of the database can be updated as needed though a connection to the Internet, for example.

In view of the foregoing, the invention contemplates a method for providing map information to an operator of a vehicle in which a map database is formed to reside on the vehicle, e.g., after installation on the vehicle, and which includes for example, data about lanes that the vehicle can travel on locations of a boundary or edges of the travel lanes, data about traffic control devices in the database, data about guard rails along travel lanes and/or data about inanimate objects such as poles and trees alongside the travel lanes. The database is managed to ensure that it has current information about a travel lane on which the vehicle is currently situated. This may entail establishing wireless communications to the vehicle to enable data to be provided to the database, e.g., from other vehicles and/or from infrastructure. Additional details of managing a map database are described below with reference to FIGS. 4 and 5.

Among other features, management of the database may include transmitting from the vehicle requests, for example, to other vehicles, a central map management facility or infrastructure, to ascertain whether the database has current map data for the current location of the vehicle and surrounding locations. For example, a latest date and time of each segment of the map database may be broadcast to that portion of earth covered by the map database segment to enable the vehicle, when it approaches or enters each discrete portion of earth, to compare its date and time of the map database segment with the broadcast latest date and time. If the processor of the vehicle realizes that its date and time of a file of the map database segment differ from the broadcast date and time, it can initiate a transmission to receive the latest map data for inclusion in its database or simply be programmed to accept and process a transmission of the map data. If the database has the latest map data, the processor can be designed to prevent processing of the transmitted map data since it is unnecessary. The map data may be received using vehicle-to-vehicle communication, infrastructure-to-vehicle communication, Internet communication or a communications system in the vehicle. Map data may also be transmitted to the vehicle for a section to be traveled by the vehicle to be included in the database from infrastructure as the vehicle passes by the infrastructure in advance of the section to be traveled. The database may be limited to map data within a predetermined distance from the vehicle and additional map data provided to the database for areas of earth for map data is not included in the database via a wireless communication to the vehicle as the vehicle travels toward the area of earth for which map data is not included in the database. Map data from the database may be displayed to an occupant of the vehicle.

An exemplifying arrangement for providing map information to an operator of a vehicle includes a database arranged in the vehicle as described above, a communications system arranged on the vehicle and arranged to establish communications with other vehicles and/or infrastructure, and a processor coupled to the database and the communications system for managing the database to ensure that the database has current information about a travel lane on which the vehicle is currently situated. When necessary, the processor establishes wireless communications via the communications system to enable data to be provided to the database.

4. Precise Positioning

Another important aid as part of some of the inventions disclosed herein is to provide markers along the side(s) of roadways which can be either visual, passive or active transponders, reflectors, or a variety of other technologies including objects that are indigenous to or near the roadway, which have the property that as a vehicle passes the marker it can determine the identity of the marker and from a database it can determine the exact location of the marker. The term "marker" is meant in the most general sense. The signature determined by a continuous scan of the environment, for example, would be a marker if it is relatively invariant over time such as, for example, buildings in a city. Basically, there is a lot of invariant information in the environment surrounding a vehicle as it travels down a road toward its destination. From time to time, a view of this invariant landscape or information may be obstructed but it is unlikely that all of it will be during the travel of a mile, for example. Thus, a vehicle should be able to match the signature sensed with the expected one in the map database and thereby obtain a precise location fix. This signature can be obtained through the use of radar or laser radar technologies as reported elsewhere herein. If laser radar is used then an IR frequency can be chosen in the eyesafe part of the spectrum. This will permit higher transmitted power to be used which, especially when used with range gating, will permit the penetration of a substantial distance through fog, rain or snow. See in particular Section 5 below and for example, Wang Yanli, Chen Zhe, "Scene matching navigation based on multisensor image fusion" SPIE Vol. 5286 p. 788-793, 2003 and more recently "Backing up GNSS with laser radar & INS, RAIM in the city, antenna phase wind-up", Inside GNDD July/August 2007.

For the case of specific markers placed on the infrastructure, if three or more of such markers are placed along a side of the roadway, a passing vehicle can determine its exact location by triangulation. Note that even with two such markers using radar with distance measuring capability, the precise position of a vehicle can be determined as discussed below in reference to the Precise Positioning System. In fact, if the vehicle is only able to observe a single radar or lidar reflector and take several readings as the reflector is passed, it can determine quite accurately its position based on the minimum distance reading that is obtained during the vehicle's motion past the reflector and/or the angular orientation of the reflector. Although it may be impractical to initially place such markers along all roadways, it would be reasonable to place them in particularly congested areas or places where it is known that a view of one or more of the GPS satellites is blocked. A variation of this concept will be discussed below.

Although initially it is preferred to use the GPS navigational satellites as the base technology, the invention is not limited thereby and contemplates using all methods by which the location of the vehicle can be accurately determined relative to the earth surface. The location of the roadway boundaries and the location of other vehicles relative to the earth surface are also to be determined and all relevant information used in a control system to substantially reduce and eventually eliminate vehicle accidents. Only time and continued system development will determine the mix of technologies that provide the most cost effective solution. All forms of information and methods of communication to and between vehicles are contemplated including direct communication with stationary and moving satellites, communication with fixed earth-based stations using infrared, optical, terahertz, radar, radio and other segments of the electromagnetic spectrum, direct or indirect communication with the Internet and inter-vehicle communication. Some additional examples follow:

A pseudo-GPS can be delivered from cell phone stations, in place of or in addition to satellites. In fact, the precise location of a cell phone tower need not initially be known. If it monitors the GPS satellites over a sufficiently long time period, the location can be determined as the calculated location statistically converges to the exact location. Thus, every cell phone tower could become an accurate DGPS base station for very little cost. DGPS corrections can be communicated to a vehicle via FM radio via a sub-carrier frequency for example. An infrared or radar transmitter along the highway can transmit road boundary location information. A CD-ROM or DVD or other portable mass storage can be used at the beginning of a controlled highway to provide road boundary information to the vehicle. Finally, it is contemplated that eventually a satellite will broadcast periodically, perhaps every five minutes, a table of dates covering the entire CONUS that provides the latest update date of each map segment. If a particular vehicle does not have the latest information for a particular region where it is operating, it will be able to use its cell phone, broadband internet connection (such as WiMAX) or other communication system to retrieve such road maps perhaps through the Internet or from an adjacent vehicle. Emergency information would also be handled in a similar manner so that if a tree fell across the highway, for example, all nearby vehicles would be notified.

To implement map updating, a signal may be directed by the infrared or radar transmitter to the area covered by a segment of the map relating to the latest update information for that segment in a form receivable by a receiver on vehicles passing through the area. A processor on the vehicle receives the signals, analyzes it and determines whether its map includes the latest updated map information for the segment in which the vehicle is presently located. If not, an update for the vehicle's map information is downloaded from the transmitter via the receiver. This embodiment is particularly advantageous when the transmitter is arranged before a section of road and thus provides vehicles entering the road and in range of the transmitter with the map data they will subsequently need.

The transmitter which transmits information to the vehicle, weather map information or other information, may be movable and thus would be particularly useful for roads undergoing construction, subject to closure or blockage in view of construction or other factors, or for which map data is not yet available. In this case, the movable, temporary transmitter would be able to provide map data for the affected section of road to vehicles in range of the transmitter. As the transmitter is moved along the roadway, the information transmitted can be changed.

One of the possible problems with the RtZF® system described herein is operation in areas of large cities such as lower Manhattan. In such locations, unless there are a plurality of local pseudolites or precise position location system installations or the environment signature system is invoked such as with adaptive associative memories as described below, the signals from the GPS satellites can be significantly blocked. Also, there is frequently a severe multipath problem in cities. A solution is to use the LORAN system as a backup for such locations. The accuracy of LORAN can be comparable to DGPS. Use of multiple roadway-located Precise Positioning Systems would be a better solution or a complementary solution. Additionally, some location improvement can result from application of the SnapTrack system as described in U.S. Pat. No. 5,874,914 and other patents to Krasner of SnapTrack or similar systems.

The use of geo-synchronous satellites as a substitute for earth bound base stations in a DGPS system, with carrier phase enhancements for sub-meter accuracies, is also a likely improvement to the RtZF® system that can have a significant effect in urban areas.

Another enhancement that would be possible with dedicated satellites and/or earth bound pseudolites results from the greater control over the information transmitted than is available from the present GPS system. Recognizing that this system could save in excess of 40,000 lives per year in the U.S. alone, the cost of deploying such special purpose stations can easily be justified. For example, say there exists a modulated wave that is 10000 kilometers long, another one which is 1000 km long etc. down to 1 cm. It would then be easy to determine the absolute distance from one point to the other. The integer ambiguity of RTK DGPS would be eliminated. Other types of modulation, including pseudonoise modulation, are of course possible to achieve the desired result of simply eliminating the carrier integer uncertainty that is discussed in many U.S. patents and other literature. This is not meant to be a recommendation but to illustrate that once the decision has been made to provide information to every vehicle that will permit it to always know its location within 10 cm, many technologies will be there to make it happen. The cost savings resulting from eliminating fatalities and serious injuries will easily cover the cost of such technologies many times over. The provision of additional frequencies can also enhance the system and render differential corrections unnecessary. Each frequency from a satellite is diffracted differently by the ionosphere. The properties of the ionosphere can thus be determined if multiple frequencies are transmitted. This will partially be achieved with the launch of the European Galileo GPS satellite system as well as others by Japan, Russia and China in combination with the U.S. GPS system.

It is expected, especially initially, that there will be many holes in the DGPS or GPS and their various implementations that will leave the vehicle without an accurate means of determining its location. The inertial navigation system described above will help in filling these holes but its accuracy is limited to a time period significantly less than about an hour and a distance of less than about 50 miles before it needs correcting. That may not be sufficient to cover the period between DGPS availability. It is therefore contemplated that the RtZF® system will also make use of low cost systems located along the roadways that permit a vehicle to accurately determine its location.

Such a position-determination assistance system could include a plurality of transmitters placed on or alongside a road, with signals from the transmitters being directed to an area in the path of a traveling vehicle to enable the vehicle to determine its position using the transmitted signals and information about the position of the transmitters. Positional information about the transmitters either being previously provided to the vehicle's processor, e.g., from a map database, or along with the transmission. The transmitters may be a group of a linked MIR, IR or RF transmitters which direct signals to a common area through which vehicles pass. Alternatively, the transmitters may be a group of a plurality of RFID devices, in which case, one or more interrogators are arranged on the vehicle to cause the RFID devices to direct signals in response to an interrogation signal from the interrogator.

One example of such a system would be to use a group of three Micropower Impulse Radar (MIR) units such as developed by Lawrence Livermore Laboratory.

A MIR operates on very low power and periodically transmits a very short spread spectrum radar pulse. The estimated cost of a MIR is less than $10 even in small quantities. If three such MIR transmitters, 151, 152 and 153, as shown in FIG. 11, are placed along the highway and triggered simultaneously or with a known delay, and if a vehicle has an appropriate receiver system, the time of arrival of the pulses can be determined and thus the location of the vehicle relative to the transmitters determined. The exact location of the point where all three pulses arrive simultaneously would be the point that is equidistant from the three transmitters 151, 152, 153 and would be located on the map database information. Only three devices are required since only two dimensions need to be determined and it is assumed that the vehicle in on the road and thus the vertical position is known, otherwise four MIRs would be required. Thus, it would not even be necessary to have the signals contain identification information since the vehicle would not be so far off in its position determination system to confuse different locations. By this method, the vehicle would know exactly where it was whenever it approached and passed such a triple-MIR installation. The MIR triad PPS or equivalent could also have a GPS receiver and thereby determine its exact location over time as described above for cell phone towers. After the location has been determined, the GPS receiver can be removed. In this case, the MIR triad PPS or equivalent could be placed at will and they could transmit their exact location to the passing vehicles. An alternate method would be to leave the GPS receiver with the PPS and transmit the time of arrival of the GPS data from each satellite so that the passing vehicles that do not go sufficiently close to the PPS can still get an exact location fix. A similar system using RFID tags is discussed below.

Several such readings and position determinations can be made with one approach to the MIR installation, the vehicle need not wait until they all arrive simultaneously. Also the system can be designed so that the signals never arrive at the same time and still provide the same accuracy as long as there is a sufficiently accurate clock on board the vehicle. One way at looking at FIG. 5 is that transmitters 151 and 152 fix the lateral position of the vehicle while transmitters 151 and 153 fix the location of the vehicle longitudinally. The three transmitters 151,152,153 need not be along the edges of one lane but could span multiple lanes and they need not be at ground level but could be placed sufficiently in the air so that passing trucks would not block the path of the radiation from being received by an automobile. Particularly in congested areas, it might be desirable to code the pulses and to provide more than three transmitters to further protect against signal blockage or multipath from other vehicles, for example.

The power requirements for the MIR transmitters are sufficiently low that a simple photoelectric cell array can provide sufficient power for most if not all CONUS locations. With this exact location information, the vehicle can become its own DGPS station and can determine the corrections necessary for the GPS. It can also determine the integer ambiguity problem and thereby know the exact number of wave lengths between the vehicle and the satellites or between the vehicle and the MIR or similar station. These calculations can be done on vehicle if there is a connection to a network, for example. This would be particularly efficient as the network, once it had made the calculations for one vehicle, would have a good idea of the result for another nearby vehicle and for other vehicles passing the same spot at a different time. This network can be an ad-hoc or mesh network or the Internet using WiMAX, for example. Alternately the information can be broadcast from the vehicle.

MIR is one of several technologies that can be used to provide precise location determination. Others include the use of an RFID tag that is designed in cooperation with its interrogator to provide a distance to the tag measurement. Such as RFID can be either an active device with an internal battery or solar charger or a passive device obtaining its power from an RF interrogation signal to charge a capacitor or a SAW-based tag operating without power. Passive tags require very close reading distances, however. An alternate and preferred system uses radar or other reflectors where the time of flight can be measured, as disclosed in more detail elsewhere herein.

Once a vehicle passes a Precise Positioning Station (PPS) such as the MIR triad described above, the vehicle can communicate this information to surrounding vehicles. If the separation distance between two communicating vehicles can also be determined by the time-of-flight or equivalent method, then the vehicle that has just passed the triad can, in effect, become a satellite equivalent or moving pseudolite. That is, the vehicle sends (such as by reflection so as not to introduce a time delay) its GPS data from the satellite and the receiving vehicle then gets the same message from two sources and the time difference is the time of flight. Finally, if many vehicles are communicating their positions to many other vehicles along with an accuracy of position assessment, each vehicle can use this information along with the calculated separation distances to improve the accuracy of its position determination. In this manner, as the number of such vehicles increases, the accuracy of the entire system increases until an extremely accurate positioning system for all vehicles results. Such a system, since it combines many sources of position information, is tolerant of the failure of any one or even several such sources. Thus, the RtZF® system becomes analogous to the Internet in that it cannot be shut down and the goal of perfection is approached. Some of the problems associated with this concept will be discussed in more detail below.

Precise Positioning was described in detail above and relates to methods of locating a vehicle independently of GPS within sub meter accuracy. This can be done using an MIR triad; barcodes painted on the roadway; radar, laser radar or terahertz radar and infrastructure mounted reflectors; RFID markers; or through the use of matching a signature obtained from the environment with a stored signature using, for example, Adaptive Associative Memories (AAM) based on Cellular Neural Networks (CNN), for example.

AAM is a type of neural network that is distinguished in that it can do precise identification from poor and sparse data in contrast to ordinary back propagation neural networks discussed elsewhere herein that generalize and always give an approximate answer. Applications for AAM include: (1) Occupant recognition (face, iris, voice print, fingerprints, chemical emissions or other biometrics etc.), and (2) Vehicle location recognition for the RtZF® Precise Positioning System, which is the focus here. In contrast to other PPS systems described above, AAM permits the precise location of a vehicle on a roadway within centimeters without the use of additions to the infrastructure. A radar, laser scanner, or terahertz radar can continuously be projected from the vehicle toward the environment, such as the roadway to the side of the vehicle, and from the returned reflected waves it obtains a signature of the passing environment and compares it with a recorded signature using AAM. This signature, for example, can be the distance from the vehicle to the infrastructure which has been normalized for the purpose of signature matching with some method such as the average or some other datum. Thus it is the relative distance signature that can be compared with a stored signature thus removing the position of the vehicle on the roadway as a variable. When a match is found the distance to a precise object can be determined placing the vehicle precisely on the road in both the longitudinal and lateral dimensions. As discussed above, this can make the vehicle a DGPS station for correction of the GPS errors but it also can be used as the primary location system without GPS.

Other methods can be used to precisely locate a vehicle using the infrastructure and only one preferred method has been described herein. For example, the vertical motion signature of the vehicle can in some cases be used. This could involve determining this signature from the natural road or a pattern of disturbances similar to a rubble strip can be placed in the roadway and sensed by an accelerometer, microphone or other sensor. Even the signature of the magnetic or reflective properties of the roadway or the environment at the side of road can be candidates with the appropriate sensors. Basically, any system that provides a signature indication location that is derived from the infrastructure with appropriate sensors would qualify.

Another method, for example, is to match camera images where again an AAM can be used. Since the vehicle knows approximately where it is, the recorded signature used in the AAM will change as the vehicle moves and thus only a small amount of data need be used at a particular time. The AAM system is fast and relatively simple. Typically twenty data points will be used to determine the match, for example. What follows is a general description of AAM Associative (context-addressable) memory is frequently dedicated to data search and/or restoration from available fragments. Associative retrieval requires minimal information on sought objects, so such a machine might be used for most complicated tasks of data identification for partially destroyed or corrupted images. It can be applied to authenticity attribution, document falsification detection, message fragment identification in the Internet etc. as well as signature matching with the environment for PPS.

Neural associative memory works due to multi-stability of strong feedback systems. Common models like Hopfield networks and bi-directional associative memory provide memorization by means of computation network weights. It does not corrupt previously stored images. Unfortunately, these networks cannot be widely used because of their low capacity and inefficient physical memory usage. A number M of vectors memorized does not exceed 14% of the number of neurons in the network N. Since a network contains $N^2$ connections, it needs storage of at least $25M^2$ real weight values. Implementation of this technique can be aided through consultation of International Scientific Research in Kyiv, Ukraine.

Cellular architecture can exhaustively solve the problem of physical memory usage. Cellular memories have band-like synaptic matrix. The volume (number of elements) grows linearly with respect to neuron number. This is why cellular neural networks (CNNs) can be useful for very large data processing problems. Pioneering models of associative memories via CNNs were proposed in some earlier works. However, more detailed studies showed some fundamental limitations. Indeed, it has now been shown that the number of images stored is restricted by a cell size. Hence, it does not depend on the number of neurons. A more efficient way of redundancy reduction has also been found due to connection selection after training. This results in the use of only a small part of physical memory without corruption of memorized data. The network after weight selection looks like the cellular one; so by combining cellular training algorithms and weight selection, a novel network paradigm has resulted. It is an adaptive neural paradigm with great memorizing capacity.

At present, some breakthrough associative memories have been implemented in a software package available from the current assignee. The results can be applied for processing of large databases, real-time information retrieval, PPS etc. Other applications for this technology include face, iris, fingerprint, voiceprint, character, signature, etc. recognition.

FIG. 5 shows the implementation of the invention using the Precise Positioning System (PPS) 151, 152, 153, in which a pair of vehicles 18, 26 are traveling on a roadway each in a defined corridor delineated by lines 14 and each is equipped with a system in accordance with the invention and in particular, each is equipped with PPS receivers. Four versions of the PPS system will now be described. This invention is not limited to these examples but they will serve to illustrate the principals involved.

Vehicle 18 contains two receivers 160,161 for the micropower impulse radar (MIR) implementation of the invention. MIR or ultrawideband (UWB) transmitter devices are placed at locations 151, 152 and 153 respectively. They are linked together with a control wire, not shown, or by a wireless connection such that each device transmits a short radar or RF pulse at a precise timing relative to the others. These pulses can be sent simultaneously or at a precise known delay. Vehicle 18 knows from its map database the existence and location of the three MIR transmitters. The transmitters 151,152 and 153 can either transmit a coded pulse or non-coded pulse. In the case of the coded pulse, the vehicle PPS system will be able to verify that the three transmitters 151, 152, 153 are in fact the ones that appear on the map database. Since the vehicle will know reasonably accurately its location and it is unlikely that other PPS transmitters will be nearby or within range, the coded pulse may not be necessary. Two receivers 160 and 161 are illustrated on vehicle 18. For the MIR implementation, only a single receiver is necessary since the position of the vehicle will be uniquely determined by the time of arrival of the three MIR pulses. A second receiver can be used for redundancy and also to permit the vehicle to determine the angular position of the MIR transmitters as a further check on the system accuracy. This can be done since the relative time of arrival of a pulse from one of the transmitters 151, 152, 153 can be used to determine the distance to each transmitter and by geometry its angular position relative to the vehicle 18. If the pulses are coded, then the direction to the MIR transmitters 151, 152, 153 will also be determinable.

The micropower impulse radar units require battery power or another power mechanism to operate. Since they may be joined together with a wire in order to positively control the timing of the three pulses, a single battery can be used to power all three units. This battery can also be coupled with a solar panel to permit maintenance free operation of the system. Since the MIR transmitters use very small amounts of power, they can operate for many years on a single battery.

Although the MIR systems are relatively inexpensive, on the order of ten dollars each, the installation cost of the system will be significantly higher than the RFID and radar reflector solutions discussed next. The MIR system is also significantly more complex than the RFID system; however, its accuracy can be checked by each vehicle that uses the system. Tying the MIR system to a GPS receiver and using the accurate clock on the GPS satellites as the trigger for the sending of the radar pulses can add additional advantages and complexity. This will permit vehicles passing by to additionally accurately set their clocks to be in synchronization with the GPS clocks. Since the MIR system will know its precise location, all errors in the GPS signals can be automatically corrected and in that case, the MIR system becomes a differential GPS base station. For most implementations, this added complexity is not necessary since the vehicle themselves will be receiving GPS signals and they will also know precisely their location from the triad of MIR transmitters 151, 152, 153.

A considerably simpler alternate approach to the MIR system described above utilizes reflective RFID tags. These tags, when interrogated by an interrogator type of receiver 160, 161, reflect or retransmit after a known delay a modified RF signal with the modification being the identification of the tag. Such tags are described in many patents and books on RFID technology and can be produced for about one dollar each. The implementation of the RFID system would involve the accurate placement of these tags on known objects on or in connection with infrastructure. These objects could be spots on the highway, posts, signs, sides of buildings, poles, in highway reflectors or structures that are dedicated specifically for this purpose. In fact, any structure that is rigid and unlikely to change position can be used for mounting RFID tags. In downtown Manhattan, building sides, street lights, stoplights, or other existing structures are ideal locations for such tags. A vehicle 18 approaching a triad of such RFID tags represented by 151, 152, 153 would transmit an interrogation pulse from interrogator 160 and/or 161. The pulse would reflect off of, or be retransmitted by, each tag within range and the signal would be received by the same interrogator(s) 160, 161 or other devices on the vehicle. Once again, a single interrogator is sufficient. It is important to note that the range to RFID tags is severely limited unless a source of power is provided. It is very difficult to provide enough power from RF radiation from the interrogator for distances much greater than a few feet. For longer distances, a power source should be provided which can be a battery, connection to a power line, solar power, energy harvested from the environment via vibration, for example, unless the RFID is based on SAW technology. For SAW technology, reading ranges may be somewhat extended. Greater distances can be achieved using reflectors or reflecting antennas.

Electronic circuitry, not shown, associated with the interrogator 160 and/or 161 would determine the precise distance from the vehicle to the RFID tag 151, 152, 153 based on the round trip time of flight and any retransmission delay in the RFID. This will provide the precise distance to the three RFID tags 151, 152, 153. Once again, a second interrogator 161 can also be used, in which case, it could be a receiver only and would provide redundancy information to the main interrogator 160 and also provide a second measure of the distance to each RFID tag. Based on the displacement of the two receivers 160, 161, the angular location of each RFID tag relative into the vehicle can be determined providing further redundant information as to the position of the vehicle relative to the tags.

Radar corner or dihedral reflectors can be placed on poles or other convenient places such that a radar or laser beam pointed upwards at an angle, such as 30 to 45 degrees from the vehicle, will cause the beam to illuminate the reflector and thereby cause a reflection to return to the vehicle. Through well-known methods, the distance to the reflector can be accurately measured with pulse radar, modulated radar and phase measurements or noise radar and correlations measurements. In such a manner, the host vehicle can determine its position relative to one or more such reflectors and if the location of the reflector(s) is known and recorded on the map database, the vehicle can determine its position to within about 2 centimeters. The more reflectors that are illuminated, the better the accuracy of vehicle location determination. The reflectors can be simple corner or dihedral reflectors or a group of reflectors can be provided giving a return code to the host vehicle. A code should not be necessary as the vehicle should know the approximate location of the reflector from map data. A description of dihedral reflectors is set forth in U.S. Pat. No. 7,089,099. Briefly, a dihedral reflector rotates a polarized beam on reflection by some angle such as 90 degrees. This makes it easier to locate or differentiate the reflector signal from signals from other objects that might also reflect the radar or optical beam, or other electromagnetic transmission, Using the PPS system, a vehicle can precisely determine its location within about two centimeters relative to the MIR, RFID tags or radar and reflectors and since the precise location of these devices has previously been recorded on the map database, the vehicle will be able to determine its precise location on the surface of the earth. With this information, the vehicle will thereafter be able to use the carrier wave phase to maintain its precise knowledge of its location, as discussed above, until the locks on the satellites are lost. This prediction of phase relies on the vehicle system being able to predict the phase of the signal from a given satellite that is reaching a fixed location such as the location that the vehicle was in when it was able to determine its position precisely. This requires an accurate knowledge on the satellite orbits and an accurate clock. Given this information the vehicle system should be able to determine the phase of a satellite signal at the fixed location and at its new location and by comparing the phase from such a calculation from each satellite it should be able to precisely determine its position relative to the fixed location. Errors due to changes in the ionosphere and the vehicle clock accuracy will gradually degrade the accuracy of these calculations. The vehicle 18 can broadcast this information to vehicle 26, for example, permitting a vehicle that has not passed through the PPS triad to also greatly improve the accuracy with which it knows its position. Each vehicle that has recently passed through a PPS triad now becomes a differential GPS station for as long as the satellite locks are maintained assuming a perfect clock onboard the vehicle and a stable ionosphere. Therefore, through inter-vehicle communications, all vehicles in the vicinity can also significantly improve their knowledge of their position accuracy resulting in a system which is extremely redundant and therefore highly reliable and consistent with the "Road to Zero Fatalities"™ process. Once this system is operational, it is expected that the U.S. government and other governments will launch additional GPS type satellites, each with more civilian readable frequencies, or other similar satellite systems, further strengthening the system and adding further redundancy eventually resulting in a highly interconnected system that approaches 100% reliability and, like the Internet, cannot be shut down.

As the system evolves, the problems associated with urban canyons, tunnels, and other obstructions to satellite view will be solved by the placement of large numbers of PPS stations, or other devices providing similar location information.

Another PPS system uses reflected energy from the environment to create a signature that can be matched with a recorded signature using a technology such as adaptive associative memories (AAM), or equivalent including correlation. Since the AAM was discussed above, the correlation system will be discussed here. As the mapping vehicle traverses the roadway, it can record the distance to various roadside objects as a continuous signal having peaks and valleys. In fact, several such signatures can economically be recorded such that regardless of where on the roadway a subsequent vehicle appears, it will record a similar signature. The signature can be enhanced if dual frequency terahertz is used since the reflectance from an object can vary significantly from one terahertz frequency to another depending on the composition of the object. Thus, for one frequency, a metal and a wood object may both be highly reflective while at another frequency, there can be a significant difference. Significantly more information is available when more than one frequency is used. Another preferred approach is to use eyesafe IR which permits a high power transmitter to penetrate smoke, fog and snow, for example, better than visible light. If this is coupled with range gating then substantial immunity to smoke, fog and snow can be achieved.

Using the correlation system, a vehicle will continuously be comparing its received signature at a particular location to the previously recorded signature and shifting the two relative to each other until the best match occurs. Since this will be done continuously and since we will know the velocity of the vehicle, it should never deviate significantly from the recorded position and thus the vehicle will always have a non-GPS method of determining its exact location. There are certain areas where the signature matching may be problematic such as going by a wheat field or the ocean. Fortunately, such wide open spaces are precisely where the GPS satellite system should work best and similarly, the places where the signature method works best is where the GPS has problems. Thus, the systems are complementary. In most places, both systems will work well providing a high degree of redundancy.

Many mathematical methods are known in the art for determining the best shift of the two signatures (the previously recorded one and a new one) and therefore the various correlation methods will not be presented here.

Additionally, the GPS tagged fiducial system discussed above with probe vehicles is also applicable for all vehicles but may be limited by meteorological conditions.

Although the system have been illustrated for use with automobiles, the same system would apply for all vehicles including trucks, trains an even airplanes taxiing on runways. It also can be useful for use with cellular phones and other devices carried by humans. The combination of the PPS system and cellular phones permits the precise location of a cellular phone to be determined within centimeters by an emergency operator receiving a 911 call, for example. Appropriate RFID tags can be inexpensively placed both inside and outside of buildings, for example.

The range of passive RFID tags is somewhat limited to a few meters for current technology. If there are obstructions preventing a clear view of the RFID tag by the interrogator, the distance becomes less. For some applications where it is desirable to use larger distances, battery power can be provided to the RFID tags creating active RFID tags. In this case, the interrogator can send a pulse to the tag that can turn on the tag and at a precise, subsequent time, the tag can transmit an identification message. In some cases, the interrogator itself can provide the power to drive the RFID circuitry, in which case the tag would again operate in the transponder mode as opposed to the reflective mode but have limited range.

The RFID tags discussed herein can be either the electronic circuit or SAW designs.

From the above discussion, those skilled in the art will understand that other devices can be interrogated by a vehicle traveling down the road. Such devices might include various radar types or designs of reflectors, mirrors, other forms of transponders, or other forms of energy reflectors. All such devices are contemplated by this invention and the invention is not limited to be specific examples described. In particular, although various frequencies including radar, terahertz and infrared have been discussed, this invention is not limited to those portions of the electromagnetic spectrum. In particular the X-ray band of frequencies may have some particular advantages for some external and interior imaging applications.

Any communication device can be coupled with an interrogator that utilizes the MIR, radar or RFID PPS system described above. Many devices are now being developed that make use of the Bluetooth communication specification. All such Bluetooth-enabled devices can additionally be outfitted with a PPS or GPS system permitting the location of the Bluetooth device to be positively determined. This enabling technology will permit a base station to communicate with a Bluetooth-enabled or similar device whose location is unknown and have the device transmit back its location. As long as the Bluetooth-enabled device is within the range of the base station or Internet, its location can be precisely determined. Thus, the location of mobile equipment in a factory, packages within the airplane cargo section, laptop computers, cell phones, PDAs, and eventually even personal glasses or car keys or any device upon which a Bluetooth-enabled or similar device can be attached can be determined. Actually, this invention is not limited to Bluetooth devices but encompasses any device that can communicate with any other devices. An example of such a device is a Bluetooth device is the Wibree device that sends out a periodic signal that can be received by a receiver that has an Internet connection. A ubiquitous Internet such as WiMAX, for example, can be such a device. A set of car keys, a pair of glasses in a case, a wallet, a cell phone which has been turned off or whose battery has run down can be equipped with a Wibree type device and its position recorded on the Internet, providing the device is in range of a receiver, so that when the owner is searching for the item he or she need only log onto the Internet to find its location. A similar system can be used for any asset regardless how large or small it is and the Wibree device can be independent of external power and yet exist for years on a single battery charge due to its low duty cycle. In some cases the device can incorporate a passive RFID tag that registers its presence when near an interrogator. When the interrogator moves too far away from the tag to receive a response the last known location can be stored on the interrogator memory. Someone looking for where he last had his credit card, glasses or keys, for example, would only need to interrogate the memory.

Once the location of an object can be determined, many other services can be provided. These include finding the device, or the ability to provide information to that device or to the person accompanying that device such as the location of the nearest bathroom, restaurant, or the ability to provide guided tours or other directions to people traveling to other cities, for example.

A particularly important enhancement to the above-described system uses precise positioning technology independent of GPS. The precise positioning system, also known as the calibration system, generally permits a vehicle to precisely locate itself independently of the IMU or DGPS systems.

One example of this technology involves the use of a radar or lidar and reflector system wherein radar or lidar transceivers are placed on the vehicle that send radar or lidar waves to reflectors that are mounted at the side of road. The location of reflectors either is already precisely known or is determined by the mapping system during data acquisition process. The radar or lidar transceivers transmit a pulse, code or frequency or noise modulated radar or lidar signal to the road-mounted reflectors, typically corner or dihedral reflectors, which reflect a signal back to the radar or lidar transceiver. This permits the radar or lidar system to determine the precise distance from the transceiver to the reflector by either time-of-flight or phase methods. Note that although "radar" will be used below in the illustrations, terahertz or lidar can also be used and thus the word "radar" will be used to cover appropriate parts of the electromagnetic spectrum.

In one possible implementation, each vehicle is equipped with two radar devices operating in the 24-77 GHz portion of the spectrum. Each radar unit will be positioned on the vehicle and can be aimed outward, slightly forward and up toward the sides of the roadway. Poles would be positioned along the roadway at appropriate intervals and would have multiple corner cube or dihedral radar reflectors mounted thereon possibly in a vertical alignment. The lowest reflector on the pole can be positioned so that the vehicle radar will illuminate the reflector when the vehicle is in the lane closest to the pole. The highest reflector on the pole can be positioned so that the vehicle radar will illuminate the reflector when the vehicle is in the lane most remote from the pole. The frequency of the positioning of the poles will be determined by such considerations as the availability of light poles or other structures currently in place, the probability of losing access to GPS satellites, the density of vehicle traffic, the accuracy of the IMU and other similar considerations. Initially, rough calculations have found that a spacing of about ¼ mile would likely be acceptable.

If the precise location of the reflectors has been previously determined and is provided on a road map database, then the vehicle can use this information to determine its precise location on the road. In a more typical case, the radar reflectors are installed and the mapping vehicle knows its location precisely from the differential GPS signals and the IMU, which for the mapping vehicle is typically of considerably higher accuracy than will be present in the vehicles that will later use the system. As a result, the mapping vehicle can also map a tunnel, for example, and establish the locations of radar reflectors that will later be used by non-mapping vehicles to determine their precise location when the GPS and differential GPS signals are not available. Similarly, such radar reflectors can be located for an appropriate distance outside of the tunnel to permit an accurate location determination to be made by a vehicle until it acquires the GPS and differential GPS signals. Such a system can also be used in urban canyons and at all locations where the GPS signals can be blocked or are otherwise not available. Since the cost of radar reflectors is very low, it is expected that eventually they will be widely distributed on roads in the U.S.

Use of radar and reflectors for precise positioning is only one of many systems being considered for this purpose. Others include markings on roadway, RFID tags, laser systems, laser radar and reflectors, magnetic tags embedded in the roadway, magnetic tape, etc. The radar and reflector technology has advantages over some systems in that it is not seriously degraded by bad weather conditions, is not significantly affected if covered with snow, does not pose a serious maintenance problem, and other cost and durability features. Any movement in the positioning of the reflectors can be diagnosed from vehicle PPS-mounted systems.

The radar transceivers used are typically mounted on either side of vehicle and pointed upward at between 30 and 60 degrees. They are typically aimed so that they project across the top of the vehicle so that several feet of vertical height can be achieved prior to passing over adjacent lanes where the signal could be blocked by a truck, for example. Other mounting and aiming systems can be used.

The radar reflectors are typically mounted onto a pole, tree, building, overpass, or other convenient structure. They can provide a return code by the placement of several such reflectors such that the reflected pulse contains information that identifies this reflector as a particular reflector on the map database. This can be accomplished in numerous ways including the use of a collection of radar reflectors in a spaced-apart geometric configuration on a radius from the vehicle. The presence or absence of a reflector can provide a returned binary code, for example.

Operation of the system is as follows. A vehicle traveling down a roadway in the vicinity of the reflector poles would transmit radar or lidar pulses at a frequency of perhaps once per microsecond. These radar pulses would be encoded, perhaps with noise or code modulation, so that each vehicle knows exactly what radar or lidar returns are from its transmissions. As the vehicle approaches a reflector pole, it will begin to receive reflections based on the speed of the vehicle. By observing a series of reflections, the vehicle software can select either the maximum amplitude reflection or the average or some other scheme to determine the proper reflection to consider. The radar pulse will also be modulated to permit a distance to the reflector calculation to be made based on the phase of the returned signal or through correlation. Thus, as a vehicle travels down the road and passes a pair of reflector poles on either side of the roadway, for example, it will be able to determine its longitudinal position on the roadway based on the pointing angle of the radar devices and the selected maximum return as described above. It will also be able to determine its lateral position on the roadway based on the measured distance from the radar to the reflector.

Each reflector pole can have multiple reflectors determined by intersections of the radar or lidar beam from the vehicle traveling in the closest and furthest lanes. The spacing of reflectors on the pole would be determined by the pixel diameter of the radar or lidar beam. For example, a typical situation may require reflectors beginning at 4 m from the ground and ending at 12 m with a reflector every one-meter. For the initial demonstrations, it is expected that existing structures will be used. The corner cube or dihedral radar reflectors are very inexpensive so therefore the infrastructure investment will be small as long as existing structures can be used. In the downtown areas of cities, buildings etc. can also be used as reflector locations.

To summarize this aspect of the invention, an inexpensive infrastructure installation concept is provided which will permit a vehicle to send a radar or lidar pulse and receive a reflection wherein the reflection is identifiable as the reflection from the vehicle's own radar or lidar and contains information to permit an accurate distance measurement. The vehicle can thus locate itself accurately longitudinally and laterally along the road. A variation of the PPS system using a signature from a continuously reflected laser or radar has been discussed above and will not be repeated here.

Figure 9:
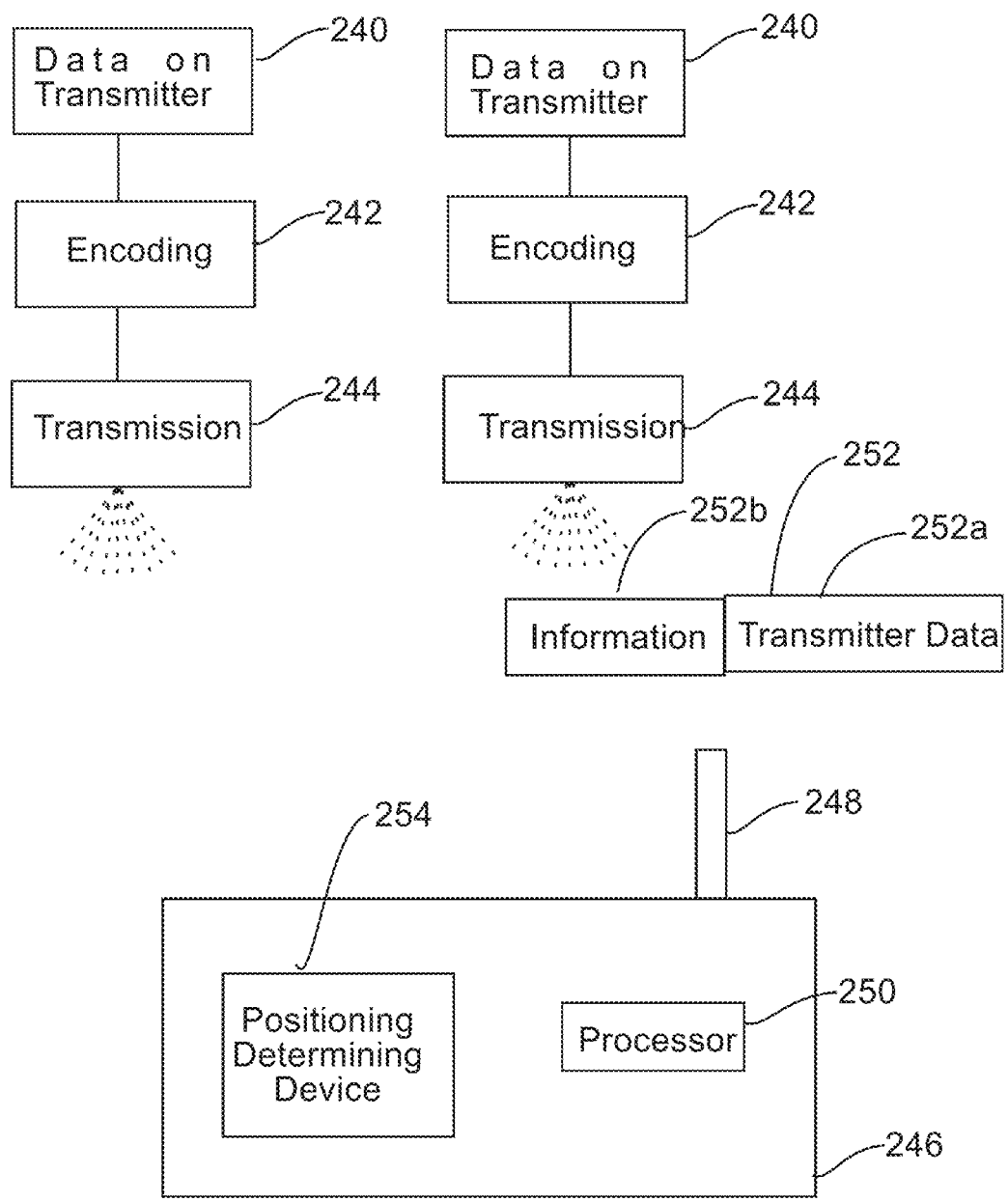
FIG. 9 is a schematic of the manner in which communications between a vehicle and a transmitter are conducted according to some embodiments of the invention.

FIG. 9 shows a schematic of the operation of a communication and/or information transmission system and method in accordance with the invention. Transmitters are provided, for example at fixed locations and/or in vehicles or other moving objects, and data about each transmitter, such as its location and an identification marker, is generated at 240. The location of the transmitter is preferably its GPS coordinates as determined, for example, by a GPS-based position determining system (although other position determining systems can alternatively or additionally be used). The data may include, when the transmitter is a moving vehicle, the velocity, speed, the direction of travel, the estimated travel path and the destination of the vehicle. The data is encoded at 242 using coding techniques such as those described above, e.g., phase modulation of distance or time between code transmissions, phase or amplitude modulation of the code sequences themselves, changes of the polarity of the entire code sequence or the individual code segments, or bandwidth modulation of the code sequence. The coded data can be transmitted at 244 using, e.g., noise or pseudo-noise radar.

Instead of data about each transmitter being generated at 240, general data for transmission can also be generated such as road condition information or traffic information.

A vehicle 246 includes an antenna 248 coupled to a control module, control unit, processor or computer 250. The antenna, which can be an imager, 248 receives transmissions (waves or wireless signals) including transmissions 252 when in range of the transmitters. The processor 250 analyzes the transmissions 252. Such analysis may include a determination as to whether any transmissions are from transmitters within a pre-determined area relative to the vehicle, whether any transmissions are from transmitters situated within a pre-determined distance from the vehicle, whether any transmissions are from transmitters traveling in a direction toward the vehicle's current position, whether any transmissions are from transmitters traveling in a direction toward the vehicle's projected position based on its current position and velocity, the angle between the transmitter and the vehicle, and any combinations of such determinations. In general, the initial analysis may be any position-based filtering, location-based filtering, and/or motion-based filtering. Other analyses can be whether any transmissions are from particular transmitters which might be dedicated to the transmission of road conditions data, traffic data, map data and the like. Once the processor 250 ascertains a particular transmission from a transmitter of interest (for operation of the vehicle, or for any other pre-determined purpose), it extracts the information coded in the transmission, but preferably does not extract information coded in transmission from transmitters which are not of interest, e.g., those from transmitters situated at a location outside of the pre-determined area. It knows the code because the code is provided by the transmission, i.e., the initial part of the transmission 252*a* contains data on the location of the transmitter and the code is based on the location of the transmitter. As such, once the initial part of the transmission 252a is received and the location of the transmitter extracted, the code for the remainder of the transmission 252b can be obtained. Alternately, all of the transmitted data is received but discarded if it does not contain the proper code.

In this manner, the extraction of information from radio frequency wave transmission may be limited based on a threshold determination (a filter of sorts) as to whether the transmission is of potential interest, e.g., to the operation of the vehicle based on its position, location and/or motion. To enable this threshold determination from the analysis of the waves or filtering of information, the initial part of the transmission 252a can be provided with positional or location information about the transmitter and information necessitated by the information transferring arrangement (communication protocol data) and the remainder of the transmission 252b provided with additional information of potential interest for operation of the vehicle. The information contained in initial part of each transmission (or set of waves) is extracted to determine whether the information in the final part of the transmission is of interest. If not, the information in the final part of the transmission is not extracted or otherwise disposed of. This reduces processing time and avoids the unnecessary extraction of most if not totally irrelevant information. An information filter is therefore provided.

Generating the transmission based on a code derived from the position of the transmitter, and thus the vehicle or infrastructure in which or to which it is fixed, provides significant advantages as discussed above. The code required for spread spectrum, UWB or other communication systems is thus determined according to the position of the transmitter, and can be accomplished in several different ways, some of which are disclosed elsewhere herein. However, use of coded transmissions is not required in all embodiments of the information transferring method and arrangement.

An additional method for vehicle-mounted transmitters is to supply position information to a vehicle at an entrance to a highway or other entry and exit-limited roadway, in a wireless manner as described herein, and deriving the position information about the vehicle based on the initially provided information when the vehicle enters the highway and information about the speed of the vehicle or the distance the vehicle travels. The latter quantities are determined by systems on the vehicle itself. Thus, it becomes possible to extrapolate the current position of the vehicle based on the initially provided position information and the speed and/or traveling distance of the vehicle, using common physics equations relating to motion of an object as known to those skilled in the art. Even if the current position of the vehicle is not precise due to, for example, variations in the highway, the system is still operational and effective since all vehicles on the same highway are determining their position relative to the entrance. This embodiment may be considered a simpler system than described above wherein the position of the vehicle is determined using, for example, GPS-based systems. Basically, all vehicles on the same highway receive only a single wireless transmission when they enter the highway and update their position based on the distance traveled and/or speed of travel.

Further, the antenna 248 serves as a transmitter for transmitting signals generated by the processor 250. The processor 248 is constructed or programmed to generate transmissions or noise signals based on its location, determined by a position determining device 254 in any known manner including those disclosed herein, and encode information about the vehicle in the signals. The information may be an identification marker, the type of vehicle, its direction, its velocity or speed, its proposed course, its occupancy, etc. The processor 248 can encode the information in the signals in a variety of methods as disclosed above in the same manner that the data about the transmitter is encoded. Thus, the processor 248 not only interprets the signals and extracts information, it also is designed to generate appropriate noise or otherwise coded signals which are then sent from the antenna 248.

Consider the case where the automobile becomes a pseudolite or a DGPS equivalent station since it has just determined its precise location from the PPS. Thus the vehicle can broadcast just like a pseudolite. As the vehicle leaves the PPS station, its knowledge of its absolute position will degrade with time depending on the accuracy of its clock and inertial guidance system and perhaps its view of the satellites or other pseudolites. In some cases, it might even be possible to eliminate the need for satellites if sufficient PPS positions exist.

Another point is that the more vehicles that are in the vicinity of a PPS, the higher the likelihood that one of the vehicles will know precisely where it is by being at or close to the PPS and thus the more accurately every vehicle in the vicinity would know its own location. Thus, the more vehicles on the road, the accuracy with which every vehicle knows its location increases. When only a single vehicle is on the road, then it really doesn't need to know its position nearly as accurately at least with regard to other vehicles. It may still need to know its accuracy to a comparable extent with regard to the road edges.

Figure 14:
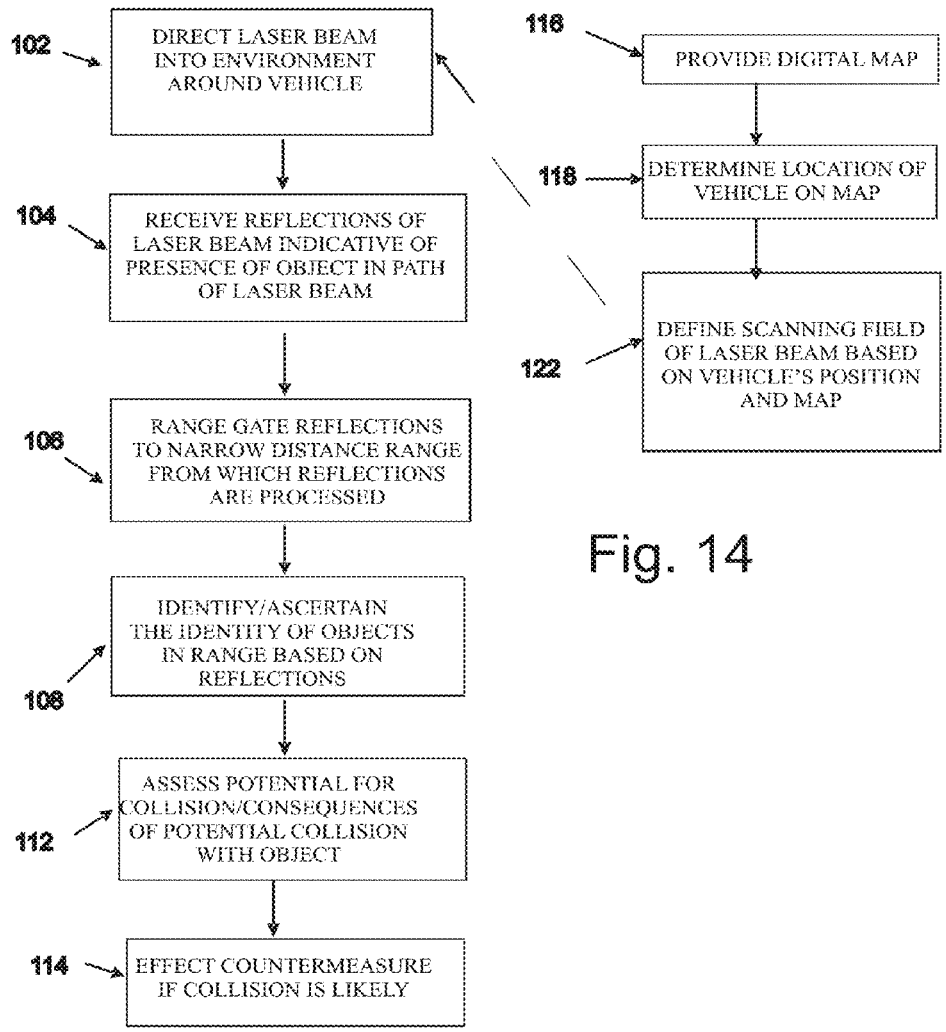
FIG. 14 is a schematic showing a method for avoiding collisions in accordance with the invention.

5. Radar and Laser Radar Detection and Identification of Objects External to the Vehicle 5.1 Laser and Terahertz Radar Scanning System Referring to FIG. 14, a digital map 116 can be provided and when the vehicle's position is determined 118, e.g., by a GPS-based system, the digital map can be used to define the field 122 that the laser or terahertz radar scanner 102 will interrogate.

Note, when the term scanner is used herein, it is not meant to imply that the beam is so narrow as to require a back and forth motion (a scan) in order to completely illuminate an object of interest. To the contrary, inventions herein are not limited to a particular beam diameter other than that required for eye safety. Also a scanner may be limited to an angular motion that just covers a vehicle located 100 meters, for example, from the transmitting vehicle, which may involve no angular motion of the scanner at all, or to an angular motion that covers 90 or more degrees of the space surrounding the transmitting vehicle. Through the use of high-powered lasers and appropriate optics, an eye safe laser beam can be created that is 5 cm in diameter, for example, with a divergence angle less than one degree. Such an infrared spotlight requires very little angular motion to illuminate a vehicle at 100 meters, for example.

Generally herein, when laser radar, or lidar, is used it will also mean a system based on terahertz where appropriate. The laser radar or lidar scanner will return information as to distance to an object in the scanned or illuminated field, e.g., laser beam reflections will be indicative of presence of an object in the path of laser beam 104 and from these reflections, information such as the distance between the vehicle and the object can be obtained. This will cover all objects that are on or adjacent to the highway. The laser pulse can be a beam or pixel that is two centimeters or 1 meter in diameter at 50 meters, for example and that beam or pixel diameter can be controlled by the appropriate optical system that can include adaptive optics and liquid lenses (such as described in "Liquid lens promises cheap gadget optics", NewScientist.com news service, Mar. 8, 2004).

The scanner should scan the entire road at such a speed that motion of the car can be considered insignificant. Alternately, a separate aiming system that operates at a much lower speed, but at a speed to permit compensation for the car angle changes, may be provided. Such an aiming system is also necessary due to the fact that the road curves up and down. Therefore two scanning methods, one a slow but for large angle motion and the other fast but for small angles may be required. The large angular system requires a motor drive while the small angular system can be accomplished through the use of an acoustic wave system, such as Lithium Niobate (LiNbO$_3$), which is used to drive a crystal which has a large refractive index such as Tellurium dioxide. Other acoustic optical systems can also be used as scanners.

For these systems, frequently some means is needed to stabilize the image and to isolate it from vehicle vibrations. Several such stabilization systems have been used in the past and would be applicable here including a gyroscopic system that basically isolates the imaging system from such vibrations and keeps it properly pointed, a piezoelectric system that performs similarly, or the process can be accomplished in software where the image is collected regardless of the vibration but where the image covers a wider field of view then is necessary and software is used to select the region of interest.

Alternately, two systems can be used, a radar system for interrogating large areas and a laser radar for imaging smaller areas. Either or both systems can be range gated and noise or pseudonoise modulated.

The laser radar scanner can be set up in conjunction with a range gate 106 so that once it finds an object, the range can be narrowed so that only that object and other objects at the same range, 65 to 75 feet for example, are allowed to pass to the receiver. In this way, an image of a vehicle can be separated from the rest of the scene for identification by pattern recognition software 108. Once the image of the particular object has been captured, the range gate can be broadened, to about 20 to 500 feet for example, and the process repeated for another object. In this manner, all objects in the field of interest to the vehicle can be separated and individually imaged and identified. Alternately, a scheme based on velocity can be used to separate a part of one object from the background or from other objects. The field of interest, of course, is the field where all objects with which the vehicle can potentially collide reside. Particular known and mapped features on the highway can be used as aids to the scanning system so that the pitch and perhaps roll angles of the vehicle can be taken into account.

Once the identity of the object is known, the potential for a collision between the vehicle and that object and/or consequences of a potential collision with that object are assessed, e.g., by a control module, control unit or processor 112. If collision is deemed likely, countermeasures are effected 114, e.g., activation of a driver alert system and/or activation of a vehicle control system to alter the travel of the vehicle (as discussed elsewhere herein).

Range gates can be achieved as high speed shutters by a number of devices such as liquid crystals, garnet films, *Kerr* and Pockel cells or as preferred herein as described in patents and patent applications of 3DV Systems Ltd., Yokneam, Israel including U.S. Pat. No. 6,327,073, U.S. Pat. No. 6,483, 094, US2002/0185590, WO98/39790, WO97/01111, WO97/ 01112 and WO97/01113.

Prior to the time that all vehicles are equipped with the RtZF® system described above, roadways will consist of a mix of vehicles. In this period, it will not be possible to totally eliminate accidents. It will be possible to minimize the probability of having an accident however, if a laser radar system similar to that described in U.S. Pat. No. 5,529,138 (Shaw) with some significant modifications is used, or those used, or those described more recently in various patents and patent applications of Ford Global Technologies such as U.S. Pat. Nos. 6,690,017 and 6,730,913, and U.S. Pat. Appl. Publ. Nos. 2003/0034462, 2003/0155513 and 2003/0036881. It is correctly perceived by Shaw that the dimensions of a radar beam are too large to permit distinguishing various objects which may be on the roadway in the path of the instant vehicle. Laser radar provides the necessary resolution that is not provided by radar. Laser radar as used in the present invention however would acquire significantly more data than anticipated by Shaw. Sufficient data in fact would be attained to permit the acquisition of a three-dimensional image of all objects in the field of view. The X and Y dimensions of such objects would, of course, be determined knowing the angular orientation of the laser radar beam. The longitudinal or Z dimension can be obtained by such methods as time-of-flight of the laser beam to a particular point on the object and reflected back to the detector, by phase methods or by range gating. All such methods are described elsewhere herein and in patents listed above.

At least two methods are available for resolving the longitudinal dimension for each of the pixels in the image. In one method, a laser radar pulse having a pulse width of one to ten nanoseconds, for example, can be transmitted toward the area of interest and as soon as the reflection is received and the time-of-flight determined, a new pulse can be sent at a slightly different angular orientation. The laser, therefore, would be acting as a scanner covering the field of interest. A single detector could then be used, if the pixel is sufficiently small, since it would know which pixel was being illuminated. The distance to the reflection point could be determined by time-of-flight, or phase comparisons between the transmitted and reflected pulses, thus giving the longitudinal distance to all points in view on the object.

Alternately, the entire area of interest can be illuminated and an image focused on a CCD or CMOS array. By checking the time-of-flight to each pixel, one at a time, the distance to that point on the vehicle would be determined. A variation of this would be to use a garnet crystal as a pixel shutter and only a single detector. In this case, the garnet crystal would permit the illumination to pass through one pixel at a time through to a detector. A preferred method, however, for this invention is to use range gating as described elsewhere herein.

Other methods of associating a distance to a particular reflection point, of course, can now be performed by those skilled in the art including variations of the above ideas using a pixel mixing device (such as described in Schwarte, R. "A New Powerful Sensory Tool in Automotive Safety Systems Based on PMD-Technology", S-TEC GmbH Proceedings of the AMAA 2000) or variations in pixel illumination and shutter open time to determine distance through comparison of range gated received reflected light. In the laser scanning cases, the total power required from the laser is significantly less than in the area illumination design. However, the ability to correctly change the direction of the laser beam in a sufficiently short period of time complicates the scanning design. The system can work approximately as follows: The entire area in front of the instant vehicle, perhaps as much as a full 180 degree arc in the horizontal plane can be scanned for objects using either radar or laser radar. Once one or more objects had been located, the scanning range can be severely limited to basically cover that particular object and some surrounding space using laser radar. Based on the range to that object, a range gate can be used to eliminate all background and perhaps interference from other objects. In this manner, a very clear picture or image of the object of interest can be obtained as well as its location and, through the use of a neural network, combination neural network or optical correlation or other pattern recognition system, the identity of the object can be ascertained as to whether it is a sign, a truck, an animal, a person, an automobile or other object. The identification of the object will permit an estimate to be made of the object's mass and thus the severity of any potential collision.

An alternate approach to determining whether there is a threatening object approaching the host vehicle is through the use of a fisheye lens, or other distorting lens, that permits the continuous monitoring of all or a portion of the space surrounding the vehicle without the use of moving parts. Pattern recognition technology can be used to identify the existence of such a threatening object for further observation using the techniques described above.

Once a pending collision is identified, this information can be made available to the driver and if the driver ceases to heed the warning, control of the vehicle could be taken from him or her by the system. The actual usurpation of vehicle control, however, is unlikely initially since there are many situations on the highway where the potential for a collision cannot be accurately ascertained. Consequently, this system can be thought of as an interim solution until all vehicles have the RtZF® system described above.

To use the laser radar in a scanning mode requires some mechanism for changing the direction of the emitted pulses of light. One acoustic-optic method of using an ultrasonic wave to change the diffraction angle of a Tellurium dioxide crystal is disclosed elsewhere herein. This can also be done in a variety of other ways such as through the use of a spinning multifaceted mirror, such as is common with laser scanners and printers. This mirror would control the horizontal scanning, for example, with the vertical scanning controlled though a stepping motor or the angles of the different facets of the mirror can be different to slightly alter the direction of the scan, or by other methods known in the art. Alternately, one or more piezoelectric materials can be used to cause the laser radar transmitter to rotate about a pivot point. A rotating laser system, such as described in Shaw is the least desirable of the available methods due to the difficulty in obtaining a good electrical connection between the laser and the vehicle while the laser is spinning at a very high angular velocity. Another promising technology is to use MEMS mirrors to deflect the laser beam in one or two dimensions. A newer product is the Digital Light Processor (DLP) from Texas Instruments which contains up to several million MEMS mirrors which can be rotated through an angle of up to 12 degrees. Although intended for displays, this device can be used to control the direction(s) of beams from a laser illuminator. The plus or minus 12 degree limitation available from standard DLPs can be expanded through optics but in itself it is probably sufficient. See, e.g. U.S. Pat. No. 7,359,782 for more detail.

Although the system described above is intended for collision avoidance or at least the notification of a potential collision, when the roadway is populated by vehicles having the RtZF® system and vehicles which do not, its use is still desirable after all vehicles are properly equipped. It can be used to search for animals or other objects which may be on or crossing the highway, a box dropping off of a truck for example, a person crossing the road who is not paying attention to traffic. Motorcycles, bicycles, pedestrians and other non-RtZF® equipped vehicles can also be monitored.

One significant problem with all previous collision avoidance systems which use radar or laser radar systems to predict impacts with vehicles, is the inability to know whether the vehicle that is being interrogated is located on the highway or is off the road. In at least one system of the present invention, the location of the road, and all permanent objects near the road, at any distance ahead of the vehicle would be known precisely from the sub-meter accuracy maps, so that the scanning system can ignore, for example, all vehicles on lanes where there is a physical barrier separating the lanes from the lane on which the subject vehicle is traveling. This, of course, is a common situation on super highways. Similarly, a parked vehicle on the side of the road would not be confused with a stopped vehicle that is in the lane of travel of the subject vehicle when the road is curving. This permits the subject invention to be used for automatic cruise control. In contrast with radar systems, it does not require that vehicles in the path of the subject vehicle be moving, so that high speed impacts into stalled traffic can be avoided.

If a system with a broader beam to illuminate a larger area on the road in front of the subject vehicle is used, with the subsequent focusing of this image onto a CCD or CMOS array, an advantage of permitting a comparison of the passive infrared signal and the reflection of the laser radar active infrared is permitted. Metal objects, for example appear cold to passive infrared. This permits another parameter to be used to differentiate metallic objects from non-metallic objects such as foliage or animals such as deer. The breadth of the beam can be controlled and thereby a particular object can be accurately illuminated. With this system, the speed with which the beam steering is accomplished can be much slower. Both systems can be combined into the maximum amount of information to be available to the system.

Through the use of range gating, objects can be relatively isolated from the environment surrounding it other than for the section of highway which is at the same distance. For many cases, a properly trained neural network or other pattern recognition system can use this data and identify the objects. An alternate approach is to use the Fourier transform of the scene as input to the neural network or other pattern recognition system. The advantages of this latter approach are that the particular location of the vehicle in the image is not critical for identification. Note that the Fourier transform can be accomplished optically and optically compared with stored transforms using a garnet crystal or garnet films, for example, as disclosed in U.S. Pat. No. 5,473,466.

At such time, when the system can take control of the vehicle, it will be possible to have much higher speed travel. In such cases all vehicles on the controlled roadway will need to have the RtZF® or similar system as described above. Fourier transforms of the objects of interest can be done optically though the use of a diffraction system. The Fourier transform of the scene can then be compared with the library of the Fourier transforms of all potential objects and, through a system used in military target recognition, multiple objects can be recognized and the system then focused onto one object at a time to determine the degree of threat that it poses.

Of particular importance is the use of a high powered eyesafe laser radar such as a 30 to 100 watt laser diode in an expanded beam form to penetrate fog, rain and snow through the use of range gating. If a several centimeter diameter beam is projected from the vehicle in the form of pulses of from 1 to 10 nanoseconds long, for example, and the reflected radiation is blocked except that from the region of interest at a distance range from the vehicle, an image can still be captured even though it cannot be seen by the human eye. This technique significantly expands the interrogation range of the system and, when coupled with the other imaging advantages of laser radar, offers a competitive system to radar and may in fact render the automotive use of radar unnecessary. One method is to use the techniques described in the patents to 3DV listed above. In one case, for example, if the vehicle wishes to interrogate an area 250 feet ahead, a 10 nanosecond square wave signal can be used to control the shutter which is used both for transmission and reception and where the off period can be 480 nanoseconds. This can be repeated until sufficient energy has been accumulated to provide for a good image. In this connection, a high dynamic range camera may be used such as that manufactured by IMS chips of Stuttgart, Germany as mentioned above. Such a camera is now available with a dynamic range of 160 db. According to IMS, the imager can be doped to significantly increase its sensitivity to IR.

These advantages are also enhanced when the laser radar system described herein is used along with the other features of the RtZF® system such as accurate maps and accurate location determination. The forward-looking laser radar system can thus concentrate its attention to the known position of the roadway ahead rather than on areas where there can be no hazardous obstacles or threatening vehicles.

5.2 A Preferred Implementation

Figure 10A:
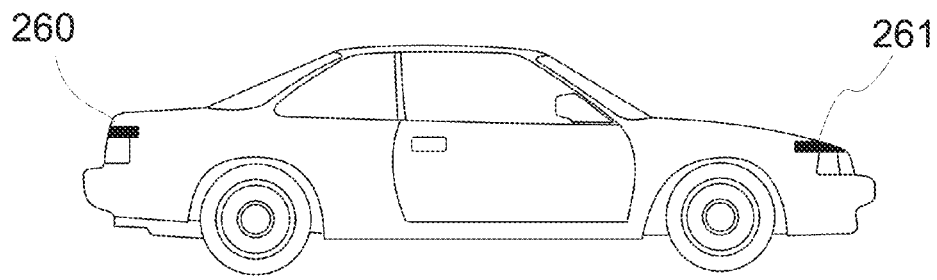
FIGS. 10A and 10B illustrate a preferred embodiment of a laser radar system mounted at the four corners of a vehicle above the headlights and tail lights.
Figure 10B:
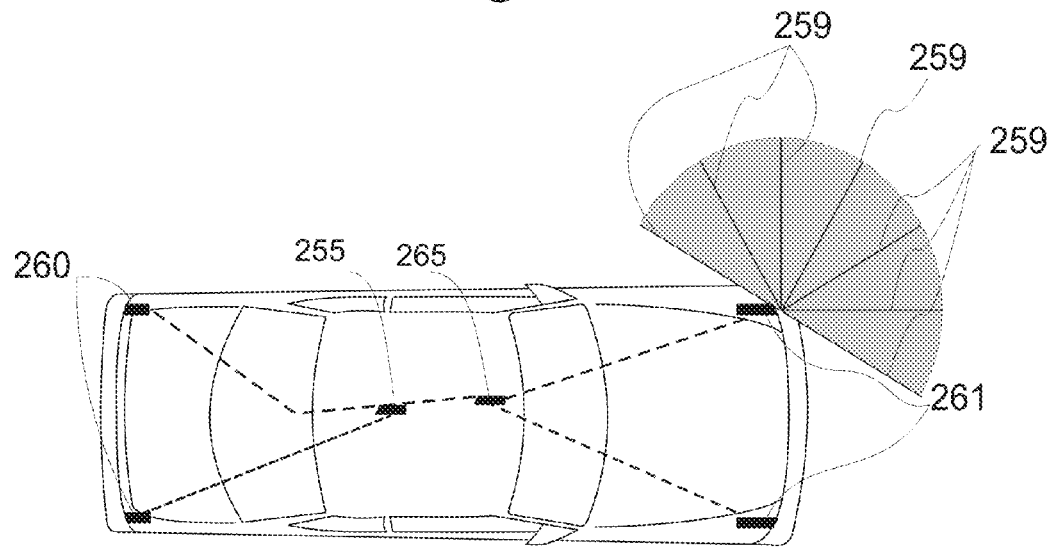

FIGS. 10A and 10B illustrate a preferred embodiment of a combined imaging and distance measuring system. The imaging is accomplished using infrared illumination and an imager that can be sensitive to both IR and visible light. Distance measuring can be accomplished through a set of laser radar and receiver units or a scanning laser radar system. The imager and illumination system can both transmit and receive light through a cylindrical lens that can, for example, create a horizontal field of illumination and view of in excess of 90 degrees and in some implementations as much as 180 degrees. The vertical field of illumination and view can be limited to, for example, 10 degrees. These are non-limiting examples. If a distorting lens is used, the distortion can be removed with optics and/or software to facilitate a pattern recognition system.

During daylight, the imager receives visual light reflections from objects within its field of view and during nighttime hours or in darkness, an IR illumination source illuminates the field of view of the imager. In the presence of fog, rain, snow or smoke, for example, range-gating can be used at night to extend the observable distance as disclosed elsewhere herein. Range-gating on the imaging system or reflection measurements on the laser radar units can be used to measure the driver's sight distance and the speed of the vehicle can then be limited to a speed that allows for a safe stopping distance between the vehicle and another vehicle or object that may be in the path of the vehicle or on a collision path with the vehicle. A speed limiting system is one example of a reactive system 265 which reacts to the determination of the presence of an object at a certain distance from the vehicle. Other reactive systems 265 are also envisioned, e.g., a warning system to warn the driver of the vehicle about the presence of another vehicle within a threshold distance from the vehicle. A processor 255 may be provided in the vehicle (see FIG. 10B) to manage the cooperation between the combined imaging and distance measuring system and the reactive system or systems.

Figure 12A:
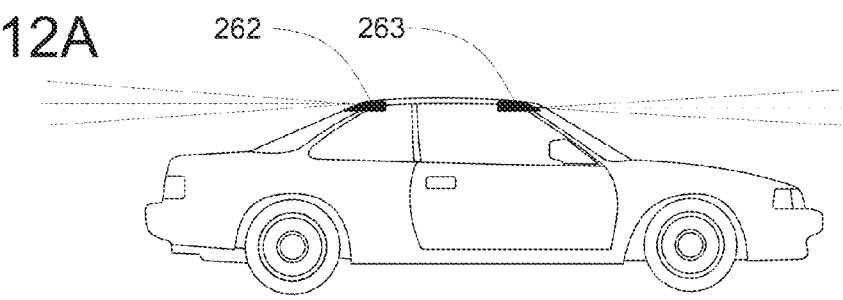
FIGS. 12A and 12B illustrate an alternative mounting location for laser radar units.
Figure 12B:
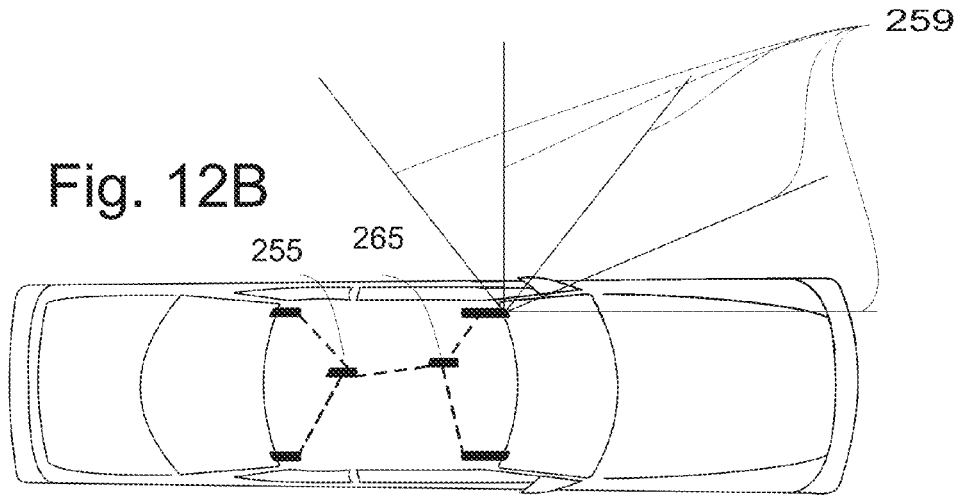

The laser radar units, the emissions of which are designated 259 in FIGS. 10B and 12B, can comprise a laser and receiver which can be a pin or avalanche diode as discussed in U.S. Pat. Nos. 7,049,945 and 7,209,221, for example, which enable measurement of the distance to an object in the vicinity of the vehicle even in the presence of strong reflected sunlight. These distance measurements can be accomplished by measuring the time of flight of a laser pulse or through various modulation techniques including amplitude, phase, frequency, noise, pulse or other such methods as discussed in the '945 and '221 patents and other issued patents or pending applications to one or more of the inventors herein.

The combination of the imaging and laser radar techniques permits the simultaneous acquisition of an image of a threatening object, which can be used for identification purposes, and a measurement of its distance and velocity through differentiation or Doppler techniques.

FIGS. 10A and 10B illustrate a preferred system having imaging and laser radar components mounted at the four corners of a vehicle, e.g., above the headlights and tail lights. Assemblies 260 at the rear of the vehicle and assemblies 261 at the front of the vehicle have a field of view angle of approximately 150 degrees; however, for some applications a larger or smaller scanning angle can of course be used. The divergence angle for the laser beams for one application can be one degree or less when it is desired to illuminate an object at a considerable distance from the vehicle such as from less than 50 meters to 200 meters or more, while the vertical divergence angle for the imaging and illumination system can be 5 degrees, 10 degrees or another value depending on the visual distance desired. When objects are to be illuminated that are closer to the vehicle, a larger divergence angle can be used, and vice versa. The determination of the divergence angle can be based on an initial determination of the distance between the vehicle and the object and can vary as the object's position changes relative to the vehicle. Generally, it is desirable to have a field of illumination (FOI) approximately equal to the field of view (FOV) of the camera or other optical receiver for the illumination and imaging system and as narrow as possible for the laser radar units.

Figure 11A:
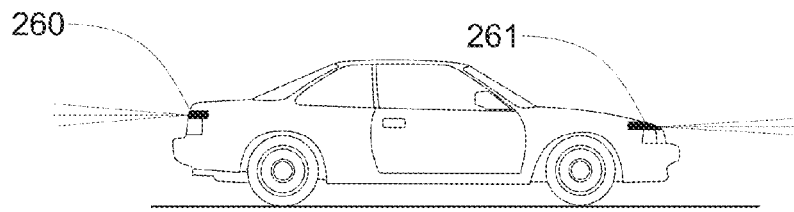
FIGS. 11A and 11B illustrate the system of FIGS. 10A and 10B for vehicles on a roadway.
Figure 11B:
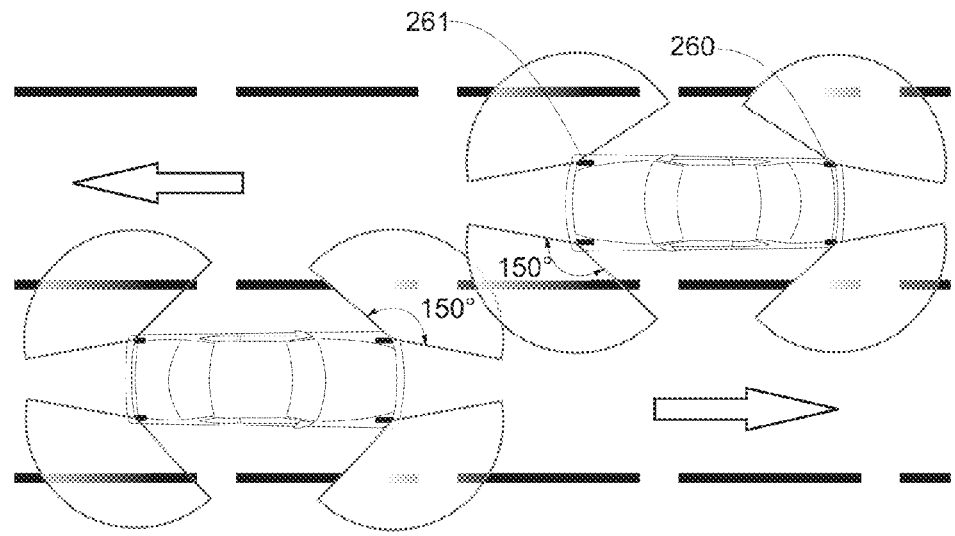

FIGS. 11A and 11B illustrate the system of FIGS. 10A and 10B for vehicles on a roadway.

FIGS. 12A and 12B illustrate an alternative mounting location for laser radar units on or near the roof of a vehicle. They can be either inside or outside of the vehicle compartment. The particular design of the imaging and laser radar assemblies 262 (at the rear of the roof) and 263 (at the front of the roof) are similar to those used in FIGS. 10A, 10B, 11A and 11B. Although not shown, other geometries are of course possible such as having the rear-mounted imaging and laser radar assemblies mounted on or near the roof and the front-mounted assemblies above the headlights or vice versa. Also, although assemblies mounted on the corners of the vehicle are illustrated, in many cases it can be desirable to mount the imaging and laser radar assemblies in the center of the front, back and sides of the vehicle or a combination or center and corner-mounted laser radar assemblies can be used.

Figure 13:
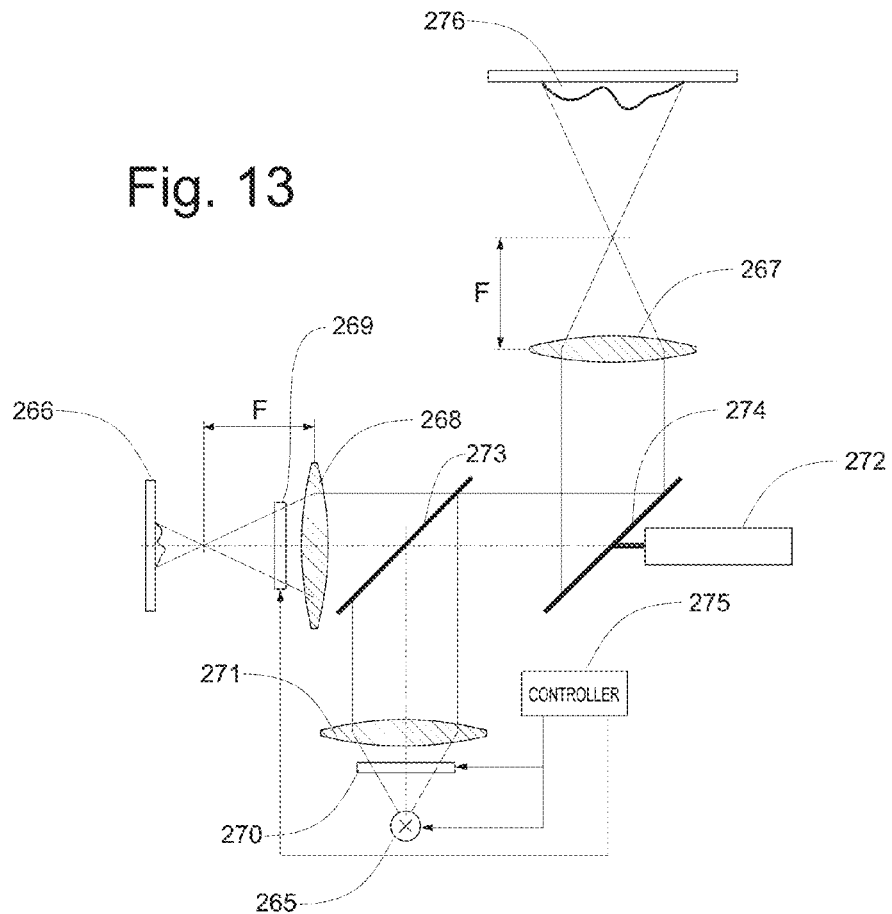
FIG. 13 is a schematic illustration of a typical laser radar device showing the scanning or pointing system with simplified optics.

In some cases, a scanning laser radar unit can be used in place of the fixed devices illustrated and discussed above. In this case, the scanning laser radar unit would scan the field of view of the imaging system in a horizontal plane. FIG. 13 is a schematic illustration of a scanning laser radar assembly showing a scanning or pointing system with simplified optics for illustration only. In an actual design, the optics will typically include multiple lenses. Also, the focal point will typically not be outside of the laser radar assembly. In this non-limiting example, a common optical system 267 is used to control a laser light 265 and an imager or camera 266. In general, the camera or imager will also have a source of infrared illumination which will illuminate its field of view independently of the laser. This is not illustrated in FIG. 13 for simplicity. The laser source transmits light, usually infrared, through its optical sub-system 271 which collimates the radiation. The collimated radiation is then reflected off mirror 273 to mirror 274 which reflects the radiation to the desired direction through optical system 267, e.g., a lens system. The direction of the beam can be controlled by motor 272 which can rotate both mirror 274 and optical system 267 to achieve the desired scanning or pointing angle.

Alternately, a preferred implementation does not involve rotation of the imaging system which maintains a fixed field of view using a lens system that can comprise a cylindrical lens to control its field of view.

In the illustrated system of FIG. 24, the radiation leaves the optical system 267 and illuminates the desired object or target 276. The radiation reflected from object 276 can pass back through the optical system 267, reflects off mirror 274, passes through semitransparent mirror 273 through optic subsystem 268 and onto an optical sensitive surface of the imager or camera 266. Many other configurations are possible. The transmission of the radiation is controlled by optical shutter 270 via controller 275. Similarly, the light that reaches the imager or camera 266 is controlled by controller 275 and optical shutter 269. These optical shutters 269, 270 can be liquid crystal devices, Kerr or Pockel cells, garnet films, other spatial light monitors or, preferably, high speed optical shutters such as described in patents and patent applications of 3DV Systems Ltd., of Yokneam, Israel or equivalent. Since much of the technology used in this invention related to the camera and shutter system is disclosed in the 3DV patents and patent applications, it will not be repeated here, but is incorporated by reference herein.

The particular wave lengths of the IR illumination and the laser radar can be selected or determined to meet the design goals of the designer. Near IR is preferred for the imager illumination since it will be diffuse and is used to supplement natural illumination and eye safety is not an issue. Eye-safe IR can be used for the laser radar permitting a significant increase in transmitted power allowing greater penetration of adverse atmospheric conditions such as rain, snow and fog. Alternately or additionally, the transmitted power of the laser can be controlled based on the distance to the reflecting object in order to limit the illumination per square millimeter to below eye safe limits. This technique permits the near IR part of the spectrum to be used with the advantage that the imaging system can register the location of the laser reflection, thereby permitting the pattern recognition system to concentrate on identifying a particular object that might be threatening.

In some embodiments, it may be important to assure that the optical system or lens through which the laser radar radiation passes is clean. As a minimum, a diagnostic system is required to inform the RtZF® or other system that the lens are soiled and therefore the laser radar system can not be relied upon. Additionally, in some applications, means are provided to clean one or more of the lens or to remove the remove the soiled surface. In the latter case, a roll of thin film can be provided which, upon the detection of a spoiled lens, rolls up a portion of the film and thereby provides a new clean surface. When the roll is used up it can be replaced. Other systems provide one or more cleaning methods such as a small wiper or the laser radar unit can move the lens into a cleaning station. Many other methods are of course possible and the invention here is basically concerned with ascertaining that the lens is clean and if not informing the system of this fact and, in some cases, cleaning or removing the soiled surface. The lens can also be coated with a coating that resists soiling as disclosed in U.S. patents to Gentex including U.S. Pat. Nos. 7,136,494, 6,991,339 and 6,193,378. Recent developments at MIT on omniphobic materials have resulted in coatings that repel both oil and water which when perfected can provide a lens with a surface that basically does not get dirty. For example, various camera companies have developed an ultrasonic method of maintaining CCD and CMOS imagers and lens clean or at least free of dust particles.

Note that although laser radar and radar have been discussed separately, in some implementations, it is desirable to use both a radar system and a laser radar system. Such a case can be where the laser radar system is not capable to achieve sufficient range in adverse weather whereas the radar has the requisite range but insufficient resolution. The radar unit can provide a warning that a potentially dangerous situation exists and thus the vehicle speed should be reduced until the imaging and laser radar system can obtain an image with sufficient resolution to permit an assessment of the extent of the danger and determine whether appropriate actions should be undertaken.

6. Weather and Road Condition Monitoring

The monitoring of the weather conditions and the control of the vehicle consistent with those conditions has been discussed herein. The monitoring of the road conditions and in particular icing has also been discussed elsewhere herein and in other patents and patent applications of the current assignee. Briefly, a vehicle will be controlled so as to eliminate accidents under all weather and road conditions. This in some cases will mean that the vehicle velocity will be controlled and, in some cases, travel will be prohibited until conditions improve.

Figure 16:
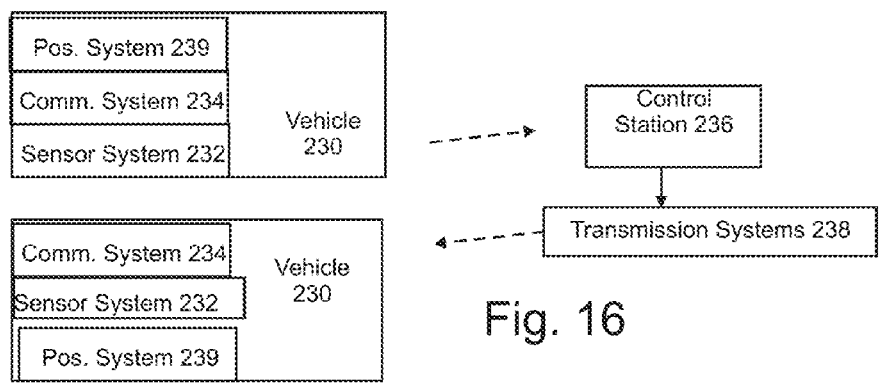
FIG. 16 is a diagram of a vehicle-based weather and/or road condition monitoring system in accordance with the invention.

Referring to FIG. 16, an arrangement for managing information about the condition of travel lanes on which vehicles travel in accordance with the invention includes sensor systems 232 arranged on vehicles 230 for obtaining information about the maintenance state of the travel lane. The sensor systems 232 may be as described herein, e.g., imagers which obtain photos of the travel lane, and/or as in U.S. Pat. No. 5,809,437, wherein the sensors could be trained in a training stage to enable the determination of the presence of predetermined maintenance problems with the travel lanes by means of a pattern recognition algorithm based on data provided during an operational stage. In the latter case, in the training stage, a set of sensors would be arranged on the vehicle, known maintenance problems introduced into the travel lane, data obtained from the sensors as the vehicle encounters the known maintenance problems, i.e., drives over potholes, ice and the like, and a pattern recognition algorithm created from the obtained data. The pattern recognition algorithm is then installed in the vehicle. In an operational stage, data is obtained from the sensors (which are preferably the same as those used during the training stage) and the data is input into the pattern recognition algorithm which outputs the most likely one of the known maintenance problems which is considered the obtained information about the maintenance state of the travel lane. Once information is obtained about the maintenance condition of the travel lane, its relevancy may be monitored.

The arrangement further includes a communication system 234 arranged in each vehicle 230 and coupled to the sensor system 232 therein for communicating the obtained information to a control station 236, e.g., via the Internet. A transmission system 238 arranged at or coupled to the control station 236 and arranged to transmit the obtained information received from the vehicles 230 so that information obtained from one vehicle would be transmitted to other vehicles.

The information obtained by the sensor systems 232 may be derived from the pictures or obtained from other sensors. In the former case, the derived information may be transmitted along with the pictures themselves. The information about the maintenance state of the travel lane includes the presence of potholes in the travel lane, icing of the travel lane, and/or the presence of objects on the travel lane.

A positioning system 239 may be arranged on each vehicle to determine its position. In this case, the communication system 234 transmits the position of each vehicle 230 along with the obtained information. As such, the transmission system 238 may be controlled to transmit information to vehicles based on their position relative to the position of the maintenance issue with the travel lane so that the vehicles receive only pertinent information. Thus, a vehicle would receive information about the condition of a road in front of it and which it is about to travel over. The information may also be associated with maps or map updates which are transmitted to the vehicles.

With respect to weather monitoring, an arrangement for monitoring weather includes a sensor system arranged in each vehicle for obtaining information about the weather in the vicinity of the vehicle, which would most likely, but necessarily, be different sensors than those used to monitor the road condition. The communication system would therefore transmit weather information to the control station and the transmission system would transmit weather conditions in an area in which the vehicles travel based on the information obtained by the vehicles. A weather map could be determined at the control station based on the input from the vehicles as well as other inputs, e.g., from infrastructure-based weather sensors, discussed elsewhere herein. Preferably, the weather information provided by the vehicles is associated with the position of the vehicles, determined for example by positioning systems on the vehicles, to improve the accuracy of the weather map. The transmission system may be arranged to transmit specific weather conditions to vehicles based on the position of the vehicles.

7. Infrastructure-to-Vehicle Communication

Initial maps showing roadway lane and boundary location for the CONUS can be installed within the vehicle at the time of manufacture. The vehicle thereafter would check on a section-by-section basis whether it had the latest update information for the particular and surrounding locations where it is being operated. One method of verifying this information would be achieved if a satellite or Internet connection periodically broadcasts the latest date and time or version that each segment had been most recently updated. This matrix would amount to a small transmission requiring perhaps a few seconds of airtime. Any additional emergency information could also be broadcast in between the periodic transmissions to cover accidents, trees falling onto roads etc. If the periodic transmission were to occur every five minutes and if the motion of a vehicle were somewhat restricted until it had received a periodic transmission, the safety of the system can be assured. If the vehicle finds that it does not have the latest map information, vehicle-to-vehicle communication, vehicle-to-infrastructure communication, Internet communication (Wi-Fi, Wi-max or equivalent), or the cell phone in the vehicle can be used to log on to the Internet, for example, and the missing data downloaded. An alternate is for the GEOs, LEOs, or other satellites, to broadcast the map corrections directly.

When mention is made of the vehicle being operative to perform communications functions, it is understood that the vehicle includes a processor, may be in the form of a computer, which is coupled to a communications unit including at least a receiver capable of receiving wireless or cellphone communications, and thus this communications unit is performing the communications function and the processor is performing the processing or analytical functions.

It is also possible that the map data could be off-loaded from a transmitter on the highway itself or at a gas station, for example, as discussed above. In that manner, the vehicles would only obtain that map information which is needed and the map information would always be up to the minute. As a minimum, temporary data communication stations can be placed before highway sections that are undergoing construction or where a recent blockage has occurred, as discussed above, and where the maps have not yet been updated. Such an emergency data transfer would be signaled to all approaching vehicles to reduce speed and travel with care. Such information could also contain maximum and minimum speed information which would limit the velocity of vehicles in the area. Other locations for transmitters include anywhere on a roadway on which the vehicles travel, any vehicle-accessible commercial or public location such as malls, at the vehicle operator's home or place of business, and even on a road sign. Moreover, if information about weather or road conditions in vicinity of the transmitter is obtained, e.g., via vehicles traveling the vicinity of the transmitter, a maximum speed limit for roads in the vicinity of the transmitter can be determined by a traffic monitoring facility based on the information about the weather and/or road conditions and provided to the transmitter for transmission to the vehicles. This speed limit would then be conveyed to signs associated with, in or on the roads affected by the weather and/or road conditions.

There is other information that would be particularly useful to a vehicle operator or control system, including in particular, the weather conditions, especially at the road surface. Such information could be obtained by road sensors and then transmitted to all vehicles in the area by a permanently installed system as disclosed above and in U.S. Pat. No. 6,662,642. Such road sensors would preferably be embedded in or alongside the road surface to obtain data about the road surface with the data being directed to transmitters for transmission to vehicles in range of the transmitter and traveling or expected to travel over the road surface in or alongside which the sensors are embedded. The transmission technique may be as described elsewhere herein for transmitting information to vehicles from infrastructure-based transmitters.

Alternately, there have been recent studies that show that icing conditions on road surfaces, for example, can be accurately predicted by local meteorological stations and broadcast to vehicles in the area. If such a system is not present, then the best place to measure road friction is at the road surface and not on the vehicle. The vehicle requires advance information of an icing condition in order to have time to adjust its speed or take other evasive action. The same road-based or local meteorological transmitter system could be used to warn the operators of traffic conditions, construction delays etc. and to set the local speed limit. In general, information provided to the transmitters for transmission to the vehicle operators can be weather information, road surface information, traffic information, speed limit information, information about construction, information about points of interest (possibly restricted based on position of the vehicle), information about the presence of animals in proximity to the road, information about signs relating to the road, accidents, congestion, speed limits, route guidance, location-based services, emergency or other information from police, fire or ambulance services, or information generated by probe vehicles. Probe vehicles are generally those vehicles which precede the host vehicle in time along the same highway or in the same area.

Once one vehicle in an area has discovered an icing condition, for example, this information can be immediately transmitted to all equipped vehicles through the vehicle-to-vehicle communication system discussed above. In a preferred implementation, icing and other such conditions would be sensed and the information transmitted automatically by the vehicle without driver involvement.

In view of the various types of information that can be transmitted to the vehicle from infrastructure-based transmitters, one embodiment of the invention provides for a user input device on the vehicle which enables an occupant of the vehicle to request information to be transmitted via the transmitter. The requested information is provided to the transmitter for retransmission to the vehicle. The source of information might be a website accessed by the user through the transmitter with the requested information being provided to the transmitter and then transmitted to the vehicle.

Another manner to provide for transmission of information to the vehicle is based on satisfaction of a condition requiring transmission of information to the vehicle. A condition might be detection of a particular weather pattern, such as snow, in which case, road icing information is transmitted to the vehicle whenever snow is detected.

A number of forms of infrastructure-to-vehicle communication have been discussed elsewhere herein. These include map and differential GPS updating methods involving infrastructure stations which may be located at gas stations, for example. Also communications with precise positioning stations for GPS independent location determination have been discussed. Communications via the Internet using either satellite Internet services with electronic steerable antennas such as are available from KVH, Wi-Fi or Wimax which will undoubtedly become available ubiquitously throughout the CONUS, for example, as discussed below. All of the services that are now available on the Internet plus may new services will thus be available to vehicle operators and passengers. The updating of vehicle resident software will also become automatic via such links. The reporting of actual (diagnostics) and forecasted (prognostics) vehicle failures, derived by a diagnostic system on the vehicle or a diagnostic system remote from the vehicle but which receives data from the vehicle and returns a diagnostic determination, will also able to be communicate via one of these links to the authorities, the smart highway monitoring system, vehicle dealers and manufacturers (see U.S. Pat. No. 7,082,359). Thus, the diagnostic or prognostic determination is transmitted from the vehicle to a transmitter which in turn can direct the determination to a dealer, manufacturer, vehicle owner and/or service center.

This application along with the inventions herein provide a method of notifying interested parties of the failure or forecasted failure of a vehicle component using a vehicle-to-infrastructure communication system. Such interested parties can include, but are not limited to: a vehicle manufacturer so that early failures on a new vehicle model can be discovered so as to permit an early correction of the problem; a dealer so that it can schedule fixing of the problem so as to provide for the minimum inconvenience of their customer and even, in some cases, dispatching a service vehicle to the location of the troubled vehicle; NHTSA so that they can track problems (such as for the Firestone tire problem) before they become a national issue; the police, EMS, fire department and other emergency services so that they can prepare for a potential emergency etc. For example in "Release of Auto Safety Data Is Disputed", New York Times Dec. 13, 2002 it is written "After Firestone tire failures on Ford Explorers led to a national outcry over vehicle safety, Congress ordered a watchdog agency to create an early-warning system for automotive defects that could kill or injure people." The existence of the system disclosed herein would provide an automatic method for such a watchdog group to monitor all equipped vehicles on the nation's highways. As a preliminary solution, it is certainly within the state of the art today to require all vehicles to have an emergency locator beacon or equivalent that is impendent of the vehicle's electrical system and is activated on a crash, rollover or similar event.

Although the '129 patent application primarily discusses diagnostic information for the purpose of reporting present or forecasted vehicle failures, there is of course a wealth of additional data that is available on a vehicle related to the vehicle operation, its location, its history etc. where an interested party may desire that such data be transferred to a site remote from the vehicle. Interested parties could include the authorities, parents, marketing organizations, the vehicle manufacturer, the vehicle dealer, stores or companies that may be in the vicinity of the vehicle, etc. There can be significant privacy concerns here which have not yet been addressed. Nevertheless, with the proper safeguards the capability described herein is enabled partially by the teachings of this invention.

For critical functions where a software-induced system failure cannot be tolerated, even the processing may occur on the network achieving what pundits have been forecasting for years that "the network is the computer". Vehicle operators will also have all of the functions now provided by specialty products such as PDAs, the Blackberry, cell phones etc. available as part of the infrastructure-to-vehicle communication systems disclosed herein.

There are of course many methods of transferring data wirelessly in addition to the CDMA system described above. Methods using ultra wideband signals were first disclosed by ATI or ITI in previous patents and are reinforced here. Much depends of the will of the FCC as to what method will eventually prevail. Ultra wideband within the frequency limits set by the FCC is certainly a prime candidate and lends itself to the type of CDMA system where the code is derivable from the vehicle's location as determined, for example, by the GPS that this is certainly a preferred method for practicing the teachings disclosed herein.

Note that different people may operate a particular vehicle and when a connection to the Internet is achieved, the Internet may not know the identity of the operator or passenger, for the case where the passenger wishes to operate the Internet. One solution is for the operator or passenger to insert a smart card, plug in their PDA or cell phone or otherwise electronically identify themselves. An embodiment of the invention is therefore possible wherein the occupant of the vehicle is first identified and then information is transmitted to the vehicle via the transmitter based on the identification of the occupant. To this end, personal data for occupants may be stored at one or more sites accessible via the Internet, a determination is made after the occupant is identified as to where a particular person's personal data is stored (e.g., using a table), and then the personal data is transmitted from the determined storage location to the vehicle via the transmitter upon identification of the occupant.

Cellphones and similar devices can now connect to the Internet wirelessly either thought the cellphone system or through the Internet which is now becoming more and more ubiquitous. When a person is at home or work he or she accesses the Internet through a PC rather than a cellphone. When in a vehicle the possibility exists for a similar Internet access with a full keyboard and large monitor which in some cases can reside on windshield. This will allow a driver, when the vehicle is autonomously driven, or a passenger at any time to surf the Internet, for example, or in all other ways operate if he or she were at home or work. This process is especially enhanced if personal files are accessible because they reside on a server or computer that can be accessed over the Internet. Even video conferencing and other such interactions can take place. The fact that the vehicle can become an extension of the home and office has not been appreciated in the literature and is an outcome of the inventions discussed herein and in particular the combination of a vehicle and a ubiquitous Internet. The ubiquitous Internet is being developed for use by cellphone type devices but it has significant and non obvious advantages when combined with an automobile.

Transponders are contemplated by the inventions disclosed herein including SAW, RFID or other technologies, reflective or back scattering antennas, polarization antennas, rotating antennas, corner cube or dihedral reflectors etc. that can be embedded within the roadway or placed on objects beside the roadway, in vehicle license plates, for example. An interrogator within the vehicle transmits power to the transponder and receives a return signal. Alternately, as disclosed above, the responding device can have its own source of power so that the vehicle-located interrogator need only receive a signal in response to an initiated request. The source of power can be a battery, connection to an electric power source such as an AC circuit, solar collector, or in some cases, the energy can be harvested from the environment where vibrations, for example, are present. The range of a license-mounted transponder, for example, can be greatly increased if such a vibration-based energy harvesting system is incorporated.

Some of the systems disclosed herein make use of an energy beam that interrogates a reflector or retransmitting device. Such a device can be a sign as well as any pole with a mounted reflector, for example. In some cases, it will be possible for the infrastructure device to modify its message so that when interrogated it can provide information in addition to its location. A speed limit sign, for example, can return a variable code indicating the latest speed limit that then could have been set remotely by some responsible authority. Alternately, construction zones frequently will permit one speed when workers are absent and another when workers are present. The actual permitted speed can be transmitted to the vehicle when it is interrogated or as the vehicle passes. Thus, a sign or reflector could also be an active sign and this sign could be an active matrix organic display and solar collector that does not need a connection to a power line and yet provides both a visual message and transmits that message to the vehicle for in-vehicle signage. Each of these systems has the advantage that since minimal power is required to operate the infrastructure-based sign, it would not require connection to a power line. It would only transmit when asked to do so either by a transmission from the vehicle or by sensing that a vehicle is present.

A key marketing point for OnStar® is their one button system. This idea can be generalized in that a vehicle operator can summon help or otherwise send a desired message to a remoter site by pushing a single button. The message sent can just be a distress message or it can perform a particular function selected by the vehicle depending on the emergency or from a menu selected by the operator. Thus, the OnStar™ one button concept is retained but the message can be different for different situations.

7.1 General

In order to eliminate fatalities on roads and mitigate congestion, it is critical that vehicles communicate with each other. The type of communication can take at least two forms, that which is time critical such when two vehicles are about to collide and that which can have some delay such as information that the road is icy 2 miles ahead. Time critical communication is discussed above. This section will concentrate on the not time-critical communication which can also include information from a vehicle that passed through an area an hour prior to the subject vehicle or information derived from a server that may not be near the vehicle. Thus, this second type of communications can involve an entity that is not a vehicle such as a network server. In many cases, such a server will be required such as when a vehicle transmits a picture of an accident that needs to be interpreted before it can be added as a temporary update to a map of the area.

7.2 Ubiquitous Broadband Network

External monitoring, as discussed in U.S. patent application Ser. No. 11/183,598 filed Jul. 18, 2005 and published as 20050278098, so far has been concerned with a host or resident vehicle monitoring the space in its environment. Usually, there are vehicles that precede the host vehicle and experience the same environment prior to the host vehicle. Information from such vehicles, which can be called "probe" vehicles, can be communicated to the host vehicle to aid that vehicle in its safe travel. This is the subject of communication between vehicles discussed above. Generally, communication between vehicles is composed of that which should be transmitted in the most expedient fashion to aid in collision avoidance as discussed above and that where some delay can be tolerated. For the first type, a broadcast protocol, ad-hoc or mesh local network is preferred where each vehicle transmits a message to surrounding vehicles directly and with or without employing networking protocols, error correction, handshaking depending on the urgency of the message etc. When many vehicles are trying to communicate, the host vehicle needs to have a method for determining which vehicle to listen to which can be done, for example, by a CDMA type system where the code is a function of the transmitting vehicle's location such as its GPS coordinates. The receiving vehicle with a resident map can determine the codes where potentially threatening vehicles are resident and listen only to those codes, as discussed above.

For the second type of communication, the Internet or similar ubiquitous system is possible. Each probe vehicle would communicate information, such as the existence of a new construction zone, a patch of ice, fog or other visibility conditions, an accident or any other relevant information, to a central source which would monitor all such transmissions and issue a temporary map update to all vehicles in the vicinity over the Internet, or equivalent. If the probe vehicle came upon an accident, then such a vehicle can also transmit one or more pictures of the accident to a central control station (which monitors and controls the central source). A probe vehicle may be any appropriately equipped vehicle depending on its purpose. The picture(s) could be transmitted automatically without any action on the part of the driver who may not even be aware that it is occurring. The central control station could then determine the nature, seriousness, extent etc. of the accident (either with manual input or through software trained to perform these functions) and issue a meaningful update to a map of the area and later remove the update when the accident is cleared. Removal of the update can be performed manually or through subsequent analysis of the accident location. This will permit timely display of the accident on a map display to equipped vehicles. Each passing vehicle, for example, could be instructed by the central control station to photograph and send the picture to the central control station so that it would know when the accident has been cleared.

This idea can be extended to cover other hazards. If some probe vehicles are equipped with appropriate sensors such as radiation, chemical and/or biological sensors, an early warning of a terrorist attack can be transmitted to the central control station all without any action on the part of the vehicle operator. A probe vehicle can be any equipped vehicle. Additionally, routine probe vehicle reports can be sent over the network. While on the subject of chemical sensors, a SAW or other chemical sensor can be put into the heating and air-conditioning system and monitor the presence of alcohol fumes in the car and transmit data to the authorities if a positive reading is achieved. Similarly, chemical sensors can be placed placed in all cargo containers, trucks and other vehicles to warn the authorities when such vehicles containing explosives or other hazardous chemicals are present or being transported. Furthermore such a system can monitor and report on air pollution and carbon monoxide and other fumes inside or emanating from any vehicle. Monitoring and tracking of trucks, cargo containers and other vehicles in general to prevent theft and/or for homeland security applications are greatly facilitated. Similarly, systems to warn of hijacking or carjacking can be greatly facilitated by a ubiquitous Internet or equivalent. Stolen car tracking and recovery efforts would also be facilitated as would the notification of a vehicle break-in.

In general, any information that can be sensed by a vehicle traveling on a roadway, including the maintenance state of the roadway itself, can be automatically monitored and relevant information can be transmitted automatically over the Internet, or equivalent, to a central control station, or centralized data source monitored and controlled thereby, along with appropriate pictures if available. This can include road condition monitoring such as for potholes etc., transmitting warnings of slippery roads, bad weather, changed speed limits and construction zones including the sending of photographs or video of any place where the road and/or traffic appears to be improperly functioning such as resulting from an accident, impact with a deer, mudslide, rock slide, etc. Other examples include highway spills, boxes fallen from vehicles, the reporting of vehicle and other fires, the reporting of any anomaly can be done by pictures or a recorded voice. Furthermore, visibility conditions, which can be used for setting speed limits and also for setting the maximum speed that a vehicle is permitted to travel, can be reported if the vehicle has such measuring equipment. All such reporting except that requiring a voice input can be done automatically or initiated by a vehicle occupant. The use of pictures in creating and maintaining the map database was discussed above.

This assumes the existence of a ubiquitous Internet, or equivalent. This is believed to be the least expensive way of providing such a capability to the approximately 4 million miles of roads in the continental US. Proposals are now being considered to put transceivers every 100 meters along the major highways in the US at an installation cost of billions of dollars. Such transceivers would only cover the major highways even though the majority of fatal accidents occur on other roadways. The maintenance cost of such a system would also be prohibitive and its reliability questionable. For far less money, the continental US can be covered with IEEE 802.11-based systems such as Wimax or equivalent. Such transceivers can each cover up to a radius of 30-50 miles thus requiring only approximately 500 to 1000 such stations to cover the entire continental US. More units would be required in densely populated areas. The cost of such units can be as low as a few thousand dollars each but even if they cost a million dollars each, it would be a small cost compared with the alternative roadside transceivers.

Initially, it is contemplated that some areas of the country will not have such 802.11 or equivalent equivalent stations. For those areas, map updates and all other information described herein and especially in this section can be transmitted by a variety of methods including a station on satellite radio or some other satellite transmitting system, through the cell phone network or any other existing or special communication system including normal radio and TV stations. If the selected system does not support two way communications, then the messages created by the probe vehicle can be stored and transmitted when access to the Internet is available. A probe vehicle can be a specially equipped vehicle or all or any vehicles with the appropriate equipment.

Eventually, all cars will be connected with a combination of a broadcast and/or local network (e.g. mesh or ad-hoc) system for collision avoidance and ubiquitous Internet connections for map-based road hazards that are discovered by the vehicle. As a vehicle travels down a road and discovers an accident for example, a photograph of that accident will be stored and uploaded to the Internet for interpretation by a human operator who will then download a message based on the map location of the accident to warn other vehicles that are in the vicinity until the accident is cleared up which can be determined by another probe vehicle.

When all cars have the system, there will be much less need for surround-vehicle-monitoring except for searching for bicycles, motorcycles, pedestrians, animals, land slides, rocks, fallen trees, debris etc. All other vehicles will be properly equipped and the RtZF® can be on special lanes that permit autonomous vehicles or at least properly equipped vehicles.

There should not be any obstacles on the highway and when one is discovered, it should be photographed and uploaded to the central station via the Internet for proper handling in terms of warnings and removal of the hazard. Until the time comes when this network is everywhere, alternate systems can partially fill in the gaps such as XM radio and other satellite-based systems. This could be used only for downloading map changes. For uploading information, the vehicles would wait, maintaining data to be sent to a database until they have a direct Internet connection.

To achieve ubiquitous Internet coverage, IEEE 802.11 or Wi-Fi stations (or WiMAX or WiMobile or equivalent) would be placed around the nation. If, for example, each station (also referred to as transmitters herein) had a radial range of 30-50 miles or more than approximately 500 to 1000 such stations could be strategically placed to provide nationwide coverage. It is anticipated that the range of such stations will be substantially increased but that the number of required stations will also increase as usage of the ubiquitous Internet, or equivalent, network also increases. In that case, private industry can be earning revenues through non-safety use access charges. An estimate of the cost of a typical station is between $10,000 and $100,000 most of which would be for the land and installation. The total cost thus would be around a maximum of $100 million which is a small fraction of the multi-billion dollar estimate by the Federal Highway Department to implement their proposed DSCR system with transceivers every 100 meters along the Federal Highway System, a system that would leave most of the nation unprotected and in general be of marginal value. There are many towers in place now for use by radio and TV stations and cellular telephones. It is expected that such towers can also be used for this ubiquitous network thus reducing the installation costs. In fact, the cellphone companies are likely to be the main providers of the ubiquitous Internet.

Such a proposed system could also broadcast a timing signal, which could be a repeat of a satellite timing signal or one derived from several GPS satellites, as well as the differential corrections to support Differential GPS (DGPS). A vehicle equipped with a processor capable of position determination would thus receive such signals from the stations, e.g., DGPS correction updates, and together with GPS information received from satellites, determine its position. It could even broadcast a GPS-type signal and thus eliminate dependence of the RtZF® system on GPS. This might require an atomic clock which could be too expensive for this system. However, the timing can come from the corrected GPS signals received at the station. In other words, anyone might be able to obtain centimeter level position accuracy without GPS. This concept may require a mapping of multipath delays in some urban areas.

Such a ubiquitous Internet system could also provide continuous traffic monitoring and updates, route guidance supporting information as well as weather information, automatic collision notification, diagnostic and prognostic telematics communications to the manufacturer, dealer or repair facility etc., and in fact, all telematics transmissions would be easily achieved with such an Internet system. Biometrics information transfer is facilitated when such sensors are on the vehicle. This can be used for access to secure locations and to verify the identity of a vehicle operator. The general sending of alarms and warnings to and from the vehicle for any reason including amber alert messages is also greatly facilitated.

Looking further, ubiquitous Internet could eliminate all communication systems that are currently used in the US including radio, TV, Cellular phones, XM radio and all satellite communications that originate and end up in the continental US, telephone, OnStar® and all telematics, DSRC. Everyone could have one phone number and one phone that would work everywhere. Thus, it could lead to the elimination of cellular phones as they are known today, the elimination of the wired telephone system, of television and radio stations, of cable television and Internet services, and maybe the elimination of all earth to satellite-to-Earth communications.

Other applications include remote sensing applications for home and boat security and homeland security applications, for example. Any point on the continental US would be able to communicate with the Internet. If this communication happens only occasionally, then the power can be minimal and can be boosted by some form of energy harvesting and thus such a sensor could operate from years to infinity on rechargeable batteries without a power connection. For example, all monitoring and tracking operations that require satellite communication such as disclosed in U.S. patent application Ser. No. 10/940,881 and published as 20050046584 could be handled without satellite communication for the continental United States.

A significant use for such a ubiquitous network is to permit rapid and frequent upgrades to the vehicle resident map. This is particularly important for The Road to Zero Fatalities®-based systems (RtZF®). Map upgrades can include the existence of an accident, ice, poor visibility, new temporary speed limit, traffic congestion, construction, mud slide, and countless other situations that can affect the smooth passage of a vehicle on a roadway. These map upgrades can be temporary or permanent. Also for RtZF® and other such systems relying on DGPS for their location information, the DGPS corrections can be frequently transmitted from a central station using the ubiquitous network. Similarly, should any vehicle discover that this information is faulty, or that the map is faulty for that matter, an immediate message can be sent to the appropriate central station for action to correct the error.

An entire series of telematics services can also make use of a ubiquitous network including all of the features currently using the OnStar® system. These would include concierge service, route guidance, remote door unlock, automatic crash notification, stolen vehicle tracking, and other location-based services. Other location-based services include the location of nearest facilities such as hospitals, police stations, restaurants, gas stations, vehicle dealers, service and repair facilities, the location of the nearest police officer or patrol car, the location of the nearest parking facility that has a parking space available and the location of a parking space once the driver is in the facility. The notification of a towing service, such as AAA, when that service is required can be enabled. Such information can be transmitted via the infrastructure-based transmitters.

Additional services that could be enabled by the ubiquitous network include automatic engine starting to pre-warm or pre-cool a vehicle, e-mail, voicemail, television, radio, movie and music downloads, synchronizing of the vehicle computer with a home or office or hotel/motel in room computer, text messages between vehicles or other locations for display and/or audio transmission, emergency in-vehicle signage including a terrorist attack, tornado, cyclone, hurricane, tsunami, or similar warnings, security gate and/or door opening or unlocking, automatic entrance to secured areas where both vehicle and biometric identification is required, rapid passage through borders by authorized personnel, garage door opening, turning on/off of house inside lights or outside (walk, driveway, house, etc.) lights, the ability to transmit vocal messages into a vehicle such as from a police officer or other authority figure, speed control and vehicle disabling by authorities which among other things would prevent high-prevent high-speed chases as the police will have the ability to limit the speed of a vehicle or shut it down.

Other enabled services include transmission of in-car pictures especially after an accident or when the police want to know who was driving, signaling of an emergency situation such that the vehicle is given emergency vehicle priority such as one when a woman is in labor and might deliver or a person is suffering a heart attack, simultaneously the nearest hospital can be notified to expect the emergency. Additional services include control of traffic lights and an indication of the status of the traffic light, and the same for railroad crossings and the prevention of vehicles running stoplights or stop signs.

Additional enablements include emergency vehicle alert to cause people to move to the right or otherwise out of the path, automatic tolling and variable tolling, vocal communication including voice over IP calls, transmission of driver health status information (heartbeat, blood pressure, etc.), use of voice recognition or voice print for identification, transmission of various vehicle information including the vehicle identification number and transmission of the location of the vehicle to businesses and friends when authorized permitting parents to know where their children are or the authorities to know where parolees are.

Tourists can find this service particularly useful when they need only point a ranging laser at a point of interest and the GPS coordinates can then be passed to the appropriate service, or a remote possibly predetermined or predesignated Internet site which is determined to possess the information about the point of interest, that can provide information about the point of interest. This can also be useful for professionals allowing them to instantly download building plans, utilities locations, sewers, etc.

Figure 3:
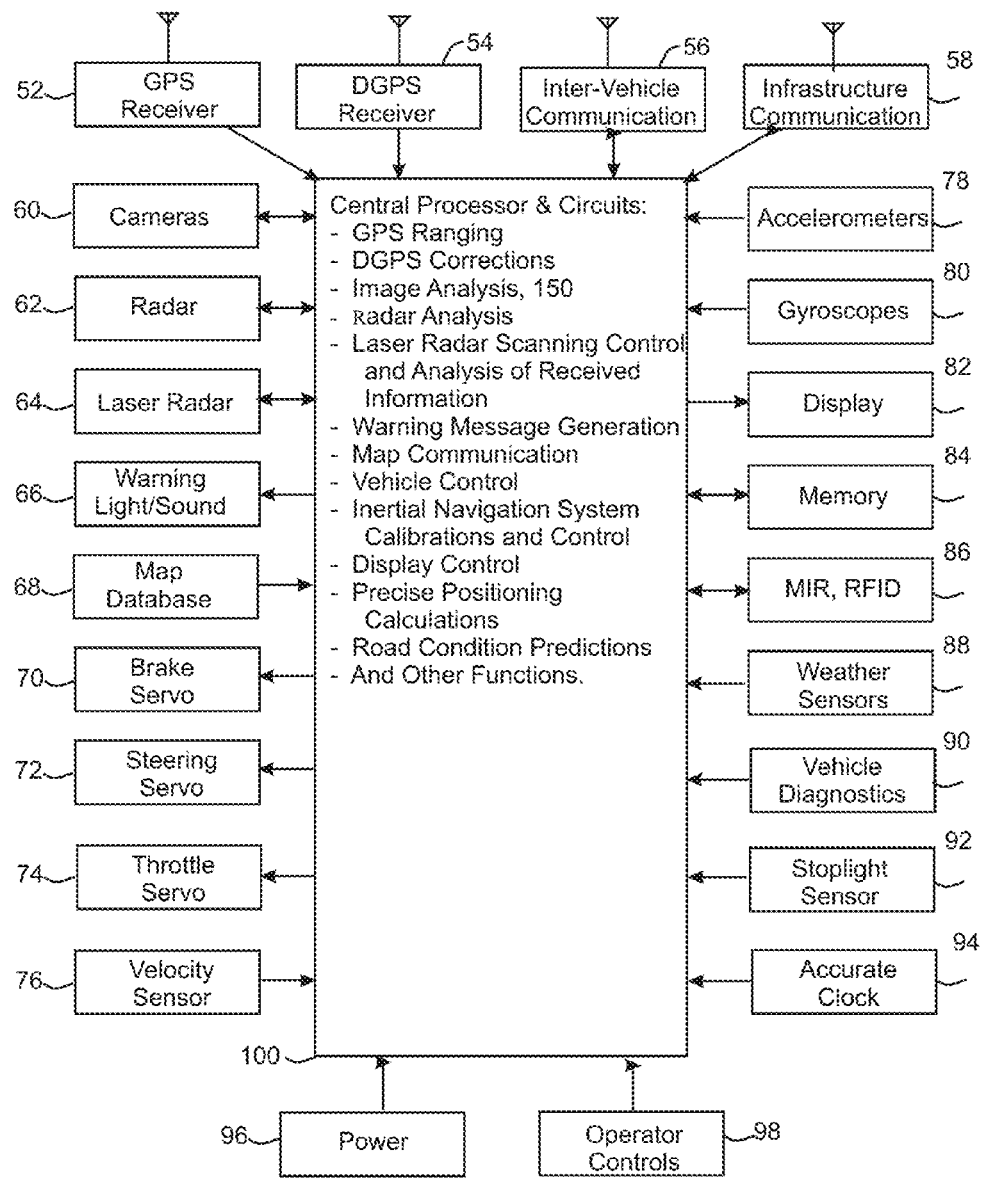
FIG. 3 is a block diagram of the overall vehicle accident avoidance, warning, and control system and method of the present invention illustrating system sensors, radio transceivers, computers, displays, input/output devices and other key elements.

Accordingly, a method for providing information about a point of interest about which information is sought includes obtaining from a person, an indication of a point of interest about which information is sought, determining the location of the point of interest based on the person's indication, passing the determined location of the point of interest to a service using the Internet, and receiving information about the point of interest from the service via the Internet. The indication of the point of interest from the user may be obtained by the person pointing a ranging laser 95 at the point of interest, the ranging laser 95 determining the distance between the ranging laser and the point of interest. Since the ranging laser's location is known, i.e., it may be assumed to be the same as the location of the vehicle determined using the vehicle-mounted location-determining systems such as the GPS receiver 52, DGPS receiver 54, then the location of the point of interest can be determined based on the distance between the ranging laser and the point of interest and the known location of the ranging laser (vehicle). The ranging laser 95 can illuminate the point of interest. The point of interest can also be identified at the remote Internet site at which the service is embodied and which is providing information about the point of interest. Determining the location of the point of interest based on the person's indication can thus entail obtaining GPS coordinates of the point of interest, whereby the GPS coordinates of the point of interest are provided to the service. As shown in FIG. 3, processor 100 can thus be considered a system which is capable of providing information about a point of interest based on the identification of a point of interest by the user.

In one embodiment, the user can view display 82 which would have objects thereon which are displayed, for example, in accordance with data in the map database 68. In this case, the indication of a point of interest about which information is sought from the user may constitute the user touching a point on the display 82, which would ideally be in the form of a touch screen to enable the location being touched by the user to be converted into an indication of the object being displayed thereon (and about which information is sought). The information provided by the remote service may be in various forms, e.g., audible and/or visual. In summary, all of the features of the RtZF® system can be retrofitted to an existing vehicle by those skilled in the art.

Additionally, any information that is available on network resident maps that is not available in the vehicle resident map can be transferred to the vehicle for informational purposes or for display or any other purpose. A key usage will be for updates to the vehicle's digital maps and perhaps the map software. Similarly, any vehicle resident software updates can take place seamlessly. Finally, if the authorized vehicle operator has in his or her possession a properly enabled cell phone or PDA or other such device, many of the features listed above become available to the user. The device can have proper security safeguards such as a biometric ID feature to prevent unauthorized use. One function would be for the user to find where he or she parked the car.

There are many innovative business opportunities that are also enabled and a few will now be discussed. A key opportunity which can enable the creation of the ubiquitous network would be a charging system whereby the users of the network can be charged a nominal fee based on bytes transferred, for example, to pay for the installation and maintenance of the equipment. Thus a business model exists where one or more companies agree to install a nationwide ubiquitous Internet service in exchange for such fees. This could be done piecemeal but after a while people will gravitate to the new, almost free, service and usage will explode. The network can of course be used to pay for tolls, fast food and countless other services including gasoline. Most such facilities already have an Internet connection. An unlimited number or other uses will become obvious in light of the above disclosure. For example, a user can be notified by a bank or other bill paying service to obtain authorization to pay a particular bill. There will be a host of additional opportunities to land-based fixed or non-vehicle-based Internet users that are enabled by the ubiquitous network and additionally by the connection of vehicles to that network.

Many of the above services are now being enabled over other telematics networks and many more of these services can now be implemented using those networks until the ubiquitous network is fully implemented. Thus, implementation of these as yet unimplemented services using other than the ubiquitous network is contemplated herein.

Others of course have been talking about large hot spots but other than vague statements that the Internet should be everywhere, no one has provided a plan, or even a need, that would place Internet availability on all roads in the continental United States (see, e.g., H. Green "No wires, No rules" Business Week online Apr. 26, 2004). What can drive this ubiquitous concept is the safety aspect of automobiles as opposed to the commercial aspects of movie downloads etc. For commercial success, the network need not be available on every back road where as it would be required for safety purposes.

As a vehicle travels, it will pass through different cells in the ubiquitous network and control will have to pass from one cell to another. Fortunately, this is a similar problem that has been solved for cell phones and thus should not be a problem for the network. Additionally, it has already been solved by at least one group as reported in an article in Science Daily Apr. 20, 2004 "Faster Handoff Between Wi-Fi Networks Promises Near-Seamless 802.11 Roaming".

7.3 In-Vehicle Signage

As discussed above, the ability to send text messages to and from a vehicle can be important in making the driver's time more efficient. This is particularly useful for truck drivers, salesmen and others that spend a great deal of time on the road as part of their business. Such messages can inform the driver of a canceled or changed meeting, key news events that can affect the driver etc. Such text messages are less distracting than phone calls since the messages can be transmitted anytime and read when convenient. They can also be used to send emergency messages to all vehicles in the area telling them that the road ahead has turned icy, for example.

A key use for in vehicle signage is to allow the driver to see a sign that he or she may have missed due to a blocking truck, fog or for any other reason. At will, the driver can scroll forward or backward to read signs that are upcoming or that he or she has passed. Signs can also be translated into any language where that might be desirable for travelers in countries where their language skills are poor.

Referring now to FIG. 17, in one embodiment of the invention, the signs are displayed on a display system 196 in the vehicle to the driver or another occupant with the information being provided to the display system 196 originating from a map database 190 in the vehicle or apart from the vehicle and transmitted to the vehicle. Alternatively or additionally, transmissions of information about signs may may originate from signs 192 which have been provided with a transmission unit which transmits the data being displayed by the sign, e.g., the speed limit is 50 MPH. Each road sign 192 may be provided with a transmission unit or broadcasting unit which broadcasts the data being provided by the sign, whether it relates to a speed limit or the existence of a traffic condition or road condition.

The information from the map database 190 and/or road signs 192 is received by the processor/communications unit 194 on the vehicle which controls the display system 196. The processor 196 may include a memory to store the transmission from the signs 192 and may also store or be integrated with the map database 192. Otherwise, the processor 194 could store the transmissions from the map database 190 when it is located apart from the vehicle. One or more input devices 198 are coupled to the processor 196, and possibly also to the display system 196 depending on its configuration, to enable the driver or other occupant to control the content being displayed. Thus, if the driver wants to review a sign that passed, he or she would use the input device 198 to direct the processor 194 to show the sign that has passed.

The processor 194 may be integrated with the display system 196 and input device 198. The input device 198 may be a scroll wheel, mouse, joystick, voice-recognition module, gesture-recognition module and the like.

The driver or other occupant could also direct the processor 194, e.g., using input device 198, to translate the data being provided by the map database 190 or road signs 192 into a language understood by the driver or other occupant. In this case, the processor 194 may be arranged to determine the language of the map data and road sign data and offer the driver or other occupant the opportunity to change the language, e.g., indicate a query via the display system 196 allowing the driver or other occupant to use the input device 198 to effect the translation of data into another language and display the data in that language. Moreover, the processor 194 can be arranged to translate the data into one or more additional languages and display the data in two or more languages on the display system 196, e.g., the language in which the data is transmitted and one foreign language.

8. The RtZF® System 8.1 Road Departure

Figure 2:
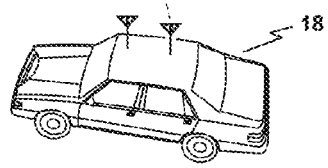
FIG. 2 is a logic diagram showing the combination of the GPS system and an inertial navigation system.
Figure 2:
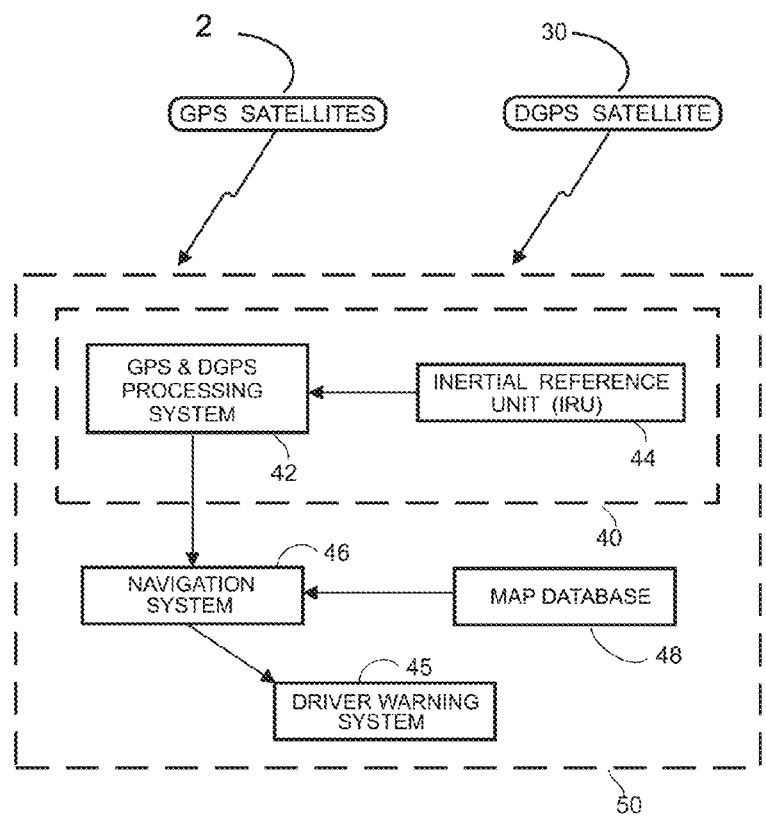

FIG. 2 is a logic diagram of the system 50 in accordance with the invention showing the combination 40 of the GPS and DGPS processing systems 42 and an inertial reference unit (IRU) or inertial navigation system (INS) or Inertial Measurement Unit (IMU) 44. The GPS system includes a unit for processing the received information from the satellites 2 of the GPS satellite system, the information from the satellites 30 of the DGPS system and data from the inertial reference unit 44. The inertial reference unit 44 contains accelerometers and laser or MEMS gyroscopes, e.g., three accelerometers and three gyroscopes. Also, the IMU 44 may be a MEMS-packaged IMU integrated with the GPS and DGPS processing systems 42 which serve as a correction unit.

The system shown in FIG. 2 is a minimal RtZF® system that can be used to prevent road departure, lane crossing and intersection accidents, which together account for more than about 50% of the fatal accidents in the U.S.

Map database 48 works in conjunction with a navigation system 46 to provide a warning to the driver when the driver is operating the vehicle in an erratic manner, or more generally the motion of the vehicle is determined to deviate from normal motion or operation of the vehicle. This situation arises for example, when it is determined that the operator is operating the vehicle in such a manner that he or she is about to cross an edge of a travel lane run off the road, cross a center (yellow) line, going onto a shoulder of a travel lane or roadway, run a stop sign, or run a red stoplight (all of which would be considered deviations from normal motion or operation of the vehicle). The map database 48 contains a map of the roadway to an accuracy of 2 cm (1σ), i.e., data on the edges of the lanes of the roadway and the edges of the roadway, and the location of all stop signs and stoplights and other traffic control devices such as other types of road signs. As such, motion or operation of the vehicle can be analyzed relative to the data in the map database 48, e.g., the data about edges of the travel lanes, the instructions or limitations provided or imposed by the traffic control devices, etc., and a deviation from normal motion or operation of the vehicle detected. Another sensor, not shown, provides input to the vehicle indicating that an approaching stoplight is red, yellow or green. Navigation system 46 is coupled to the GPS and DGPS processing system 42. For this simple system, the driver is warned if any of the above events is detected by a driver warning system 45 coupled to the navigation system 46. The driver warning system 45 can be an alarm, light, buzzer or other audible noise, or, preferably, a simulated rumble strip for yellow line and "running off of road" situations and a combined light and alarm for the stop sign and stoplight infractions. The warning system 45 may also be a sound only simulated rumble strip. Instead of or in addition to the driver warning system 45, a warning system may be provided to operators of other vehicles via the communications system described herein so that other drivers can control their vehicles in consideration of the erratic motion of the vehicle.

One implementation of the system 50 is as a system for determining accurate position of an object, whether a vehicle or another object the position of which is desired, such as a cell phone or emergency locator device. This positioning system would therefore include a GPS positioning system arranged to communicate with one or more satellites 2 to obtain GPS signals therefrom, and which may be incorporated into the GPS and DGPS processing system 42 in the integral, combined unit 40. A correction unit may also be included in the unit 40, e.g., in the GPS and DGPS processing system 42 which receives and/or derives positional corrections for positional data derived from the GPS signals to thereby improve accuracy of the position of the object provided by the GPS positioning system, for example, using signals from one or more of the DGPS satellites 30. A notification system, such as driver warning system 45, is coupled to the correction unit and is designed to notify a person concerned with the position of the object about the current position of the object. Navigation system 46 is coupled to the correction unit for receiving and acting upon the accurate positional information of the object provided by the correction unit, and as shown, is integrated into the common system 50. The optional map database 48 is coupled to the navigation system 46 which may then receive information about a travel lane the vehicle is traveling on and guide an operator of the vehicle based on the accurate positional information and travel lane information. In this case, the warning system would notify an operator of the vehicle of the position of the vehicle to prevent accidents involving the vehicle. In one embodiment, a display displays the position of the vehicle on a map along with the position of other vehicles to the driver or other personnel interested in the traffic on roads.

The correction unit 42 may be designed to communicate with satellites to receive positional corrections therefrom and/or with ground base stations to receive positional corrections therefrom. As discussed below with reference to FIG. 3, a system for communicating with other vehicles (intra-vehicle communication 56) may be provided to transmit GPS signals and/or positional corrections to the other vehicles and/or receive GPS signals and/or positional corrections from the other vehicles.

8.2 Accident Avoidance

FIG. 3 is a block diagram of the more advanced accident avoidance system of this invention and method of the present invention illustrating system sensors, transceivers, computers, displays, input and output devices and other key elements.

As illustrated in FIG. 3, the vehicle accident avoidance system is implemented using a variety of microprocessors and electronic circuits 100 to interconnect and route various signals between and among the illustrated subsystems. GPS receiver 52 is used to receive GPS radio signals as illustrated in FIG. 1. DGPS receiver 54 receives the differential correction signals from one or more base stations either directly or via a geocentric stationary or LEO satellite, an earth-based station or other means. Inter-vehicle communication subsystem 56 is used to transmit and receive information between various nearby vehicles. This communication will in general take place via broadband or ultra-broadband communication techniques, or on dedicated frequency radio channels, or in a preferred mode, noise communication system as described above. This communication may be implemented using multiple access communication methods including frequency division multiple access (FDMA), timed division multiple access (TDMA), or code division multiple access (CDMA), or noise communication system, in a a manner to permit simultaneous communication with and between vehicles. Other forms of communication between vehicles are possible such as through the Internet. This communication may include such information as the precise location of a vehicle, the latest received signals from the GPS satellites in view, other road condition information, emergency signals, hazard warnings, vehicle velocity and intended path, and any other information which is useful to improve the safety of the vehicle road system.

Infrastructure communication system 58 permits bi-directional communication between the host vehicle and the infrastructure and includes such information transfer as updates to the digital maps, weather information, road condition information, hazard information, congestion information, temporary signs and warnings, and any other information which can improve the safety of the vehicle highway system.

Cameras 60 are used generally for interrogating environment nearby the host vehicle for such functions as blind spot monitoring, backup warnings, anticipatory crash sensing, visibility determination, lane following, and any other visual information which is desirable for improving the safety of the vehicle highway system. Generally, the cameras will be sensitive to infrared and/or visible light, however, in some cases a passive infrared camera will the used to detect the presence of animate bodies such as deer or people on the roadway in front of the vehicle. Frequently, infrared or visible illumination will be provided by the host vehicle. In a preferred system, high brightness eyesafe IR will be used.

Radar 62 is primarily used to scan an environment close to and further from the vehicle than the range of the cameras and to provide an initial warning of potential obstacles in the path of the vehicle. The radar 62 can also be used when conditions of a reduced visibility are present to provide advance warning to the vehicle of obstacles hidden by rain, fog, snow etc. Pulsed, continuous wave, noise or micropower impulse radar systems can be used as appropriate. Also, Doppler radar principles can be used to determine the object to host vehicle relative velocity.

Laser or terahertz radar 64 is primarily used to illuminate potential hazardous objects in the path of the vehicle. Since the vehicle will be operating on accurate mapped roads, the precise location of objects discovered by the radar or camera systems can be determined using range gating and scanning laser radar as described above or by phase techniques.

The driver warning system 66 provides visual and/or audible warning messages to the driver or others that a hazard exists. In addition to activating a warning system within the vehicle, this system can activate sound and/or light systems to warn other people, animals, or vehicles of a pending hazardous condition. In such cases, the warning system could activate the vehicle headlights, tail lights, horn and/or the vehicle-to-vehicle, Internet or infrastructure communication system to inform other vehicles, a traffic control station or other base station. This system will be important during the early stages of implementation of RtZF®, however as more and more vehicles are equipped with the system, there will be less need to warn the driver or others of potential problems.

Map database subsystem 68, which could reside on an external memory module, will contain all of the map information such as road edges up to 2 cm accuracy, the locations of stop signs, stoplights, lane markers etc. as described above. The fundamental map data can be organized on read-only magnetic or optical memory with a read/write associated memory for storing map update information. Alternatively, the map information can be stored on rewritable media that can be updated with information from the infrastructure communication subsystem 58. This updating can take place while the vehicle is being operated or, alternatively, while the vehicle is parked in a garage or on the street.

Three servos are provided for controlling the vehicle during the later stages of implementation of the RtZF® product and include a brake servo 70, a steering servo 72, and a throttle servo 74. The vehicle can be controlled using deterministic, fuzzy logic, neural network or, preferably, neural-fuzzy algorithms.

As a check on the inertial system, a velocity sensor 76 based on a wheel speed sensor, or ground speed monitoring system using lasers, radar or ultrasonics, for example, can be provided for the system. A radar velocity meter is a device which transmits a noise modulated radar pulse toward the ground at an angle to the vertical and measures the Doppler velocity of the returned signal to provide an accurate measure of the vehicle velocity relative to the ground. Another radar device can be designed which measures the displacement of the vehicle. Other modulation techniques and other radar systems can be used to achieve similar results. Other systems are preferably used for this purpose such as the GPS/DGPS or precise position systems.

The inertial navigation system (INS), sometimes called the inertial reference unit or IRU, comprises one or more accelerometers 78 and one or more gyroscopes 80. Usually, three accelerometers would be required to provide the vehicle acceleration in the latitude, longitude and vertical directions and three gyroscopes would be required to provide the angular rate about the pitch, yaw and roll axes. In general, a gyroscope would measure the angular rate or angular velocity. Angular acceleration may be obtained by differentiating the angular rate.

A gyroscope 80, as used herein in the IRU, includes all kinds of gyroscopes such as MEMS-based gyroscopes, fiber optic gyroscopes (FOG) and accelerometer-based gyroscopes.

Accelerometer-based gyroscopes encompass a situation where two accelerometers are placed apart and the difference in the acceleration is used to determine angular acceleration and a situation where an accelerometer is placed on a vibrating structure and the Coriolis effect is used to obtain the angular velocity.

The possibility of an accelerometer-based gyroscope 80 in the IRU is made possible by construction of a suitable gyroscope by Interstate Electronics Corporation (IEC). IEC manufactures IMUs in volume based on μSCIRAS (micromachined Silicon Coriolis Inertial Rate and Acceleration Sensor) accelerometers. Detailed information about this device can be found at the IEC website at iechome.com.

There are two ways to measure angular velocity (acceleration) using accelerometers. The first way involves installing the accelerometers at a distance from one another and calculating the angular velocity by the difference of readings of the accelerometers using dependencies between the centrifugal and tangential accelerations and the angular velocity/acceleration. This way requires significant accuracy of the accelerometers.

The second way is based on the measurement of the Coriolis acceleration that arises when the mass of the sensing element moves at a relative linear speed and the whole device performs a transportation rotation about the perpendicular axis. This principle is a basis of all mechanical gyroscopes, including micromachined ones. The difference of this device is that the micromachined devices aggregate the linear oscillation excitation system and the Coriolis acceleration measurement system, while two separate devices are used in the proposed second method. The source of linear oscillations is the mechanical vibration suspension, and the Coriolis acceleration sensors are the micromachined accelerometers. On one hand, the presence of two separate devices makes the instrument bigger, but on the other hand, it enables the use of more accurate sensors to measure the Coriolis acceleration. In particular, compensating accelerometer systems could be used which are more accurate by an order of magnitude than open structures commonly used in micromachined gyroscopes.

Significant issues involved in the construction of an accelerometer-based gyroscope are providing a high sensitivity of the device, a system for measuring the suspension vibration, separating the signals of angular speed and linear acceleration; filtering noise in the output signals of the device at the suspension frequency, providing a correlation between errors in the channels of angular speed and linear acceleration, considering the effect of nonlinearity of the accelerometers and the suspension on the error of the output signals.

A typical MEMS-based gyroscope uses a quartz tuning fork. The vibration of the tuning fork, along with applied angular rotation (yaw rate of the car), creates Coriolis acceleration on the tuning fork. An accelerometer or strain gage attached to the tuning fork measures the minute Coriolis force. Signal output is proportional to the size of the tuning fork. To generate enough output signal, the tuning fork must vibrate forcefully. Often, this can be accomplished with a high Q structure. Manufacturers often place the tuning fork in a vacuum to minimize mechanical damping by air around the tuning fork. High Q structures can be fairly fragile.

The gyroscope often experiences shock and vibration because it must be rigidly connected to the car to accurately measure yaw rate, for example. This mechanical noise can introduce signals to the Coriolis pick-off accelerometer that is several orders of magnitude higher than the tuning-fork-generated Coriolis signal. Separating the signal from the noise is not easy. Often, the shock or vibration saturates the circuitry and makes the gyroscope output unreliable for a short time.

Conventional MEMS-based gyroscopes are usually bulky (100 $cm^3$ or more is not uncommon). This is partly the result of the addition of mechanical antivibration mounts, which are incorporated to minimize sensitivity to external vibration.

New MEMS-based gyroscopes avoid these shortcomings, though. For example, Analog Devices' iMEMS gyro is expected to be 7 by 7 by 3 mm (0.15 $cm^3$). Rather than quartz, it uses a resonating polysilicon beam structure, which creates the velocity element that produces the Coriolis force when angular rate is presented to it. At the outer edges of the polysilicon beam, orthogonal to the resonating motion, a capacitive accelerometer measures the Coriolis force. The gyroscope has two sets of beams in antiphase that are placed next to each other, and their outputs are read differentially, attenuating external vibration sensitivity.

An accelerometer 78, as used herein in the IRU, includes conventional piezoelectric-based accelerometers, MEMS-based accelerometers (such as made by Analog Devices) and the type as described in U.S. Pat. No. 6,182,509.

Display subsystem 82 includes an appropriate display driver and either a heads-up or other display system for providing system information to the vehicle operator. Display subsystem 82 may include multiple displays for a single occupant or for multiple occupants, e.g., directed toward multiple seating positions in the vehicle. One type of display may be a display made from organic light emitting diodes (OLEDs). Such a display can be sandwiched between the layers of glass that make up the windshield and does not require a projection system.

The information being displayed on the display can be in the form of non-critical information such as the location of the vehicle on a map, as selected by the vehicle operator and/or it can include warning or other emergency messages provided by the vehicle subsystems or from communication with other vehicles or the infrastructure. An emergency message that the road has been washed out ahead, for example, would be an example of such a message.

Generally, the display will make use of icons when the position of the host vehicle relative to obstacles or other vehicles is displayed. Occasionally, as the image can be displayed especially when the object cannot be identified. Icons can be selected which are representative of the transmitters from which wireless signals are received.

A general memory unit 84 which can comprise read-only memory or random access memory or any combination thereof, is shown. This memory module, which can be either located at one place or distributed throughout the system, supplies the information storage capability for the system.

For advanced RtZF® systems containing the precise positioning capability, subsystem 86 provides the capability of sending and receiving information to infrastructure-based precise positioning tags or devices which may be based on noise or micropower impulse radar technology, IR lasers, radar or IR reflector (e.g. corner cube or dihedral) or RFIR technology or equivalent. Once again the PPS system can also be based on a signature analysis using the adaptive associative memory technology or equivalent.

In some locations where weather conditions can deteriorate and degrade road surface conditions, various infrastructure-based sensors can be placed either in or adjacent to the road surface. Subsystem 88 is designed to interrogate and obtained information from such road-based systems. An example of such a system would be an RFID tag containing a temperature sensor. This device may be battery-powered or, preferably, would receive its power from energy harvesting (e.g. solar energy, vibratory energy), the vehicle-mounted interrogator, or other host vehicle-mounted source, as the vehicle passes nearby the device. In this manner, the vehicle can obtain the temperature of the road surface and receive advanced warning when the temperature is approaching conditions which could cause icing of the roadway, for example.

An RFID based on a surface acoustic wave (SAW) device is one preferred example of such a sensor, see U.S. Pat. No. 6,662,642. An infrared sensor on the vehicle can also be used to determine the road temperature and the existence of ice or snow.

In order to completely eliminate automobile accidents, a diagnostic system is required on the vehicle that will provide advanced warning of any potential vehicle component failures. Such a system is described in U.S. Pat. No. 5,809,437 (Breed).

For some implementations of the RtZF® system, stoplights will be fitted with transmitters which will broadcast a signal indicative of the status of the stoplight, e.g., when the light is red. Such a system could make use of the vehicle noise communication system as described above. This signal can be then received by the communication system of a vehicle that is approaching the stoplight provided that vehicle has the proper sensor or communication system as shown as 92.

Alternatively, a camera can be aimed in the direction of stoplights as the vehicle is determined to be approaching the stoplight, i.e., is within a predetermined distance which allows the camera to determine the status of the stoplight, and, since the existence of the stoplight will be known by the system, as it will have been recorded on the map, the vehicle will know when to look for a stoplight and determine the color of the light. More generally, a method for obtaining information about traffic-related devices providing variable information includes providing a vehicle with a map database including the location of the devices, determining the location of the vehicle, and as the location of the vehicle is determined to be approaching the location of each device, as known in the database, obtaining an image of the device using for example, one or more vehicle-mounted cameras. One camera could be aimed at the left side of the road, one aimed at the right side of the road and one aimed above the road, if a single camera cannot provide all of these aiming directions. This latter step may be performed by the processor disclosed herein which interfaces with the map database and the vehicle-position determining system. The images are then analyzed to determine the status of the device, which entails optical recognition technology which one skilled in the art would be able to readily provide in light of the teachings herein. Once the status of the devices, e.g., stoplights, is known from the image analysis, it becomes possible to control the vehicle based on the status of the device. Thus, if the device is a stoplight, a determination may be made whether the driver of the vehicle is slowing the vehicle when the stoplight is red and if not, automatically causing the vehicle the slow down or stop. The status of the device can also be displayed to a driver of the vehicle.

In some embodiments, the device will not be presenting the database or the vehicle will not be provided with a database including the location of traffic-related devices. In these cases, the presence of a traffic-related device is detected using a vehicle-mounted sensor, e.g., one or more cameras, and the status of the device is obtained using a vehicle-mounted sensor, which may also be the same or different cameras or other sensors, and the status of the devices are then, for example, displayed to a driver of the vehicle. The database can be formed by detecting the presence of traffic-related devices using a vehicle-mounted sensor, continuously determining the location of the vehicle, and extrapolating the position of each device from the determined location of the vehicle when each device is detected. There are numerous techniques to determine the location of a device when present in either a single image or in multiple images when the position of the vehicle when the images were taken is known, such techniques being readily understood by those skilled in the art.

An alternative idea is for the vehicle to broadcast a signal to a receiver on or otherwise associated with the stoplight if, via a camera or other means, it determines that the light is red. If there are no vehicles coming from the other direction, the stoplight can be controlled to change from red to green thereby permitting the vehicle to proceed without stopping. Similarly, if the stoplight has a camera, it can look in all directions and control the light color depending on the number of vehicles approaching from each direction. A system of phasing vehicles can also be devised whereby the speed of approaching vehicles is controlled so that they interleave through the intersection and the stoplight may not be necessary.

Although atomic clocks are probably too expensive to the deployed on automobiles, nevertheless there has been significant advances recently in the accuracy of clocks to the extent that it is now feasible to place a reasonably accurate clock as a subsystem 94 to this system. Since the clock can be recalibrated from each DGPS transmission (periodic at set time intervals from the DGPS transmissions), the clock drift can be accurately measured and used to predict the precise time even though the clock by itself may be incapable of doing so. To the extent that the vehicle contains an accurate time source, the satellites in view requirement can temporarily drop from 4 to 3. An accurate clock also facilitates the carrier phase DGPS implementations of the system as discussed above. Additionally, as long as a vehicle knows approximately where it is on the roadway, it will know its altitude from the map and thus one less satellite is necessary.

Another use of the accurate clock 94 is to enable the timing of transmission from the vehicle to be controlled to avoid interference with the transmissions from other vehicles. When there are a plurality of vehicles transmitting signals in the electromagnetic spectrum, i.e., signals in the form of illumination, and the signals are used in a distance measurement such as by modulation, time of flight, range gating and the like, it may be problem that these signals interfere with one another and thereby ruin the ability of the signals to be effectively used in the distance measurement process. One solution to prevent interference of electromagnetic signals being transmitted by vehicles is to couple the transmissions to GPS timing since all vehicles will have the accurate clock 94, which should be accurate to about 0.0001 second. The processor 100 could therefore include an algorithm to determine when each transmitter should emit an electromagnetic signal based on its location and optionally the travel direction. In this manner, vehicles will not be transmitting simultaneously but rather each will be transmitting only at specific times. The different times for the vehicles to transmit is not controlled by a central monitoring facility but rather through processor 100 in each vehicle which knows the time at which it can permit a transmission and allows transmissions at those times. The presence of the GPS signals creates a synchronized clock for all of the transmitting vehicles. When vehicles are within a threshold distance from one another, e.g., a few miles of each other, DGPS signals may not be necessary as the GPS signals received by each vehicle contains the same errors.

Power is supplied to the system as shown by power subsystem 96. Certain operator controls are also permitted as illustrated in subsystem 98.

The control processor or central processor and circuit board subsystem 100 to which all of the above components 52-98 are coupled, performs such functions as GPS ranging, DGPS corrections, image analysis, radar analysis, laser radar scanning control and analysis of received information, warning message generation, map communication, vehicle control, inertial navigation system calibrations and control, display control, precise positioning calculations, road condition predictions, and all other functions needed for the system to operate according to design.

A display could be provided for generating and displaying warning messages which is visible to the driver and/or passengers of the vehicle. The warning could also be in the form of an audible tone, a simulated rumble strip and light and other similar ways to attract the attention of the driver and/or passengers. Although vibration systems have been proposed by others, the inventors have found that a pure noise rumble strip is preferred and is simpler and less costly to implement, Vehicle control also encompasses control over the vehicle to prevent accidents. By considering information from the map database 48, from the navigation system 46, and the position of the vehicle obtained via GPS, DGPS and PPS systems, a determination can be made whether the vehicle is about to run off the road, cross a yellow line and run a stop sign, as well as the existence or foreseen occurrence of other potential crash situations. The color of an approaching stoplight can also be factored in the vehicle control as can information from the vehicle-to-vehicle, vehicle-to-infrastructure and around vehicle radar, visual or IR monitoring systems.

Figure 3A:
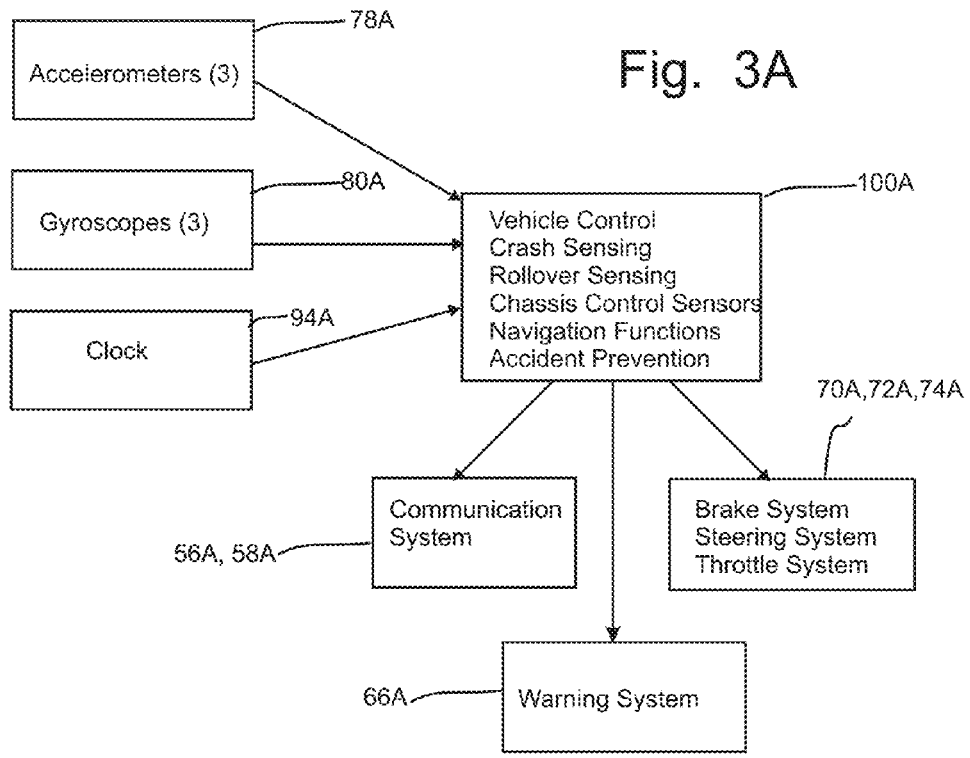
FIG. 3A is a block diagram of a representative accident avoidance, warning and control system.

FIG. 3A shows a selected reduced embodiment of the accident avoidance system shown in FIG. 3. The system includes an inertial reference unit including a plurality of accelerometers and gyroscopes, namely accelerometers 78A, preferably three of any type disclosed above, and gyroscopes 80A, preferably three of any type disclosed above. An accurate clock 94A is provided to obtain a time base or time reference. This system will accurately determine the motion (displacement, acceleration and/or velocity) of the vehicle in 6 degrees of freedom (3 displacements (longitudinal, lateral and vertical)) via the accelerometers 78A and three rotations (pitch, yaw and roll) via the gyroscopes 80A. As such, along with a time base from clock 94A, the processor 100A can determine that there was an accident and precisely what type of accident it was in terms of the motion of the vehicle (frontal, side, rear and rollover). This system is different from a crash sensor in that this system can reside in the passenger compartment of the vehicle where it is protected from actually being in the accident crush and/or crash zones and thus it does not have to forecast the accident severity. It knows the resulting vehicle motion and therefore exactly what the accident was and what the injury potential is. A typical crash sensor can get destroyed or at least rotated during the crash and thus will not determine the real severity of the accident.

Processor 100A is coupled to the inertial reference unit and also is capable of performing the functions of vehicle control, such as via control of the brake system 70A, steering system 72A and throttle system 74A, crash sensing, rollover sensing, cassis control sensing, navigation functions and accident prevention as discussed herein.

Preferably, a Kalman filter is used to optimize the data from the inertial reference unit as well as other input sources of data, signals or information. Also, a neural network, fuzzy logic or neural-fuzzy system could be used to reduce the data obtained from the various sensors to a manageable and optimal set. The actual manner in which a Kalman filter can be constructed and used in the invention would be left to one skilled in the art. Note that in the system of the inventions disclosed herein, the extensive calibration process carried on by other suppliers of inertial sensors is not required since the system periodically corrects the errors in the sensors and revises the calibration equation. This in some cases can reduce the manufacturing cost on the IMU by a factor of ten.

Further, the information from the accelerometers 78A and gyroscopes 80A in conjunction with the time base or reference is transmittable via the communication system 56A, 58A to other vehicles, possibly for the purpose of enabling other vehicles to avoid accidents with the host vehicle, and/or to infrastructure.

One particularly useful function would be for the processor to send data from, or data derived from, the accelerometers and gyroscopes relating to a crash, i.e., indicative of the severity of the accident with the potential for injury to occupants, to a monitoring location for the dispatch of emergency response personnel, i.e., an EMS facility or fire station. Other telematics functions could also be provided.

8.3 Exterior Surveillance System

Figure 4:
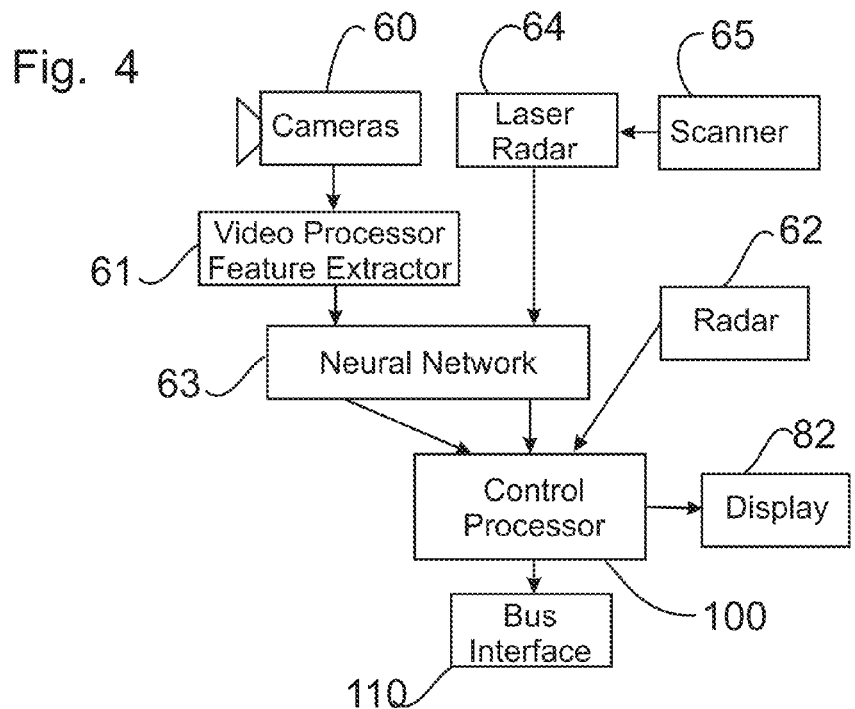
FIG. 4 is a block diagram of an image analysis computer of the type that can be used in the accident avoidance system and method of this invention.
Figure 6A:
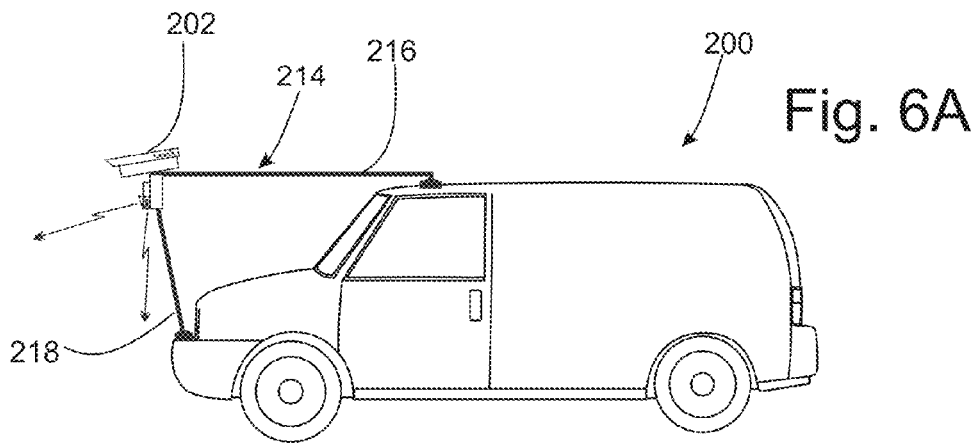
FIG. 6A is a side view of a vehicle equipped with a road-mapping arrangement in accordance with the invention.
Figure 6B:
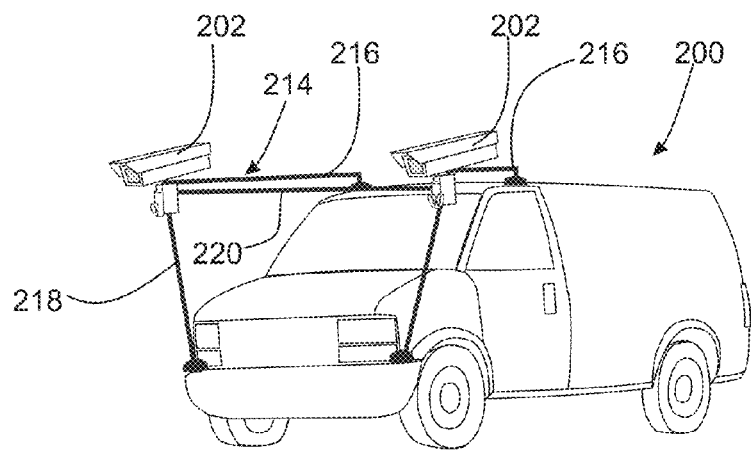
FIG. 6B is a front perspective view of a vehicle equipped with the road-mapping arrangement in accordance with the invention.

FIG. 4 is a block diagram of the host vehicle exterior surveillance system. Cameras 60 are primarily intended for observing the immediate environment of the vehicle. They are used for recognizing objects that could be most threatening to the vehicle, i.e., closest to the vehicle. These objects include vehicles or other objects that are in the vehicle blind spot, objects or vehicles that are about to impact the host vehicle from any direction, and objects either in front of or behind the host vehicle which the host vehicle is about to impact. These functions are normally called blind spot monitoring and collision anticipatory sensors. The vehicle may be a land vehicle such as a car, bus or trucks, or an airplane.

As discussed above, the cameras 60 can use naturally occurring visible or infrared radiation (particularly eyesafe IR), or other parts of the electromagnetic spectrum including terahertz and x-rays, or they may be supplemented with sources of visible or infrared illumination from the host vehicle. Note that there generally is little naturally occurring terahertz radiation other than the amount that occurs in black body radiation from all sources. The cameras 60 used are preferably high dynamic range cameras that have a dynamic range exceeding 60 db and preferably exceeding 100 db. Such commercially available cameras include those manufactured by the Photobit Corporation in California and the IMS Chips Company in Stuttgart Germany. Alternately, various other means exist for increasing the effective dynamic range through shutter control or illumination control using a Kerr or Pokel cell, modulated illumination, external pixel integration etc.

These cameras are based on CMOS technology and can have the important property that pixels are independently addressable. Thus, the control processor may decide which pixels are to be read at a particular time. This permits the system to concentrate on certain objects of interest and thereby make more effective use of the available bandwidth.

Video processor printed circuit boards or feature extractor 61 can be located adjacent and coupled to the cameras 60 so as to reduce the information transferred to the control processor. The video processor boards or feature extractor 61 can also perform the function of feature extraction so that all values of all pixels do not need to be sent to the neural network for identification processing. The feature extraction includes such tasks as determining the edges of objects in the scene and, in particular, comparing and subtracting one scene from another to eliminate unimportant background images and to concentrate on those objects which had been illuminated with infrared or terahertz radiation, for example, from the host vehicle. By these and other techniques, the amount of information to be transferred to the neural network is substantially reduced.

The neural network 63 receives the feature data extracted from the camera images by the video processor feature extractor 61 and uses this data to determine the identification of the object in the image. The neural network 63 has been previously trained on a library of images that can involve as many as one million such images. Fortunately, the images seen from one vehicle are substantially the same as those seen from another vehicle and thus the neural network 63 in general does not need to be trained for each type of host vehicle.

As the number of image types increases, modular or combination neural networks can be used to simplify the system.

Although the neural network 63 has in particular been described, other pattern recognition techniques are also applicable. One such technique uses the Fourier transform of the image and utilizes either optical correlation techniques or a neural network trained on the Fourier transforms of the images rather than on the image itself. In one case, the optical correlation is accomplished purely optically wherein the Fourier transform of the image is accomplished using diffraction techniques and projected onto a display, such as a garnet crystal display, while a library of the object Fourier transforms is also displayed on the display. By comparing the total light passing through the display, an optical correlation can be obtained very rapidly. Although such a technique has been applied to scene scanning by military helicopters, it has previously not been used in automotive, plane or other vehicle applications.

The laser radar system 64 is typically used in conjunction with a scanner 65. The scanner 65 typically includes two oscillating mirrors, or a MEMS mirror capable of oscillating in two dimensions, which cause the laser light to scan the two dimensional angular field. Alternately, the scanner can be a solid-state device utilizing a crystal having a high index of refraction which is driven by an ultrasonic vibrator as discussed above or rotating mirrors. The ultrasonic vibrator establishes elastic waves in the crystal which diffracts and changes the direction of the laser light. Another method is to use the DLP technology from Texas Instruments. This technology allows more than 1 million MEMS mirrors to control the direction of the laser light.

The laser beam can be frequency, amplitude, time, code or noise modulated so that the distance to the object reflecting the light can be determined. The laser light strikes an object and is reflected back where it can be guided onto an imager, such as a pin diode, or other high speed photo detector, which will be considered part of the laser radar system 64 as shown in FIG. 4. Since the direction of laser light is known, the angular location of the reflected object is also known and since the laser light is modulated the distance to the reflected point can be determined. By varying modulation frequency of the laser light, or through noise or code modulation, the distance can be very precisely measured.

The output from the imager of the laser radar system 64 may be provided to a trained pattern recognition system in a processor in which neural network 63 also resides. The trained pattern recognition system may be one or more of the following: a trained neural network, a combination neural network, an optical correlation system and a sensor fusion algorithm. It may be programmed to identify the object or objects from which the laser beams are being reflected. This identification then being used to control a reactive system, i.e., a warning device, or a heads-up display which projects an icon, from a plurality of such icons and which is selected based on the identification of the object, into the field of view of an occupant of the vehicle.

Alternatively, the time-of-flight of a short burst of laser light can be measured providing a direct reading of the distance to the object that reflected the light. By either technique, a three-dimensional map can be made of the surface of the reflecting object. Objects within a certain range of the host vehicle can be easily separated out using the range information. This can be done electronically using a technique called range gating, or it can be accomplished mathematically based on the range data. By this technique, an image of an object can be easily separated from other objects based on distance from the host vehicle.

In some embodiments, since the vehicle knows its position accurately and in particular it knows the lane on which it is driving, a determination can be made of the location of any reflective object and in particular whether or not the reflective object is on the same lane as the host vehicle. This fact can be determined since the host vehicle has a map and the reflective object can be virtually placed on that map to determine its location on the roadway, for example.

The laser radar system will generally operate in the near-infrared part of the electromagnetic spectrum and preferably in the eyesafe part. The laser beam will be of relatively high intensity compared to the surrounding radiation and thus even in conditions of fog, snow, and heavy rain, the penetration of the laser beam and its reflection will permit somewhat greater distance observations than the human driver can perceive. Under the RtZF® plan, it is recommended that the speed of the host vehicle be limited such that vehicle can come to a complete stop in one half or less of the visibility distance. This will permit the laser radar system to observe and identify threatening objects that are beyond the visibility distance, apply the brakes to the vehicle if necessary causing the vehicle to stop prior to an impact, providing an added degree of safety to the host vehicle.

Radar system 62 is mainly provided to supplement laser radar system. It is particularly useful for low visibility situations where the penetration of the laser radar system is limited. The radar system, which is most probably a noise or pseudonoise modulated continuous wave radar, can also be used to provide a crude map of objects surrounding the vehicle. The most common use for automotive radar systems is for adaptive cruise control systems where the radar monitors the distance and, in some cases, the velocity of the vehicle immediately in front of the host vehicle. The radar system 62 is controlled by the control processor 100.

Display system 82 was discussed previously and can be either a heads up or other appropriate display.

Control processor 100 can be attached to a vehicle special or general purpose bus 110 for transferring other information to and from the control processor to other vehicle subsystems.

In interrogating other vehicles on the roadway, a positive identification of the vehicle and thus its expected properties such as its size and mass can sometimes be accomplished by laser vibrometry. By this method, a reflected electromagnetic wave can be modulated based on the vibration that the vehicle is undergoing. Since this vibration is caused at least partially by the engine, and each class of engine has a different vibration signature, this information can be used to identify the engine type and thus the vehicle. This technique is similar to one used to identify enemy military vehicles by the U.S. military. It is also used to identify ships at sea using hydrophones. In the present case, a laser beam is directed at the vehicle of interest and the returned reflected beam is analyzed such as with a Fourier transform to determine the frequency makeup of the beam. This can then be related to a vehicle to identify its type either through the use of a look-up table or neural network or other appropriate method. This information can then be used as information in connection with an anticipatory sensor as it would permit a more accurate estimation of the mass of a potentially impacting vehicle.

Once the vehicle knows where it is located, this information can be displayed on a heads-up display and if an occupant sensor has determined the location of the eyes of the driver, the road edges, for example, and other pertinent information from the map database can be displayed exactly where they would be seen by the driver. For the case of driving in dense fog or on a snow covered road, the driver will be able to see the road edges perhaps exactly or even better than the real view, in some cases. Additionally, other information gleaned by the exterior monitoring system can show the operator the presence of other vehicles and whether they represent a threat to the host vehicle (see for example "Seeing the road ahead", GPS World Nov. 1, 2003, which describes a system incorporating many of the current assignee's ideas described herein).

The foregoing collision avoidance system may be utilized for airplanes whereby one airplane has the laser scanning system 64 and another does not. This would be appropriate for small airplanes which do not have intra-airplane communications devices which automatically communicate position between airplanes for the purpose of collision avoidance. The invention could therefore eliminate the possibility of accidents caused by a larger planes colliding with smaller airplanes on the ground at airports.

9. Speed Control

Frequently, a driver is proceeding down a road without knowing the allowed speed limit. This can happen if he or she recently entered a road and a sign has not been observed or perhaps the driver just was not paying attention or the sign was hidden from view by another vehicle. If the allowed speed was represented in the map database then it could be displayed on an in vehicle display since the vehicle would know its location. Additionally, the allowable speed can be changed depending on weather conditions. In both cases the speed of the vehicle can be limited to the permitted speed through, for example, the throttle control system discussed above.

Figure 15:
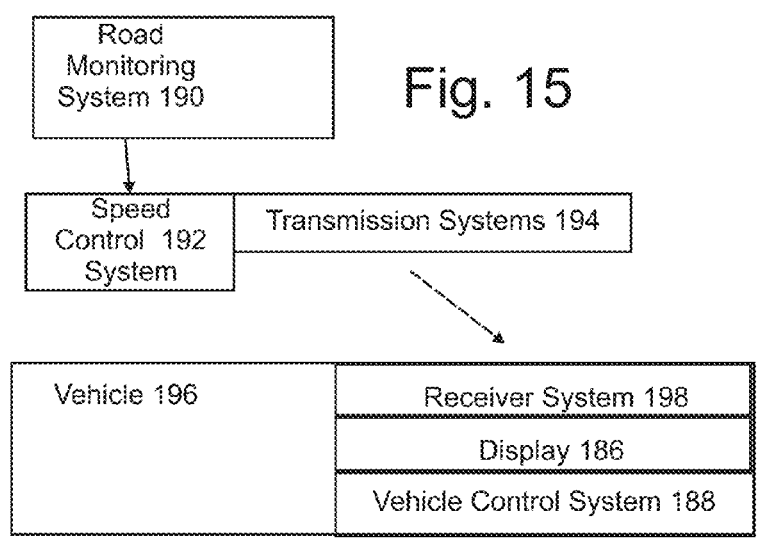
FIG. 15 is a diagram of a speed limit determining and notification system in accordance with the invention.

In this regard, with reference to FIG. 15, an arrangement for controlling vehicles traveling on a road in accordance with the invention includes a monitoring system 190 for monitoring conditions of the road, a control system 192 coupled to the monitoring system 190 for determining a speed limit for travel of vehicles on the road based on the monitored conditions, a transmission system 194 coupled to the control system 192 for transmitting or otherwise conveying the speed limit determined by the control system 192 to the vehicles 196 and a receiver system 198 arranged in or on each vehicle 196 to receive the transmitted speed limit and thereby enable notification to operators of the vehicles of the determined speed limit. This may be via an in-vehicle display 186 as discussed elsewhere herein, or orally via a sound-generating system. The monitoring system 190 may be one or more sensors, including vehicle-mounted sensors and/or infrastructure-mounted sensors. As such, the monitoring system 190 may monitor weather conditions around the road, visibility for operators of the vehicles on the road, traffic on the road, accidents on the road, emergency situations of vehicles on the road and/or the speed of vehicles traveling on the road and a distance between adjacent vehicles. The control system 192 may be coupled to or integrated with a map database containing a predetermined speed limit for the road under normal travel conditions, and thus would determine a change in this predetermined speed limit based on the monitored conditions. The control system 192 may be managed by a highway authority or other local authorities.

Each vehicle may include an automatic control system 188 for limiting the speed of the vehicle to the determined speed limit received by the receiver system 198. As described elsewhere herein, an indicating system 184 may be provided in or on each vehicle to enable an operator of the vehicle to cause a signal to be transmitted to the monitoring system 190 of a problem with the vehicle resulting in a change in the speed of the vehicle, which would necessitate the speed of other vehicles to be changed accordingly.

10. Hybrid Integrated Waveguide Transceiver of Automotive Radar with Two Antennas 10.1 General Description of the Operation of Radar Transceiver with Two Antennas Referring first to FIG. 18, a block diagram of a transceiver operating in the 76-77 GHz frequency range in accordance with the invention is shown. One intended use of this transceiver is as a front-end of short-range FMCW automotive radar. The circuit of this transceiver involves two separate antennas—transmit antenna 1 and receive antenna 2. Use of two separate antennas, which should be adequately isolated from each other, enables a considerable increase in transceiver potential and excludes application of MM-wave isolators. The active MM-wave components of this transceiver operating at 76-77 GHz are highly efficient frequency multiplier modules with high multiplication factor implemented on silicon IMPATT diodes. The main principles of construction of this frequency multiplier over the whole MM-wave range (30-300 GHz) are disclosed in detail in the Russia Federation Patent No. 2,186,455 and U.S. patent application Ser. No. 10/473,280. Application of the multiplier circuit considerably improves transceiver operation stability relative to output load.

To obtain optimal results, a reasonable compromise (as to structural and technological implementation) has been found when designing the microwave elements of the transceiver. In a preferred embodiment of the present invention, all microwave elements of the frequency-setting section operating at 7.6-7.7 GHz were made as a microstrip hybrid IC; only the components operating at 76-77 GHz had a waveguide design. Although the construction realized in this invention is the complex in comparison to other versions, a transceiver construction with two separate antennas and receivers with a double frequency conversion enables one to obtain the best transceiver specifications with respect to the transmitter power output and receiver noise factor.

The transceiver operates in the following manner. A saw-tooth voltage oscillator 3 forms symmetric saw-tooth voltage of 2.048 V and provides a voltage shift within 0-8 V. The saw-tooth voltage is formed digitally. This makes it possible to provide accuracy of amplitude level setting of about 0.001%. An oscillator 3 enables one to set such a period of saw-tooth voltage that is required for measurement of parameters, and provides the required linearity of voltage variation during the whole saw-tooth period. The saw-tooth voltage is applied to the varactor control input of a transistor voltage-controlled oscillator (VCO) 4. At the VCO 4 output, a frequency-modulated (FM) signal (power of about 50 mW in the 7.6-7.7 GHz frequency range, frequency tuning nonlinearity no more than 0.01%) is formed. The VCO 4 employs a bipolar transistor, which makes it possible to obtain the minimal phase noise level for an output signal. Since such a VCO implementation is well known in the art, there is no need to describe it in detail. Then, this FM signal (with high linearity of frequency tuning) is divided into three parts with a divider (not shown in FIG. 18). One part of the VCO 4 signal is directed via a first channel to the input of a transmitter active IMPATT multiplier module 5, another part of the signal is directed via a second channel to the input of a heterodyne active IMPATT multiplier module 6, and the last part of the signal is directed via a third channel to the input of a second balance mixer 9.

In this embodiment, the transceiver power source is the transmitter active frequency multiplier module 5 (multiplication factor N=10) based on a silicon IMPATT diode. The active IMPATT multiplier module 5 provides formation of a radar probing signal with power no less than 30 mW in the 76-77 GHz frequency range. The required linearity, frequency tuning rate and phase noise level for the radiated probing signal are determined by the parameters of the low-frequency VCO 4 operating at 7.6-7.7 GHz. We have determined experimentally that increase of FM noise during multiplication with such a silicon IMPATT frequency multiplier does not exceed 20 log N at about 10-100 kHz offset from the carrier. High conversion efficiency of the active IMPATT multiplier module 5 (at multiplication factor N=10) enables a single-stage multiplier circuit to be realized. This makes the transceiver construction much simpler and reduces the number of elements in the circuit, thus making it more reliable and much less expensive. The output signal from the transmitter active IMPATT multiplier module 5 is directed to the transmit antenna 1.

The receiver is made as a heterodyne circuit with double frequency conversion. An echo-signal comes to a first balance mixer 7 via the receive antenna 2. The power source of the first heterodyne is also the active IMPATT frequency multiplier module 6 (with frequency multiplication factor N=11) employing the same silicon IMPATT diode as in the transmitter IMPATT multiplier module 5. The heterodyne active IMPATT multiplier module 6 provides the heterodyne power (required for the first balance mixer 7) no less than 10 mW in the 83.6-84.7 GHz frequency range. The required linearity, frequency tuning rate and phase noise level for the radiated signal of the first heterodyne are determined by the parameters of the same low-frequency VCO 4 at 7.6-7.7 GHz. The first intermediate frequency (IF) signal derived from the output of the first balance mixer 7 is amplified by a low-noise first IF amplifier 8. The second frequency conversion occurs in the second balance mixer 9. The second IF signal obtained at the output of the second balance mixer 9 is amplified by the second IF amplifier 10. For the second heterodyne, the signal from the low-frequency VCO 4 at 7.6-7.7 GHz is used. This construction of the receiver provides the noise factor of the receiver transmission line of 10-12 dB. Employing the balance mixers in the receiver design provides the required degree of suppression of the heterodyne amplitude modulated (AM) noise.

The signal reflected from the target and radiated probing signal of sweeping frequency are mixed at balance mixers 7 and 9 to extract a beat-frequency signal that comes to the processing unit 11. The processor 11 determines, with high accuracy, the distance to the target from the results of analysis of the beat-frequency spectrum.

In a modified embodiment, the transceiver power source is the transmitter active frequency multiplier module 5 wherein a higher multiplication factor (N=30) is used. In this case, the active IMPATT multiplier module 5 provides formation of a radar probing signal with power no less than 30 mW in the 76-77 GHz frequency range. The required linearity, frequency tuning rate and phase noise level for the radiated probing signal are determined by the parameters of the low-frequency VCO 4 operating at about 2.53-2.56 GHz, or even 2.5 GHz. It is likely that an increase of FM noise during multiplication with such a silicon IMPATT frequency multiplier does not exceed 20 log N at about 10-100 kHz offset from the carrier. High conversion efficiency of the active IMPATT multiplier module 5 (at multiplication factor N=30) enables a single-stage multiplier circuit to be realized.

10.2 Transmitter Active IMPATT Multiplier Module

Figure 18:
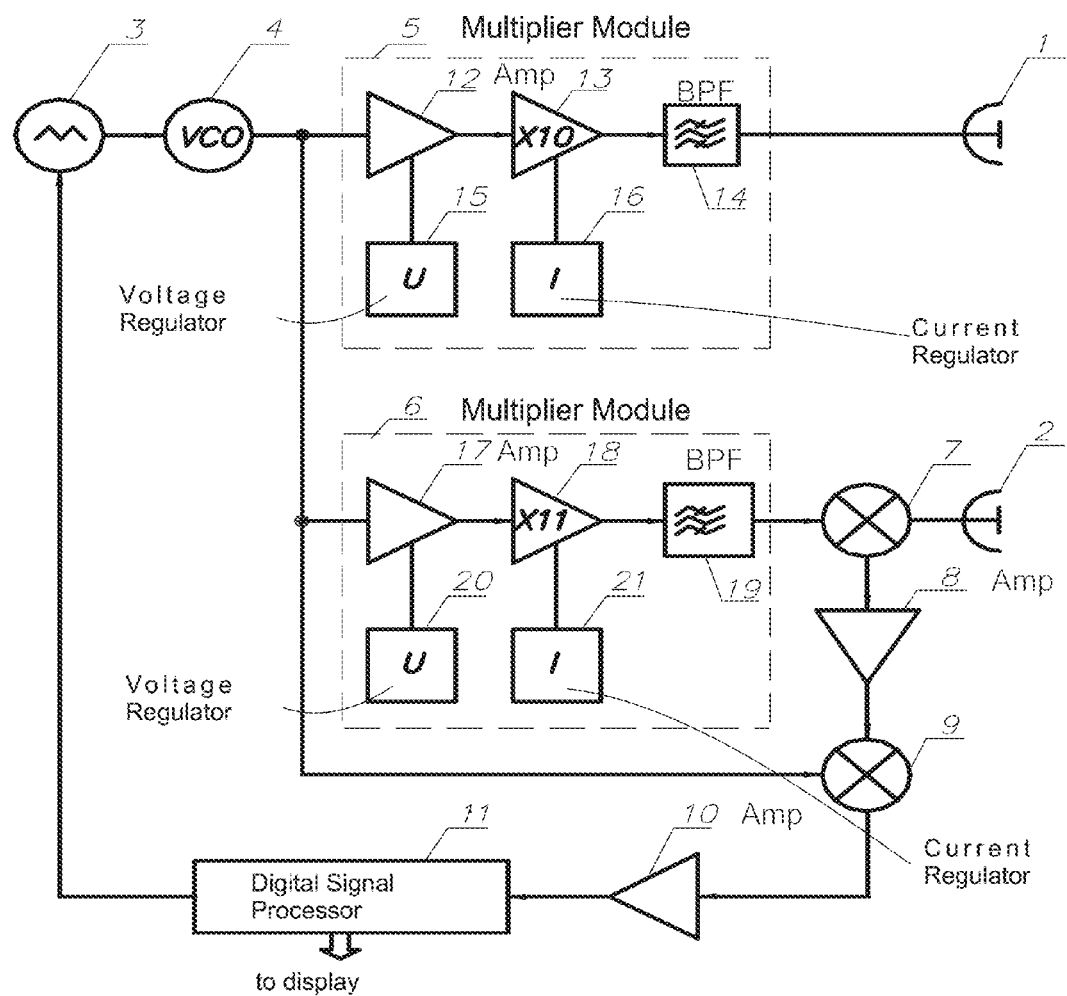
FIG. 18 shows a block diagram of the 76-77 GHz FMCW radar transceiver with two antennas according to the hybrid integrated-waveguide preferred embodiment.

The transmitter active IMPATT frequency multiplier module 5 (whose block diagram is shown in FIG. 18) is a hybrid IC (HIC) involving an input transistor power amplifier 12 operating at 7.6-7.7 GHz, active IMPATT frequency multiplier 13 (with frequency multiplication factor N=10) constructed on a silicon multiplying IMPATT diode 22 (see FIG. 19), bandpass filter 14, as well as voltage regulator 15 for transistors and DC bias current regulator 16 for the IMPATT diode 22. The transmitter module 5 is located in a single metal housing with the coaxial input and waveguide output (waveguide size WR-10). The supply voltages are applied to the transmitter module 5 via feed-through insulators.

The FM signal at 7.6-7.7 GHz (power of 20 mW) from the VCO 4 enters the input of the transistor power amplifier 12 via a coaxial connector. The gain of the transistor power amplifier 12 operating at 7.6-7.7 GHz is +17 dB. Two balanced stages (connected in series) operate in the saturation mode; they provide microwave power of 1 W at the output of the power amplifier 12. In a simple case, such an amplifier may be realized (as in a preferred embodiment of the invention) by utilizing microstrip technology in combination with GaAs field-effect transistors. It is apparent to those skilled in the art, however, that a monolithic or any other circuit with the same parameters (frequency range, gain and power output) may be applied in construction of such an amplifier.

The output signal at 7.6-7.7 GHz from the transistor power amplifier 12 enters the multiplying IMPATT diode 22 of the active IMPATT frequency multiplier 13. The silicon IMPATT diode 22 (that was designed purposely for the 76-77 GHz frequency range) operates in the avalanche breakdown mode. To realize frequency multiplication, strong avalanche nonlinearity (of inductive nature) is used. High (13 dB) conversion efficiency is determined by the fact that this silicon IMPATT diode has negative resistance at the required $10^{th}$ harmonic of input signal.

Figure 20:
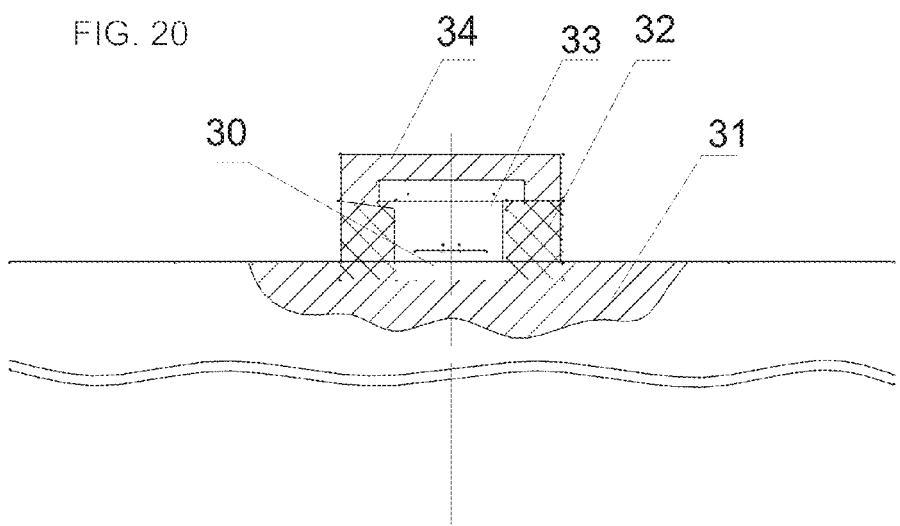
FIG. 20 shows schematically cross-section of a packaged Si multiplier IMPATT diode optimized for the 76-77 GHz range according to the hybrid integrated-waveguide preferred embodiment.

The silicon IMPATT diode 22 has a single-drift $p^+$-n-$n^+$ structure. It is made using the traditional manufacturing technology [see, N. S. Boltovets, V. V. Basanets, V. N. Ivanov et al., Microwave diodes with contact metallization systems based on silicides, nitrides and borides of refractory metals, Semiconductor Physics, Quantum Electronics & Optoelectronics, 2000, vol. 3, no. 3, pp. 359-370]. The starting material for production of the multiplying diode 22 may be a VPE-grown n-$n^+$-Si wafer. During the process of epitaxy an n-Si layer (thickness of 0.7 μm, impurity concentration of $3\times10^{16}$ cm$^{-3}$) is grown on a low-resistance (resistivity of 0.002 Ω×cm) As-doped $n^+$-Si substrate. Typical technological processes (diffusion, chemical etching, vacuum sputtering, photolithography, plating of copper and gold, etc.) are applied to make of a silicon wafer reverse diode mesas on an integral copper heat sink (IMPATT diode chips) using the batch-fabrication technique. Then, the mesas are separated, and each IMPATT chip 30 is mounted on a gold-plated copper cylindrical heat sink base 31 inside a dielectric bush 32 (see FIG. 20). The $p^+$-contact of the IMPATT diode 22 is connected to the gold-plated copper heat sink base 31, while the $n^+$-contact is connected to the metallized face of the dielectric bush 32 via a gold multi-petal lead 33. The dielectric bush 32 is capped with a gold-plated metal cap 34.

It should be noted that formation of a multiplying IMPATT diode according to this invention is made using the standard manufacturing technology for silicon discrete microwave diodes and ICs; no development of additional specific technological processes is required. High degree of maturity of silicon technologies (used for growing semiconductor silicon material and production of devices on its basis) provides achieving reproducibly the required parameters at MM-wave frequencies and makes it possible to realize them under mass production conditions. This fact, along with the advantages of the single-stage multiplication circuit implemented in a preferred embodiment of the invention, makes the transceiver more reliable and less expensive.

It is known from S. M. Sze, Physics of Semiconductor Devices, Second Edition, John Wiley & Sons, Inc., New York-Chichester-Brisbane-Toronto-Singapore (1981), Vol. 2, Chapter 10, that the operating frequency and efficiency of an IMPATT diode operation at that frequency are determined by the parameters of the diode structure and mounting construction. Therefore a big number of the diode parameters had to be optimized, such as the drift length (i.e., the n-layer thickness), mesa cross section area, breakdown voltage, direct current density, capacitance and inductance of the mounting elements, etc. For silicon multiplying IMPATT diodes operating in the 76-77 GHz frequency range the main parameter values after optimization are as follows: impurity concentration in the n-layer of $3 \times 10^{16}$ cm$^{-3}$, n-layer thickness of 0.35 µm, mesa diameter of 40-50 µm, with the resonance frequency in the 76-77 GHz range.

Figure 19:
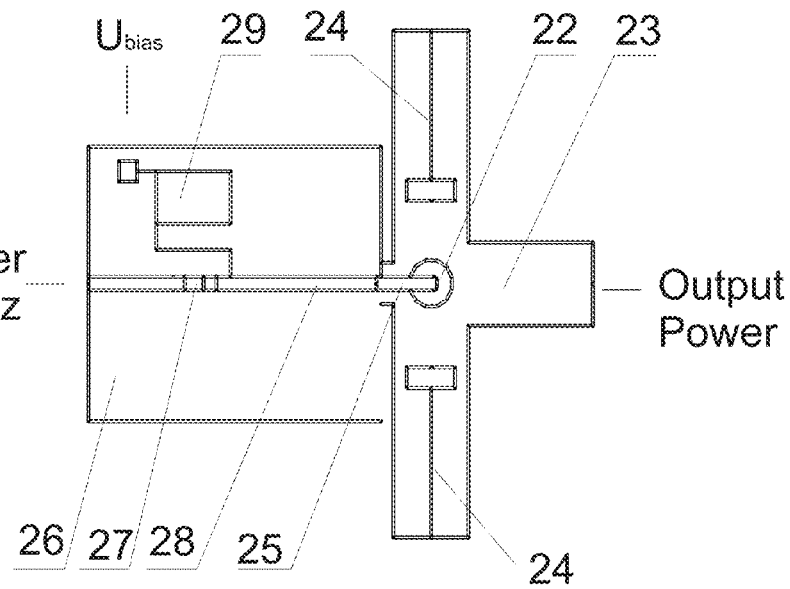
FIG. 19 shows the circuit for matching the multiplier IMPATT diode of FIG. 18 both with waveguide and microstrip transmission lines according to the hybrid integrated-waveguide preferred embodiment.

Considering the operation of the transmitter active IMPATT multiplier module 5, taking into account FIGS. 18 and 19, matching between the multiplying IMPATT diode 22 and transistor amplifier 12 is performed by a microstrip board 26. The synchronizing signal from the transistor power amplifier 12 goes via a microstrip line 28 segment to the silicon IMPATT diode 22. A DC bias is applied to the diode 22 from the current regulator 16 via the above microstrip line 28 segment. The isolation between the IMPATT diode 22 DC bias voltage and the AC signal at 7.6-7.7 GHz from the transistor power amplifier 12 is achieved due to a filter 29 (included in the circuit of DC bias supply of the IMPATT diode 22) and a capacitance 27 (inserted in the break of the microstrip line 28). The IMPATT diode 22 is connected to the microstrip line 28 with a gold-plated strap 25.

The silicon IMPATT diode 22 (operating in the avalanche breakdown mode when its characteristic is nonlinear) converts the input synchronizing signal to cause harmonics multiple to the input signal frequency to appear in the frequency spectrum. To separate the required $10^{th}$ harmonic of the input signal, the IMPATT diode 22 is placed within an output coupling circuit made as a T-shaped waveguide tee 23 (FIG. 19). Referring to FIG. 19, arranged in two opposite arms of the waveguide tee 23 are tuning shorts 24, while the third arm of the waveguide tee 23 serves for the microwave energy output. The waveguide tee 23 has waveguide size WR-10. At the output of the waveguide tee 23, there is a waveguide bandpass filter 14 (see FIG. 18) whose pass band is 75.5-77.5 GHz. Filter 14 efficiently suppresses the adjacent harmonics. The proposed circuit provides maximal efficiency of the multiplying IMPATT diode matching with both the microstrip line and waveguide transmission line. In addition, it provides efficient heat removal from the diode and supply of DC bias required for IMPATT diode operation. The circuit shown in FIG. 19 enables one to use the off-the-shelf discrete multiplying IMPATT diodes, provides easy assembling of the transmitter module 5 and high mechanical strength of the module 5 as a whole. The output signal (at 76-77 GHz, power of 30-50 mW) from the transmitter active active IMPATT multiplier module 5 comes via the waveguide output to the transmit antenna 1.

10.3 Heterodyne Active IMPATT Multiplier Module

The active IMPATT multiplier module 6 of the first heterodyne of the receiver is also a HIC involving an input transistor power amplifier 17 operating at 7.6-7.7 GHz, active CW IMPATT frequency multiplier 18 (with multiplication factor N=11) constructed on a silicon multiplying IMPATT diode similar to the IMPATT diode 22 (shown in FIG. 19 for the IMPATT multiplier module 5), bandpass filter 19, voltage regulator 20 for transistors and DC bias current regulator 21 for the IMPATT diode. The heterodyne module 6 is located in a single metal housing with the coaxial input and waveguide output (waveguide size WR-10). The supply voltages come to the transmitter module 6 via feed-through insulators.

The FM signal (at 7.6-7.7 GHz, power of 20 mW) from VCO 4 goes via a coaxial connector to the input of the transistor power amplifier 17 (operating at 7.6-7.7 GHz, with gain of +14 dB). Two balanced amplifier stages connected in series operate in the saturation mode. They provide microwave power of 0.5 W at the output of the power amplifier 17. In one case, such an amplifier may be realized (as in a preferred embodiment of the invention) by utilizing microstrip technology in combination with GaAs field-effect transistors. It is apparent to those skilled in the art, however, that in construction of such amplifier one can apply a monolithic or any other circuit with the same parameters (frequency range, gain and power output).

The output signal from the transistor power amplifier 17 is directed to the silicon multiplying IMPATT diode of the active IMPATT frequency multiplier 18. Matching between the multiplying IMPATT diode and transistor amplifier 17 is performed with a microstrip board 26 in a manner similar to that for the transmitter IMPATT multiplier module 5. This IMPATT diode is coupled into the waveguide by the T-shaped waveguide tee 23, similarly as for transmitter module 5. In contrast to transmitter module 5, in the heterodyne module 6, the $11^{th}$ (rather than $10^{th}$) input signal harmonic is separated. At the output of the T-shaped waveguide tee 23, there is a waveguide bandpass filter 19 (see FIG. 18) whose pass band is 83.1-85.2 GHz. It efficiently suppresses the adjacent harmonics, as well as considerably reduces AM noise of the heterodyne module 6 at the frequency of echo-signal reception (by over 60 dB). The output signal (at 83.6-84.7 GHz, with power of no less than 10 mW) from the heterodyne active IMPATT multiplier module 6 is directed via the waveguide output to the heterodyne input of the balance mixer 7.

Figure 21:
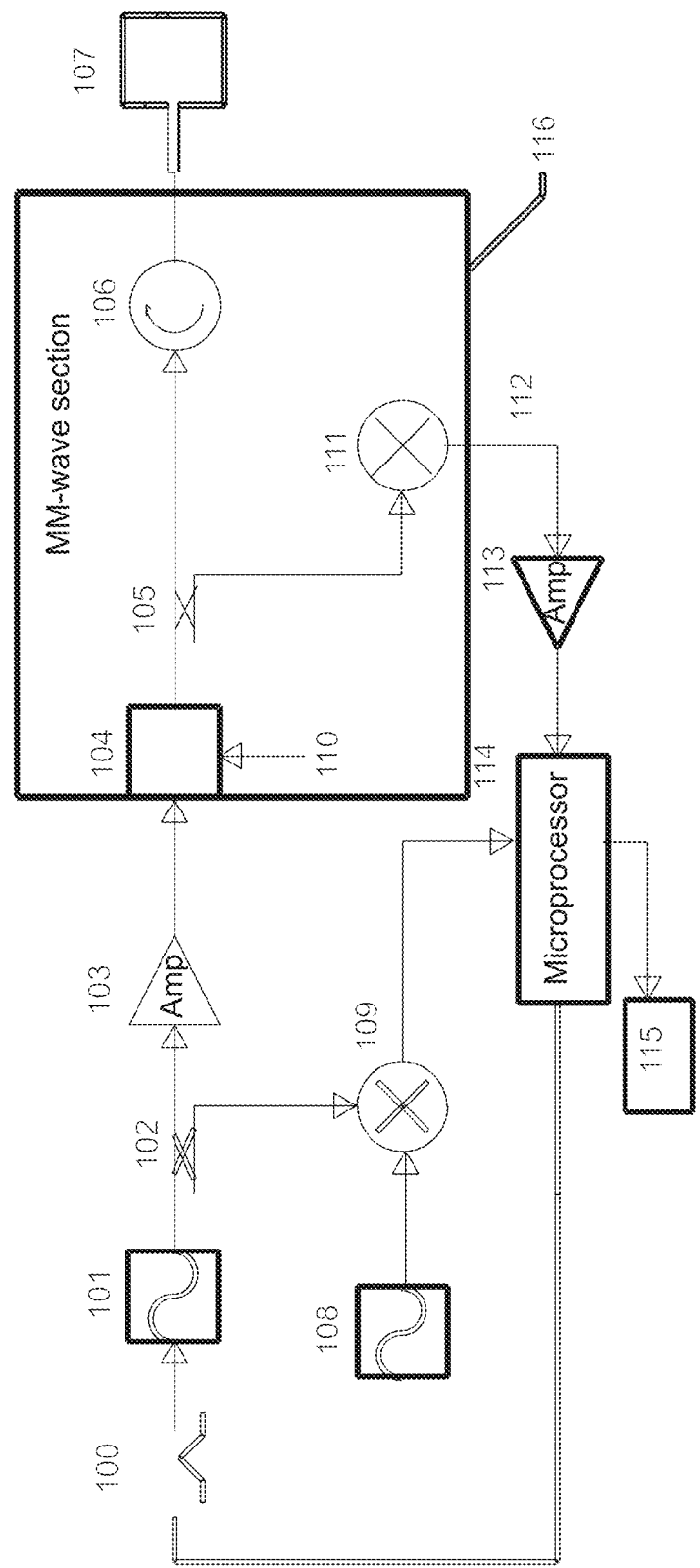
FIG. 21 shows a block diagram of the 76-77 GHz FMCW radar transceiver with one antenna according to the hybrid integrated-microstrip embodiment of the invention.

11. Hybrid Integrated Microstrip Radar Transceiver with One Antenna 11.1 General Description of Hybrid Integrated Microstrip Transceiver with One Antenna FIG. 21 shows schematically a transceiver (realized and tested) intended for operation as a front-end of automotive radar with operating frequency in the 76-77 GHz frequency range. The transceiver is a homodyne circuit with linear frequency modulation; it operates with a single transmit/receive antenna. In this embodiment, a MM-wave section 116 of the transceiver is made (using the hybrid-integrated microstrip technology) on a high-resistance silicon substrate. A silicon multiplying IMPATT diode (optimized for the operating frequency of 76-77 GHz) is used as an active element in the receiver section of the transceiver. Application of the hybrid-integrated technology, as well as use of a silicon substrate and one active element (silicon IMPATT diode) makes it possible to considerably reduce the size and mass of the transceiver and improve both its service life and reliability. Under the series production conditions, high reproducibility of operating parameters is provided, as well as possibility to produce low-cost automotive radars with the required level of specifications.

The transceiver operates in the following manner. The sweep voltage 100 goes from a microprocessor unit 114 to a VCO 101 (tuning range of 7.6-7.7 GHz, power output of 7-8 mW). A signal from the VCO 101 goes to a directional coupler 102 and is divided therein in two parts. One part of the signal enters the input of an amplifier 103. Another part of the signal from the directional coupler 102 is directed to a mixer 109. A signal from an oscillator 108 (stabilized with a dielectric resonator, DRO) is directed to the LO input of the mixer 109. In the mixer 109, the signals from the VCO 101 and DRO 108 are converted into the IF signal of the mixer 109. The IF signal is provided to the microprocessor unit 114 where a digital phase-locked-loop frequency control system is included. It provides high linearity of the VCO 101 frequency tuning and improves the VCO 101 spectral characteristics.

After amplification by the oscillator 103, the signal comes to the active frequency multiplier 104 with high multiplication factor. The IMPATT diode bias current feeds the input 110 of the frequency multiplier 104. The $10^{th}$ harmonic of the signal coming from the amplifier 103 is separated in the multiplier 104 by means of matching-transforming circuits (MTC). The frequency of the output signal of the multiplier 104 varies in the 76-77 GHz range; the power output is about 15 mW. The signal converted in the multiplier 104 is provided to a directional coupler 105 and is divided therein into two portions. One portion of the signal via a microstrip circulator 106 feeds an antenna 107 and is radiated into space. A signal reflected from an object is received by the same antenna 107 and is directed (via the circulator 106) to a mixer 111. The required isolation level is provided in the circulator 106. Another portion of the signal from the directional coupler 105 enters the LO input of the mixer 111. The hybrid-integrated mixer 111 is a balanced circuit. This provides suppression of the LO noise. At the mixer output 112, the IF signal of the mixer 111 (proportional to the difference between the radiated signal and that reflected from an object) is extracted. This signal is amplified by a low-noise amplifier 113 and is provided to the microprocessor unit 114 for processing and obtaining a signal that is proportional to the velocity and distance to the object. Then, the signal is displayed on an indicator 115.

Figure 22:
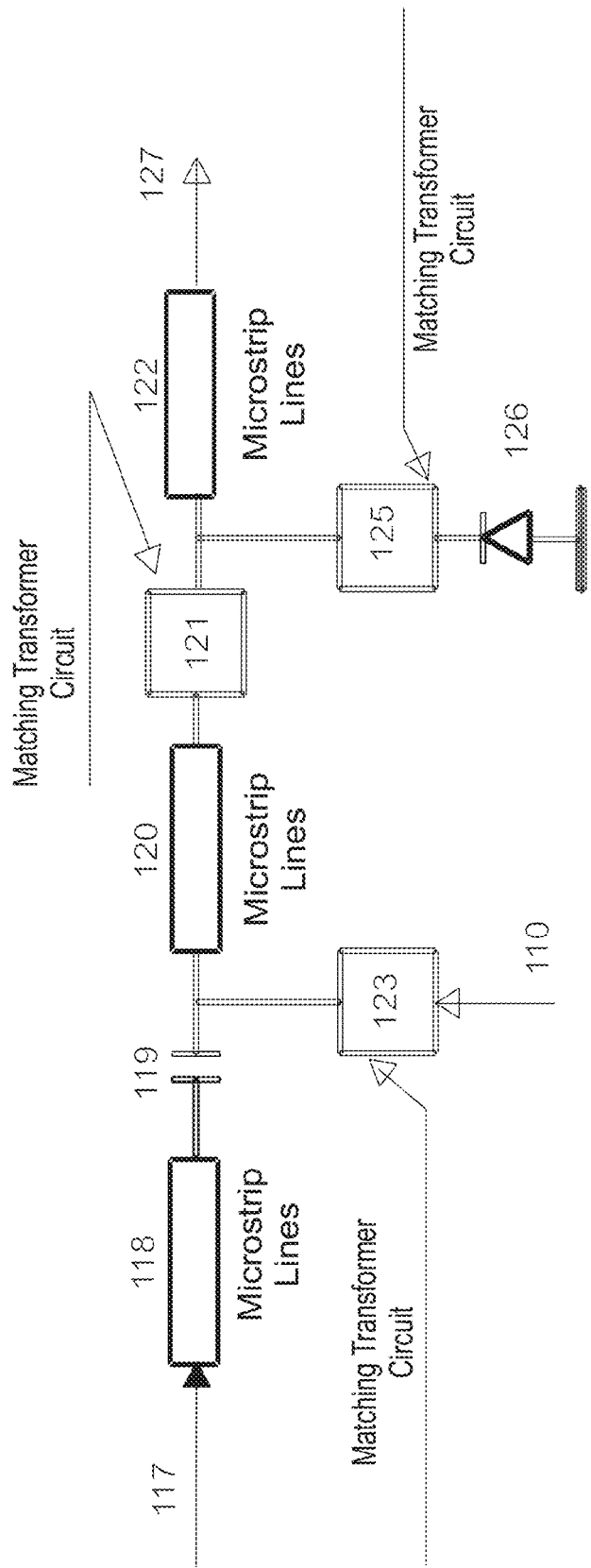
FIG. 22 shows a block diagram of the 76-77 GHz active silicon IMPATT frequency multiplier according to the hybrid integrated-microstrip embodiment of the invention.

11.2 Block-Diagram of the Hybrid Integrated Microstrip Active Frequency Multiplier The schematic of the hybrid-integrated frequency multiplier 104 implemented in accordance with this preferred embodiment of the invention is shown in FIG. 22. The hybrid integrated-microstrip frequency multiplier 104 includes a decoupling capacitor 119, MTCs 121, 123 and 125, microstrip lines 118, 120 and 122 and a silicon multiplying IMPATT diode chip 126 which is similar to the multiplying IMPATT diode chip 30 shown in FIG. 20 for the hybrid integrated-waveguide embodiment. The signal of low (7.6-7.7 GHz) frequency is provided to the multiplying IMPATT diode chip 126 via the decoupling capacitor 119, microstrip line 120, MTC 121 and MTC 125. The $10^{th}$ harmonic signal at 76-77 GHz is extracted with the MTC 125 and is provided via the microstrip line 122 to the output 127 of the frequency multiplier 104. The IMPATT diode chip 126 is supplied with a DC bias current via the MTC 123.

11.3 Layout of the MM-Wave Section of the Hybrid Integrated Microstrip Transceiver The MM-wave section of the transceiver is shown enclosed by a dashed line box 116 in FIG. 21. This section 116 size is 10.5×3.8 mm; it is made on the high-resistance substrates whose thickness is no more than 120 μm.

The substrates are made of high-resistance (resistivity no less than $10^3$ Ohm×cm) silicon. On standardized silicon wafers membranes of required thickness (no more than 120 μm) are formed. They serve for formation of passive components of microwave IC chips using the standard microelectronic techniques.

Figure 23:
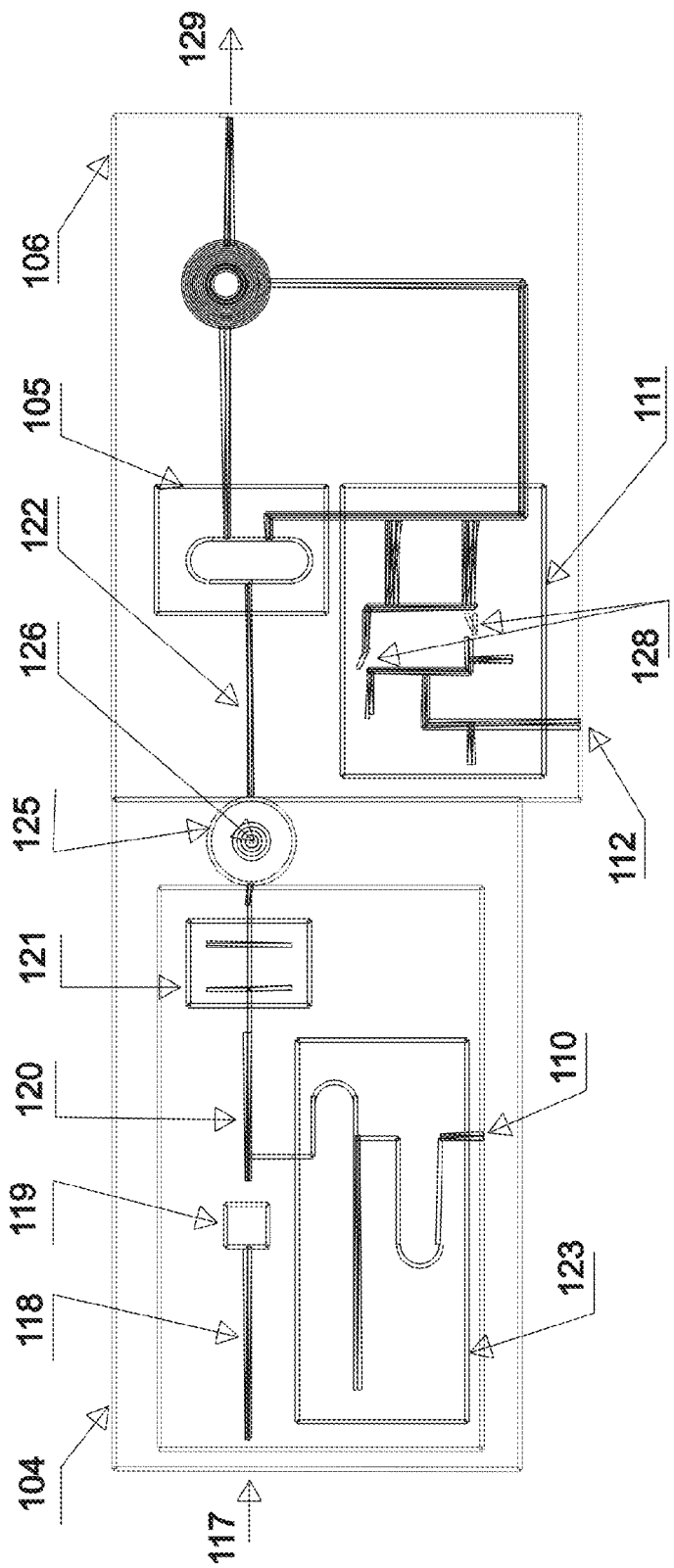
FIG. 23 shows the layout of the MM-wave section of the 76-77 GHz FMCW radar transceiver according to the hybrid integrated-microstrip embodiment of the invention.

The layout of the transceiver MM-wave section 116 is shown in FIG. 23. The low-frequency (7.6-7.7 GHz) signal enters the input 117. The multiplying diode DC bias current feeds the input 110. The MTC 123 excludes the effect of the IMPATT diode bias current circuitry on propagation of the low-frequency signals via the microstrip line 120. The MTC 123 is a stub microstrip band-rejection filter designed for the frequency of 7.6-7.7 GHz.

The MTC 121 gates low-frequency signals and rejects the multiplying diode $10^{th}$ harmonic signal. The MTC 121 is a stub microstrip band-rejection filter designed for the frequency 76-77 GHz. The MTC 125 transforms the impedance of the IMPATT diode chip 126 in the 76-77 GHz frequency range. The MTC 125 comprises construction elements of a miniature diode package, i.e., a dielectric bush bush and a gold many-petal lead. The gold many-petal lead (or multipetal lead) forms the transformer inductance, while the dielectric bush forms its capacitance. Similar to the multiplying IMPATT diode chip 30 shown in FIG. 20, the multiplying IMPATT diode chip 126 comprises a silicon reverse $p^+$-n-$n^+$ mesa and a gold-plated copper heat sink base. The diode chip 126 parameters are optimized in the 76-77 GHz frequency range. The MTC 125 resonance frequency lies in the 76-77 GHz range.

The stub microstrip directional coupler 105 sends part of the signal to the circulator 106 and another part to the LO input of the mixer 111. The mixer 111 is a balanced circuit employing beam-lead GaAs diodes 128. It provides the conversion coefficient better than 10 dB. The arm 129 of the circulator 106 is connected to the microstrip antenna 107.

12. Summary

While the invention has been illustrated and described in detail in the drawings and the foregoing description, the same is to be considered as illustrative and not restrictive in character, it being understood that only preferred embodiments have been shown and described and that all changes and modifications that come within the spirit of the invention are desired to be protected.

Additional features of inventions disclosed above include the use of a camera and infrared illumination, when necessary, to prevent rear end collisions (automatic cruise control). An infrared laser beam can be used to measure the distance from one vehicle, when mounted at its front or facing forward, to a vehicle in front either by modulation or time of flight analysis, which would be within the ability of one skilled in the art. Range gating could also be used. The beam can be transmitted from one location offset from the camera to thereby provide a measurement of the distance as well. Structured light could also be used. Another approach for automatic cruise control and accident avoidance based on infrared illumination is to use radar along with a map of the travel lanes. Neural networks could be used in any of the embodiments described above to process data and identify or ascertain the identity of objects based on reflections from, for example, laser beams.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain. Rather, it is intended that patent applications have been or will be filed to cover all of the subject matter disclosed above.

The invention claimed is:

1. A method for mapping terrain including one or more immovable objects fixed in position alongside a road, comprising:
   in a plurality of vehicles, each of the vehicles having at least one camera and a position determining system that determines a position of the vehicle, the at least one camera and the position determining system being in a set configuration relative to one another:
      obtaining images of the terrain using the at least one camera while the vehicle is at different positions, each of the images of the terrain including at least one of the immovable objects;
      obtaining position information using the position determining system while the at least one camera is obtaining the images of the terrain; and
      transmitting from the vehicle to a processor at a remote location apart from the vehicle, the images of the terrain obtained using the at least one camera on the vehicle in association with the position information obtained using the position determining system when each of the images of the terrain was obtained;
   receiving the images of the terrain including the at least one immovable object and the associated position information about the images from each of the plurality of vehicles at the processor at the remote location;
   converting, using the processor at the remote location apart from the vehicles and information about the set configuration of the at least one camera and the position determining system relative to one another, the images and/or data derived from the images to map data including data about the immovable objects from the images of the terrain by identifying common objects among the immovable objects in multiple images and using the position information from when the multiple images were obtained to obtain the positions of the common immovable objects; and
   forming or updating a map, using the processor, to include the common immovable objects in their fixed positions based on the map data.

2. The method of claim 1, wherein the processor is configured to convert the images obtained from each of the plurality of vehicles at different times to the map data.

3. The method of claim 1, wherein the positioning system comprises a GPS receiver, the step of obtaining position information using the position determining system while the at least one camera is obtaining images comprising:
   obtaining position information from a positional reading by the GPS receiver when available; and
   deriving position information using an inertial measurement unit (IMU) on the vehicle when a positional reading by the GPS receiver is not available.

4. The method of claim 1, wherein the processor is configured to convert the images to the map data that enables three-dimensional representation of the terrain.

5. The method of claim 1, wherein the at least one camera and the position determining system are housed in a data acquisition module, the method further comprising:
   determining, by a processor of the data acquisition module, a position of the data acquisition module from data obtained by the position determining system; and
   transmitting the determined position of the data acquisition module to the processor at the remote location for use when converting the images and/or data derived from the images to the map data.

6. The method of claim 5, further comprising receiving at a communications unit on the vehicle, position correction information, whereby the received position correction information is used by the processor in the data acquisition module to determine position of the data acquisition module.

7. The method of claim 1, further comprising transmitting from the vehicle, using a communications unit on the vehicle, the position information to the processor at the remote location apart from the vehicles for use when converting the images and/or data derived from the images to the map data.

8. The method of claim 7, further comprising correcting the position information at the processor at the remote location.

9. The method of claim 1, wherein the processor is provided with a view angle of each of the at least one camera and converts the images to the map data in consideration of the view angle of each of the at least one camera.

10. The method of claim 1, further comprising directing infrared illumination in an eye-safe portion of the infrared spectrum into an area being imaged in conjunction with the at least one camera such that the at least one camera obtains images of illuminated areas.

11. The method of claim 1, wherein the position determining system comprises a GPS receiver and the processor is configured to convert the images to the map data using DGPS information.

12. The method of claim 1, wherein the at least one camera comprises a plurality of cameras.

13. The method of claim 1, further comprising:
   storing the images obtained using the at least one camera on the vehicle and the associated position information on the vehicle; and
   periodically transmitting the images and/or data derived from the images and the associated position information to the remote location at which the processor converts the images and/or data derived from the images to the map data.

14. A computer-based system for mapping terrain including one or more immovable objects fixed in position alongside a road, comprising:
   a plurality of data acquisition modules each adapted to be arranged on a respective one of a plurality of vehicles, each of said data acquisition modules comprising at least one camera that obtains images of the terrain and a positioning system that determines a position of the vehicle on which said data acquisition module is arranged, each of the images of the terrain including at least one of the immovable objects, said at least one camera and said position determining system being in a set configuration relative to one another;
   a plurality of communications units each adapted to be arranged on a respective one of the plurality of vehicles, each of said communications units transmitting from the respective one of the plurality of vehicles the images of the terrain obtained using said at least one camera and/or data derived from the images of the terrain in association with the position information obtained using said positioning system when each of the images of the terrain was obtained; and
   a processor situated apart from the vehicles and that receives from said communications unit on each of the plurality of vehicles, images of the terrain including the at least one immovable object and/or data derived from the images of the terrain including the at least one immovable object and associated position information about the images, said processor being configured to convert, using information about the set configuration of said at least one camera and said position determining system relative to one another, the images and/or data derived from the images to map data including data about the immovable objects from the images of terrain by identifying common objects among the immovable objects in multiple images and using the position information from when the multiple images were obtained to obtain the positions of the common immovable objects; and said processor being further configured to form or update a map to include the common immovable objects in their fixed positions based on the map data.

15. The system of claim 14, wherein said positioning system comprises a GPS receiver and an inertial measurement unit that determines a position of the vehicle on which said data acquisition module is arranged between readings obtained by said GPS receiver.

16. The system of claim 14, wherein said processor is configured to convert the images to the map data that enables three-dimensional representation of the terrain.

17. The system of claim 14, wherein said processor is provided with a view angle of each of said cameras and converts the images to the map data in consideration of the view angle of each of said cameras.

18. The system of claim 14, wherein the processor is further configured to combine the position information from multiple vehicles obtained at approximately the same location but at different times to improve the position accuracy estimation of the common immovable objects in the images obtained by the different vehicles.

19. The system of claim 14, further comprising a system adapted to be arranged on each of the plurality of vehicles that directs beams or waves toward immovable objects in the images of the terrain obtained by said at least one camera to enable a distance from said system to each of the immovable objects to be determined, the distance being provided to said processor and used by said processor when forming or updating the map.

20. The system of claim 14, further comprising an illuminating system for illuminating the terrain with infrared illumination in an eye-safe portion of the infrared spectrum in conjunction with said at least one camera such that said at least one camera obtains images of illuminated terrain.

21. The system of claim 14, wherein said positioning system comprises a GPS receiver such that the position information is GPS information and said processor is further configured to improve accuracy of the position information abeut of the vehicles using DGPS corrections.

22. The system of claim 14, wherein the location of each common immovable object is determined from an image sequence obtained from one of the vehicles by using triangulation and comparing displacement of the common immovable object between two images and known motion of the vehicle between the times when the two images were obtained.

23. The system of claim 14, wherein said data acquisition module adapted to be arranged on at least one of the vehicles comprises a plurality of cameras.

24. The system of claim 14, wherein the images obtained by said at least one camera of said data acquisition module adapted to be arranged on at least one of the vehicles while the at least one of the vehicles is at different positions, or data derived from the images, and the position information about the at least one of the vehicles when each image was obtained are transmitted from the at least one of the vehicles to the remote location at which said processor is situated.

25. The system of claim 14, wherein the images obtained by said at least one camera of said data acquisition module adapted to be arranged on at least one of the vehicles while the at least one of the vehicles is at different positions, or data derived from the images, and the position information about the at least one of the vehicles when each image was obtained are stored on the at least one of the vehicles and are periodically transmitted from storage to the remote location at which said processor is situated.

26. The system of claim 14, wherein said at least one camera and said positioning system are housed in said data acquisition module adapted to be arranged on at least one of the vehicles, said data acquisition module further comprising a processor that determines position of said data acquisition module from data from said positioning system, said communications unit transmitting the determined position of said data acquisition module to said processor at the remote location for use when converting the images and/or data derived from the images to the map data.

27. The system of claim 26, wherein said communications unit is configured to receive position correction information, said processor in said data acquisition module adapted to be arranged on at least one of the vehicles being configured to use the received position correction information to determine position of said data acquisition module.

28. The system of claim 14, wherein said processor at the remote location is configured to correct the position information received from each of the plurality of vehicles.

29. The method of claim 3, wherein the inertial measurement unit is configured to measure acceleration in three directions and angular motion in three directions.

30. The method of claim 1, wherein the step of converting the images and/or data derived from the images to the map data including data about the immovable objects from the images of the terrain comprises identifying a first immovable object in a first image obtained by a first one of the vehicles and the first immovable object in a second image obtained by a second one of the vehicles and using the position information from when the first and second images were obtained to obtain the position of the first immovable object.

31. The system of claim 14, wherein said processor is further configured to convert the images and/or data derived from the images to the map data including data about the immovable objects from the images of terrain by identifying a first immovable object in a first image obtained by a first one of the vehicles and the first immovable object in a second image obtained by a second one of the vehicles and using the position information from when the first and second images were obtained to obtain the position of the first immovable object.

* * * * *

UNITED STATES PATENT AND TRADEMARK OFFICE
CERTIFICATE OF CORRECTION

| | | |
|---|---|---|
| PATENT NO. | : 9,103,671 B1 | Page 1 of 1 |
| APPLICATION NO. | : 13/686862 | |
| DATED | : August 11, 2015 | |
| INVENTOR(S) | : David S. Breed et al. | |

It is certified that error appears in the above-identified patent and that said Letters Patent is hereby corrected as shown below:

In the Claims

Column 79, line 51, delete "abeut".

Signed and Sealed this
Nineteenth Day of January, 2016

Michelle K. Lee
*Director of the United States Patent and Trademark Office*